Figure 40:
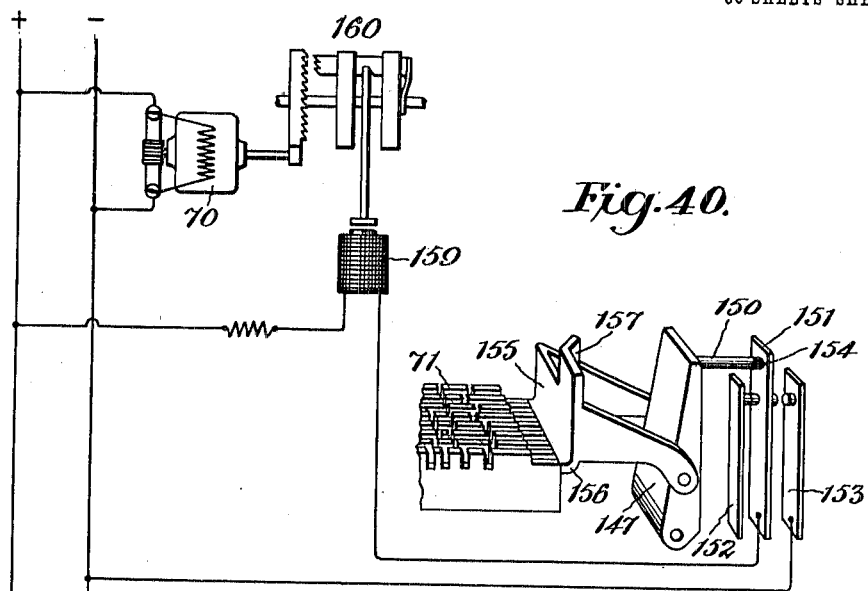

L. M. POTTS.
TELEGRAPHY.
APPLICATION FILED JUNE 17, 1909.
1,105,920.
Patented Aug. 4, 1914.
30 SHEETS—SHEET 1.
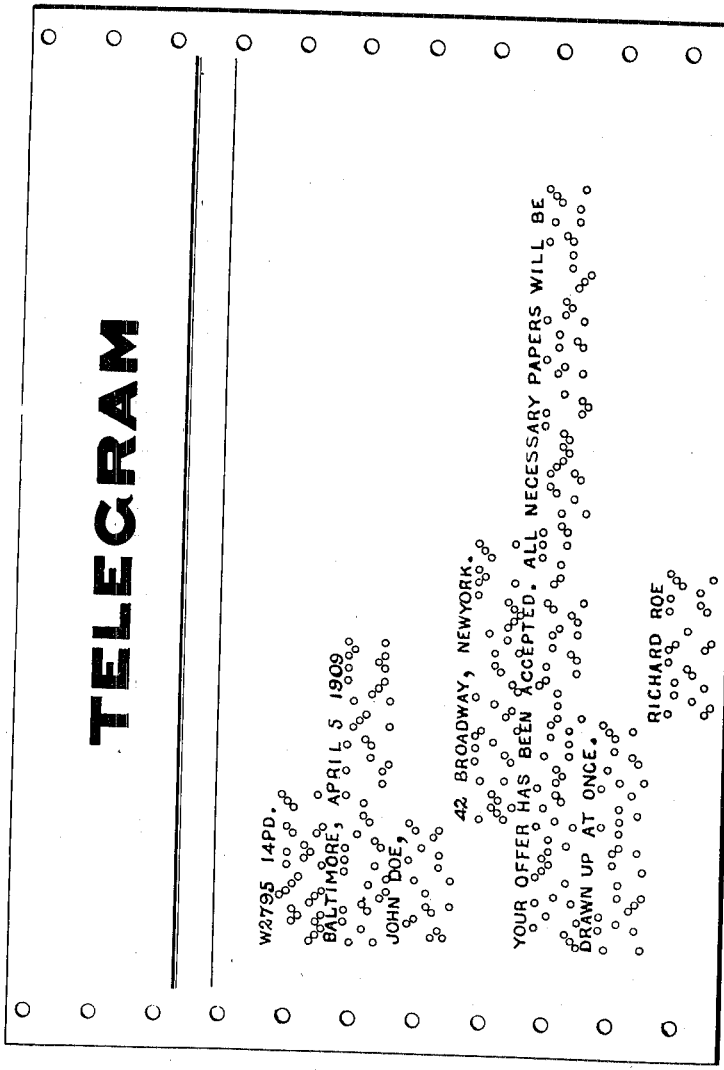
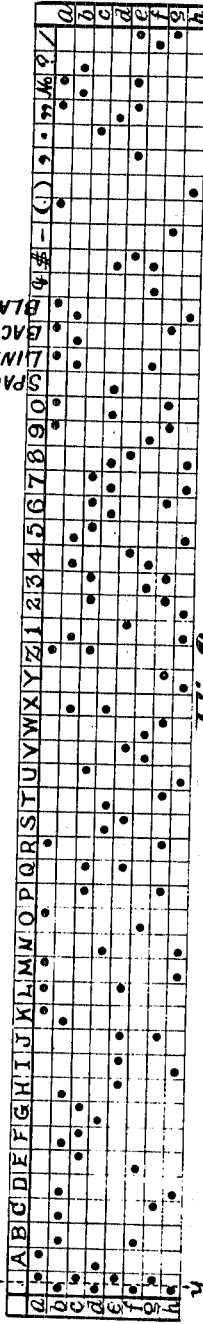

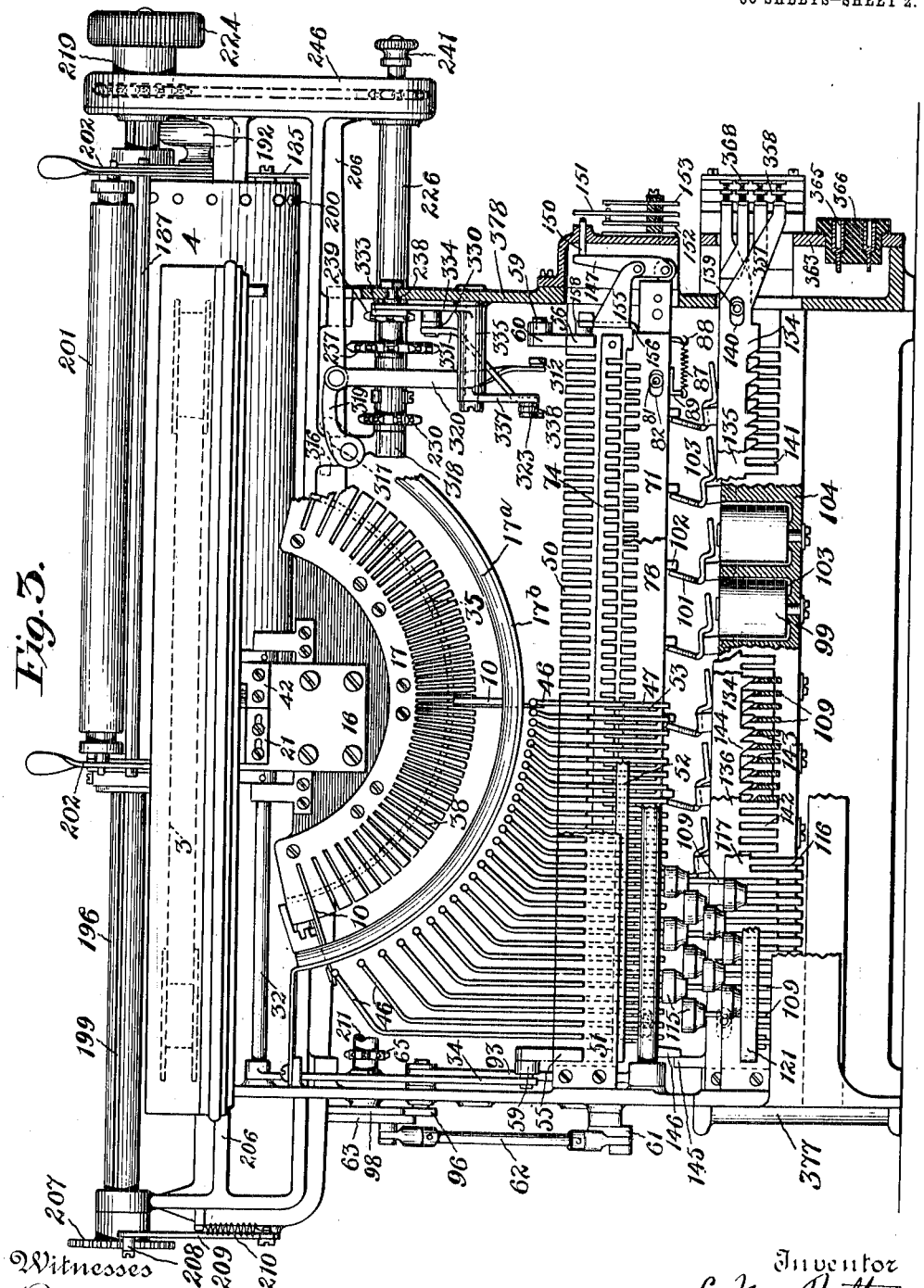

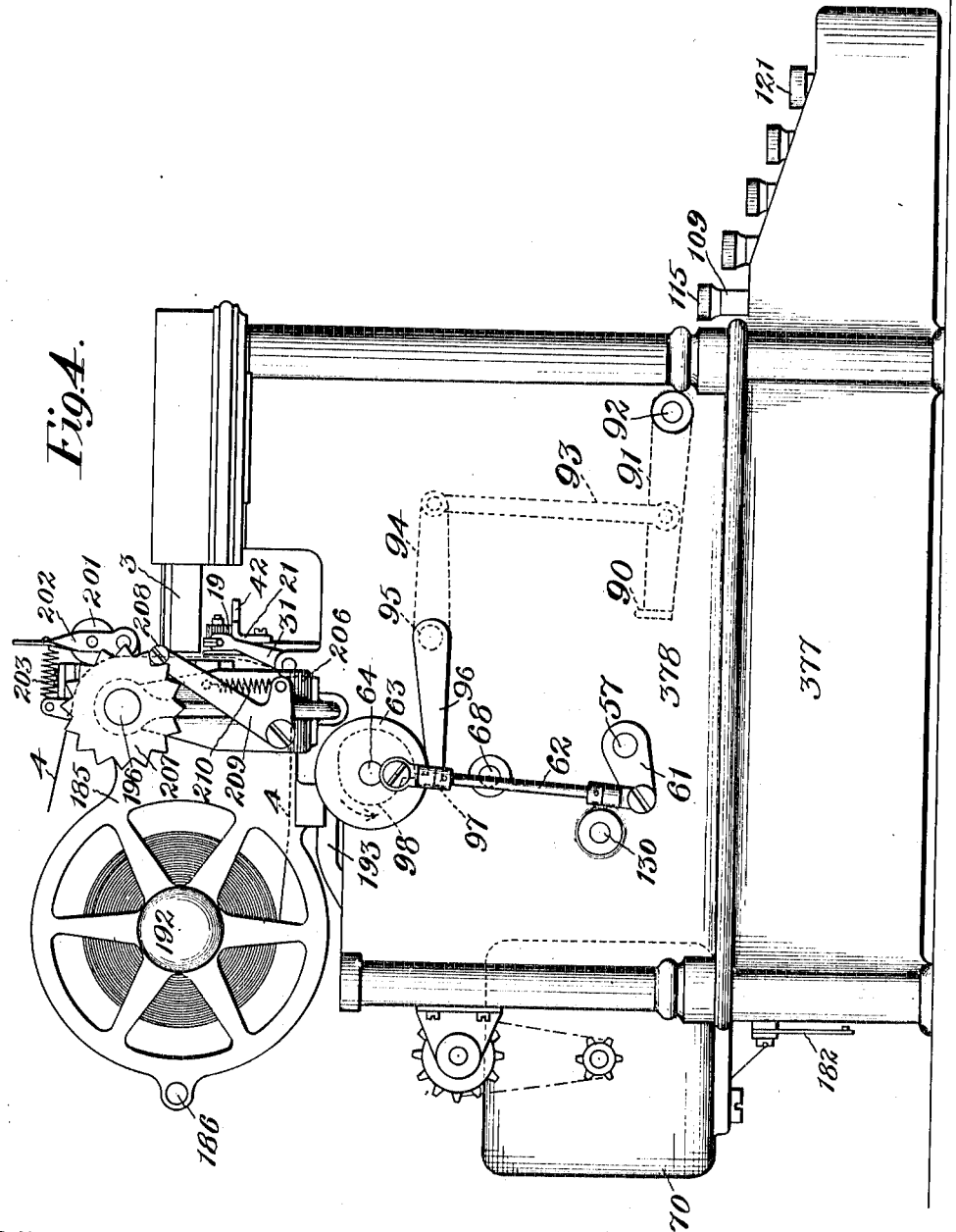

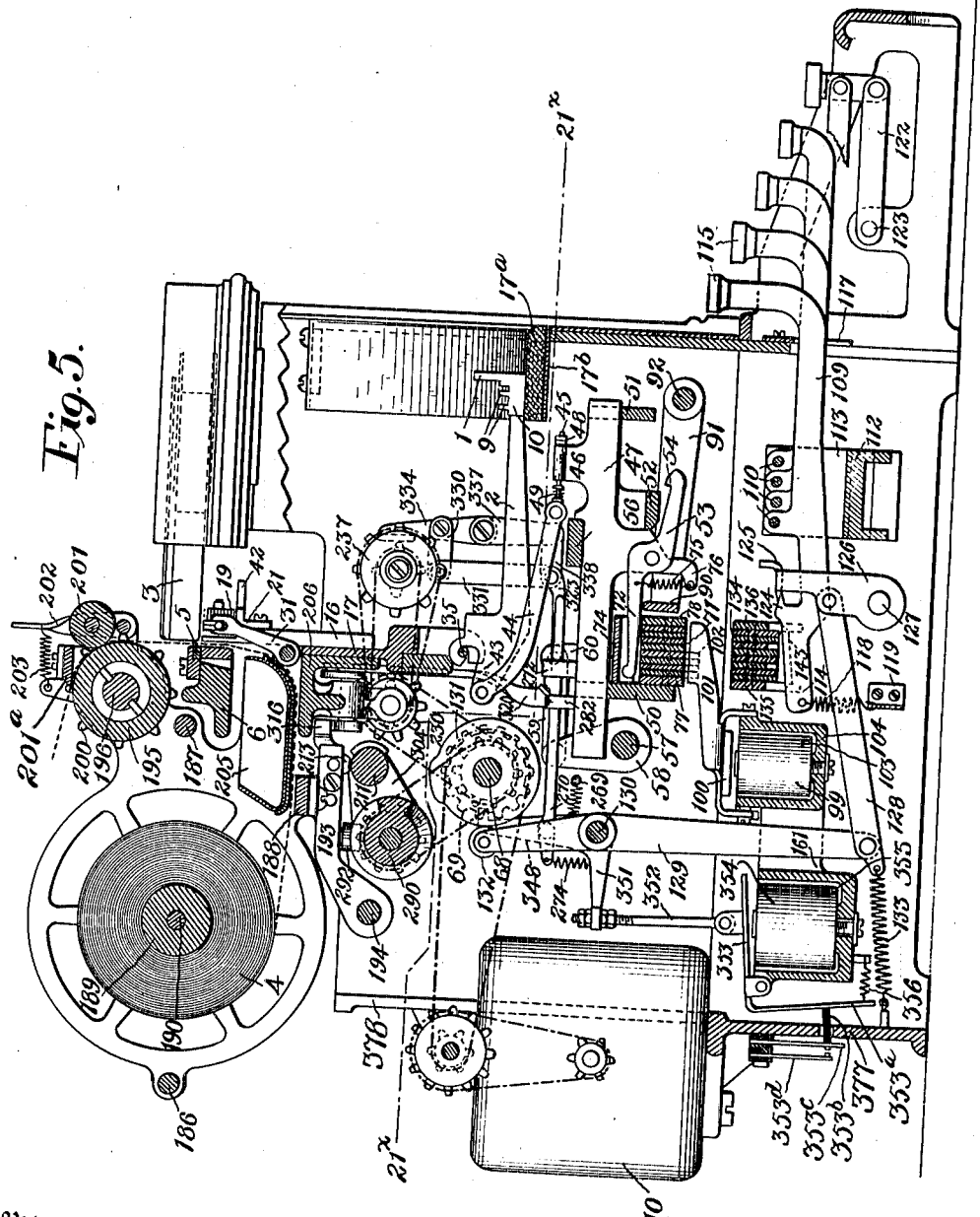

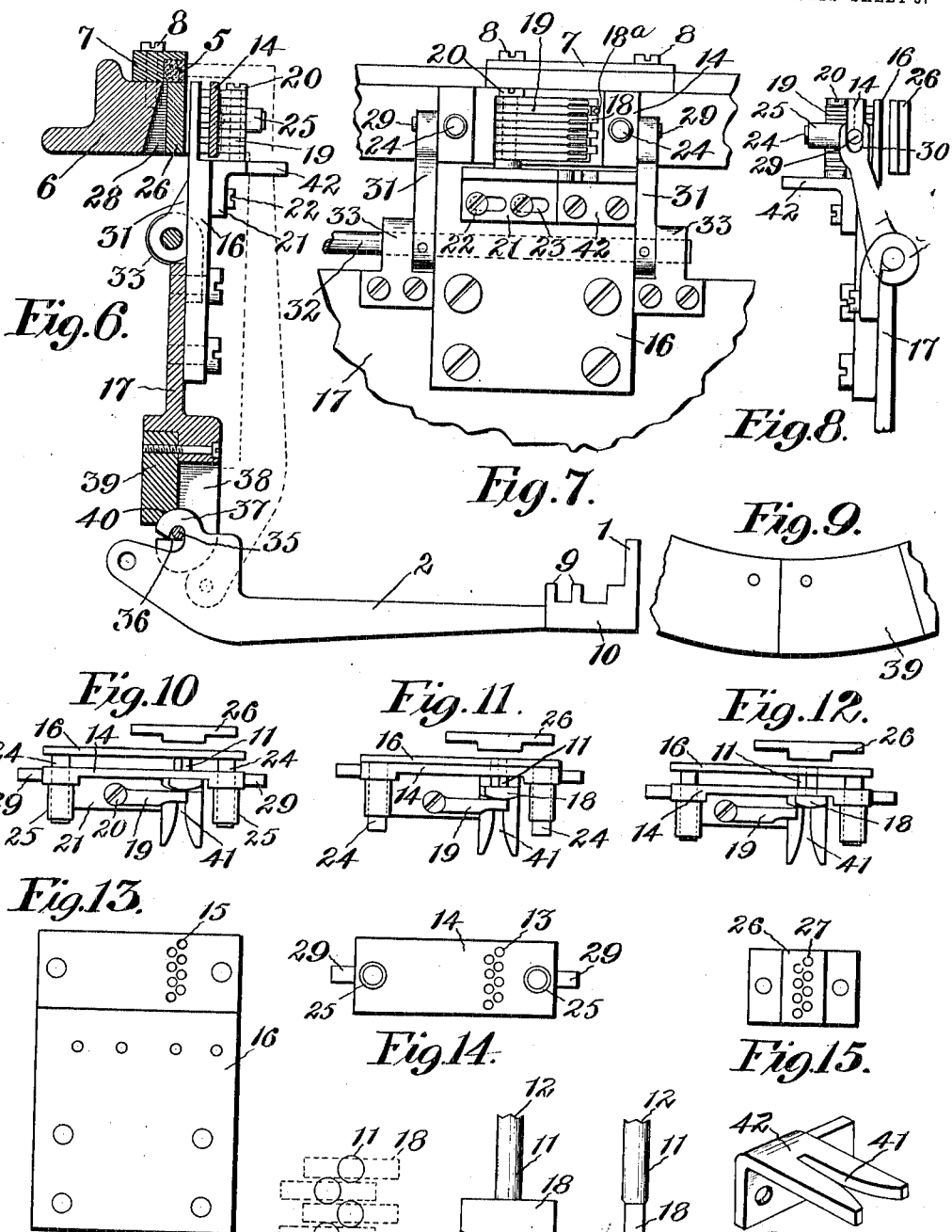

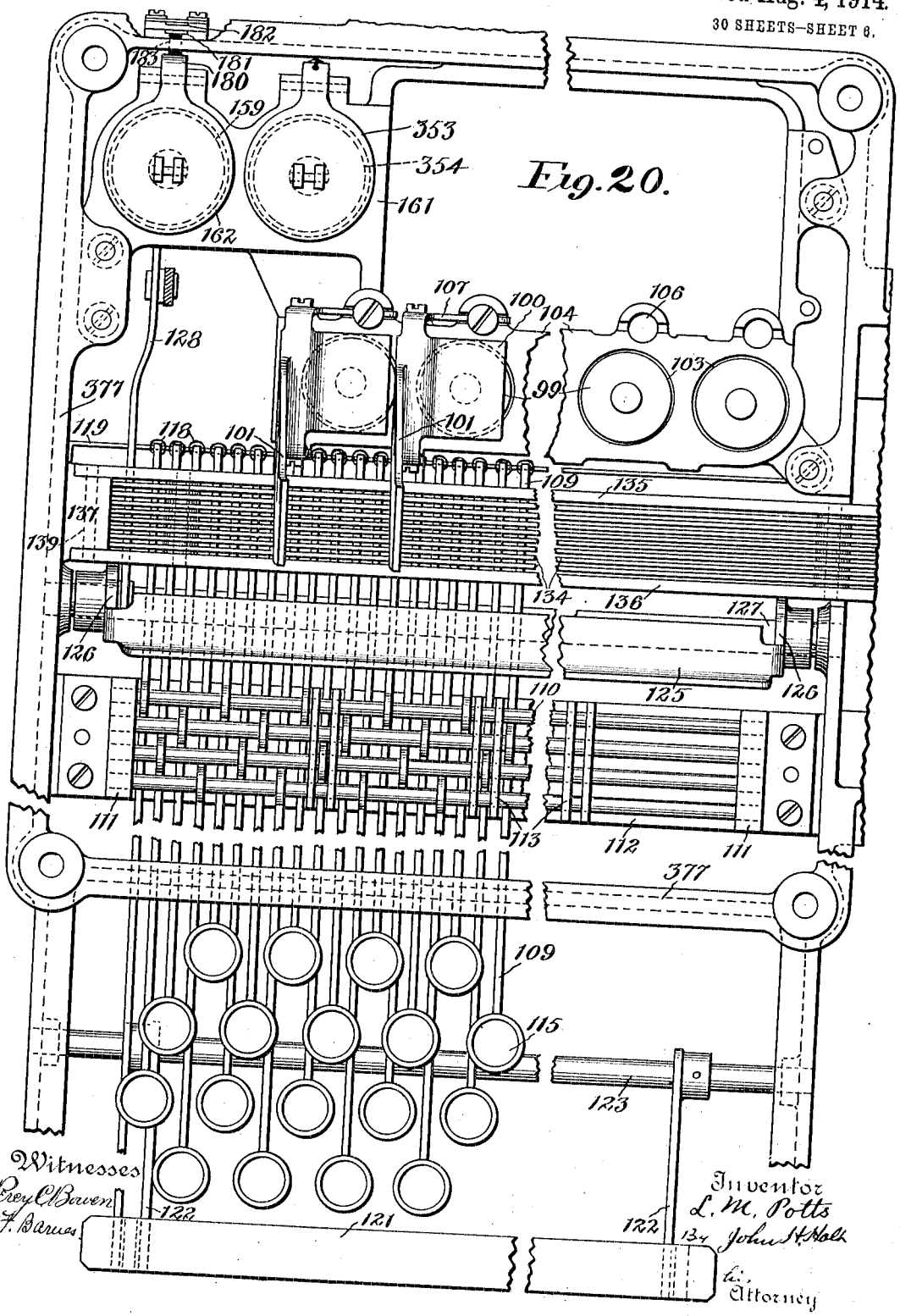

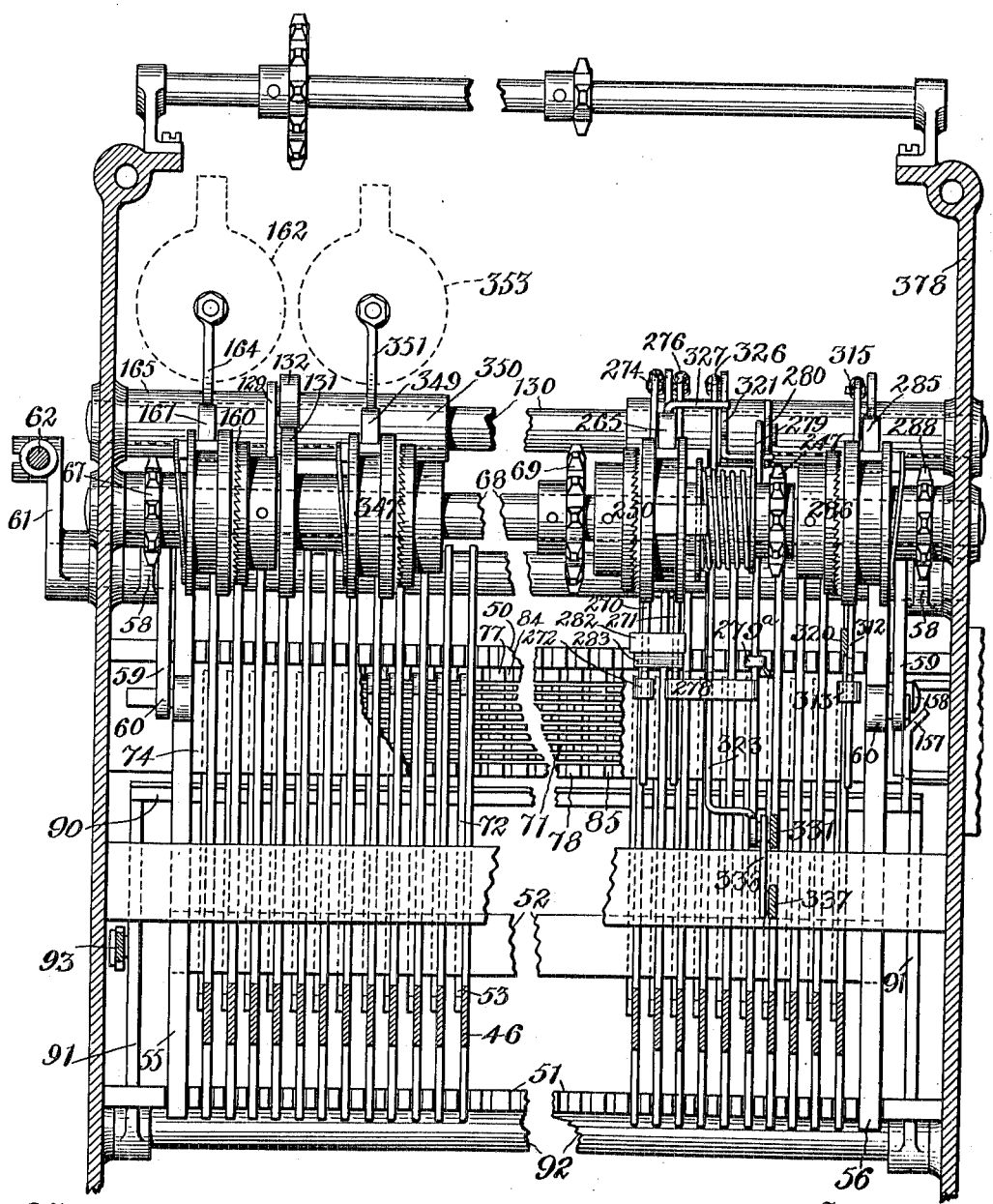

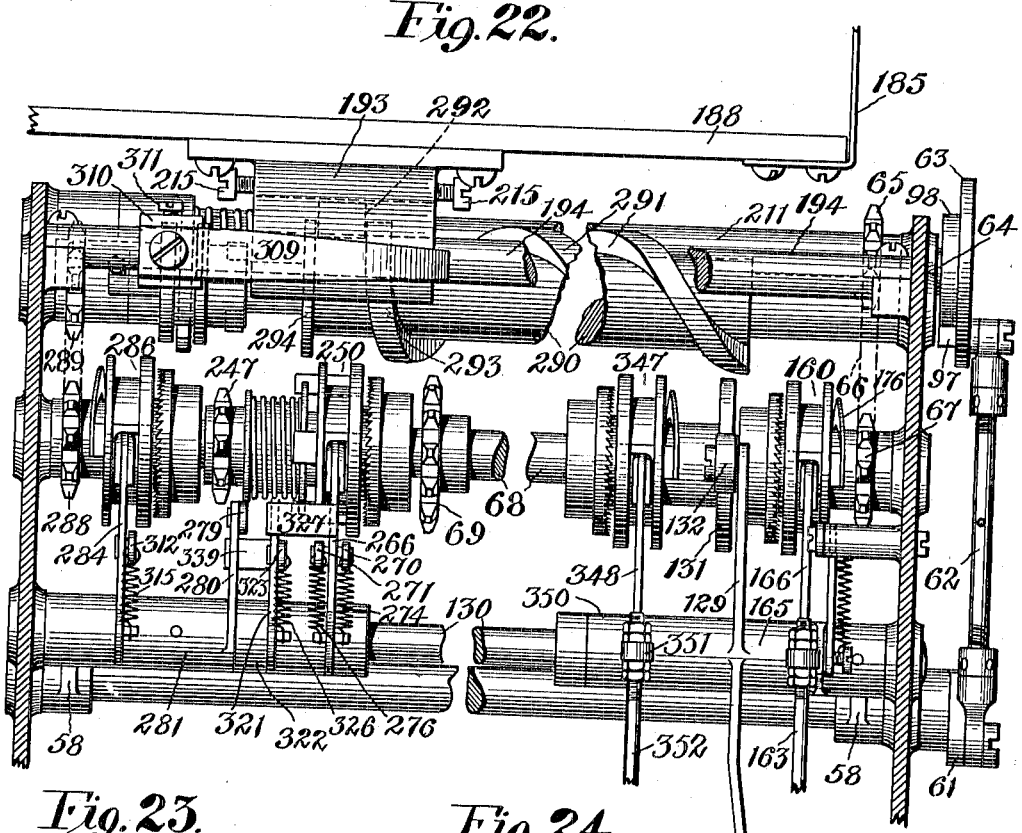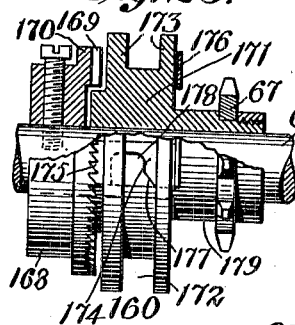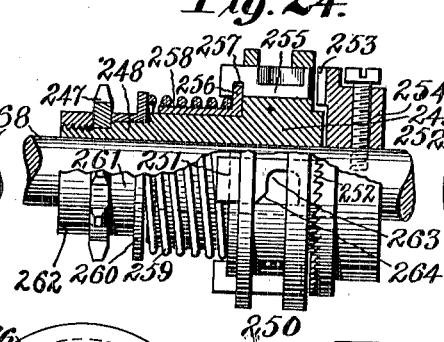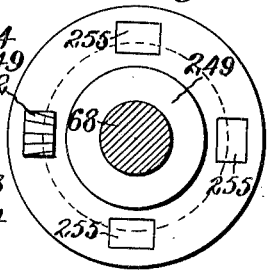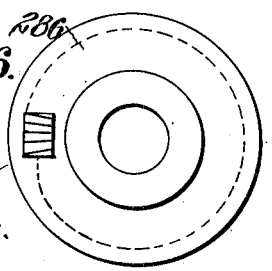

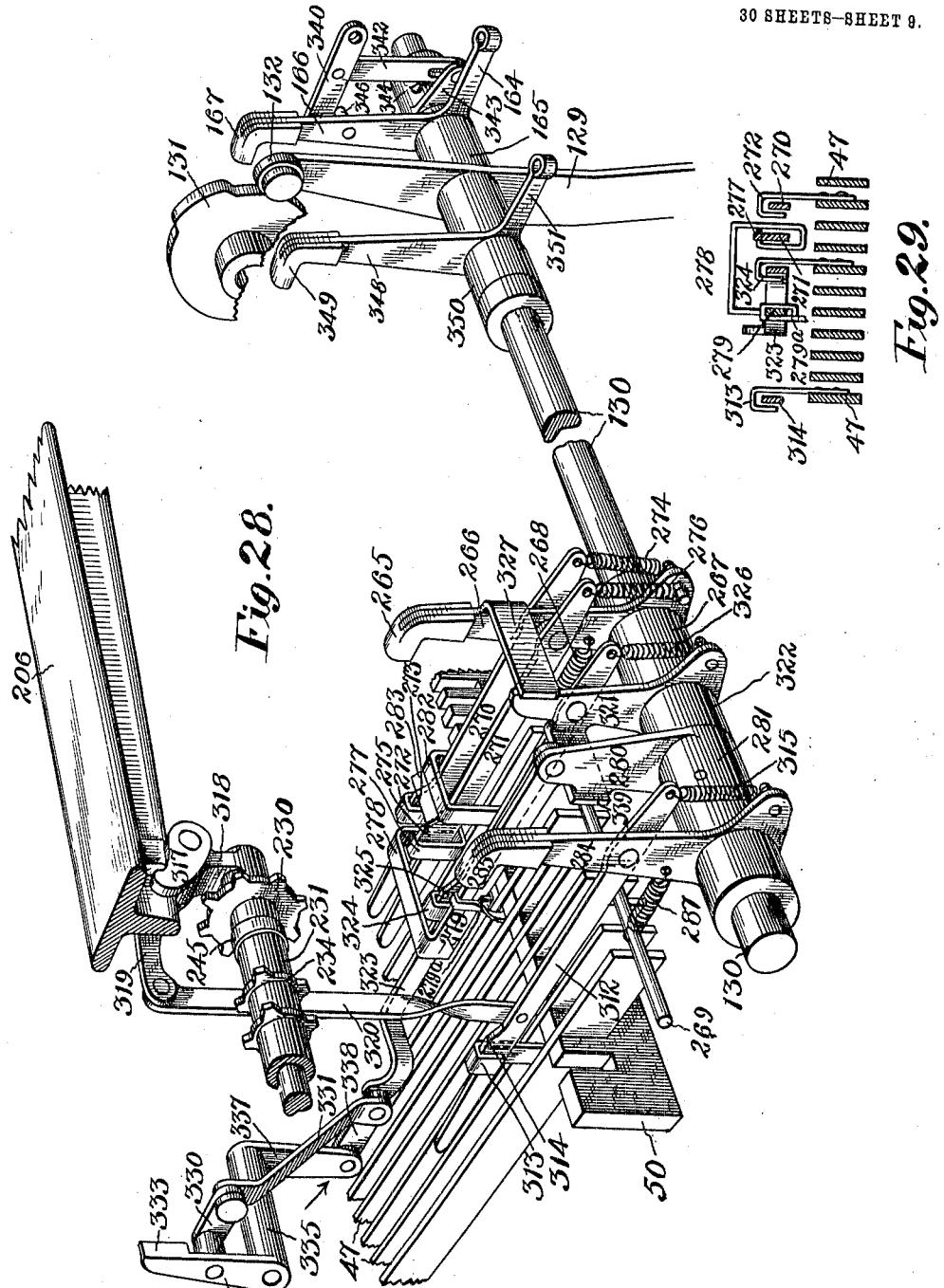

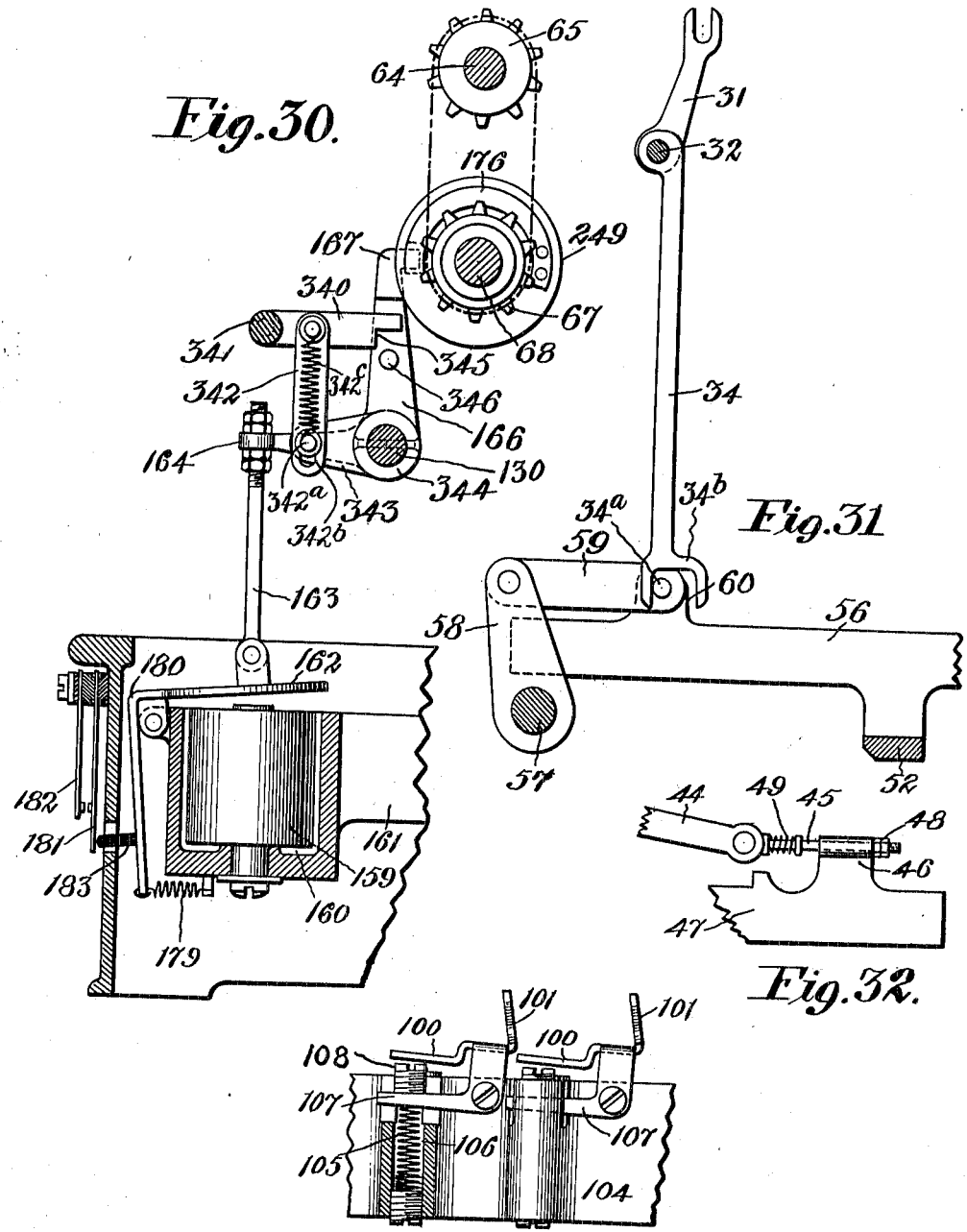

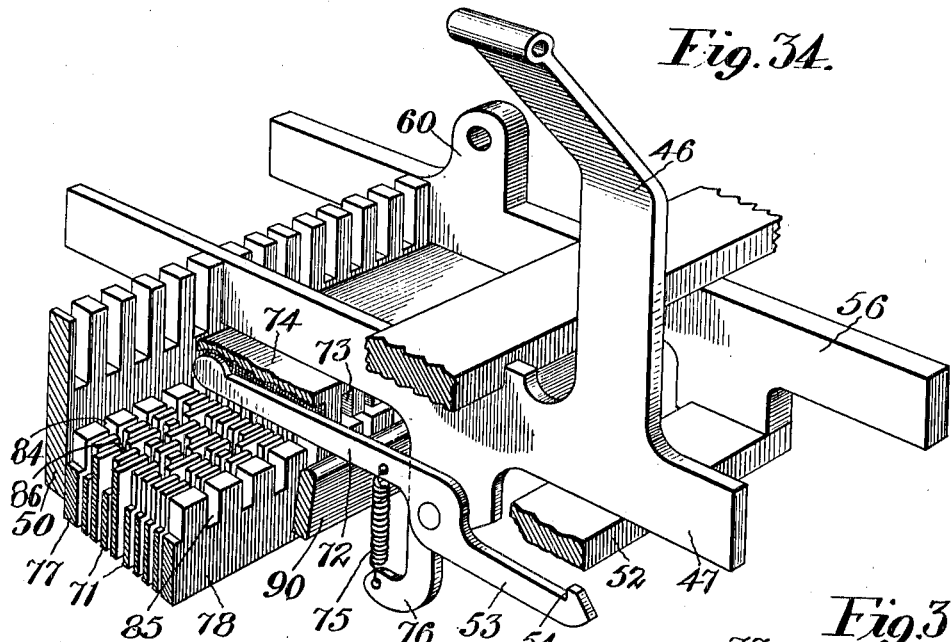

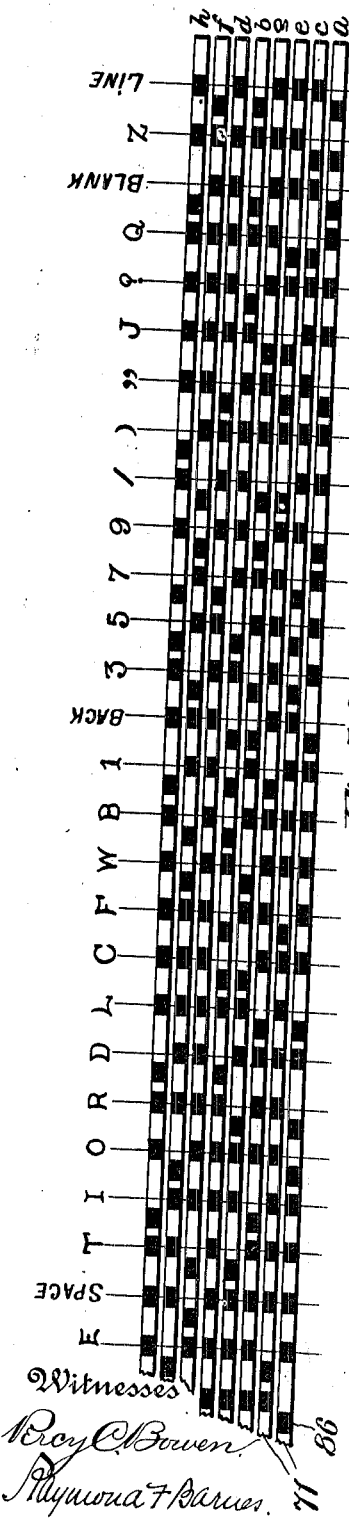
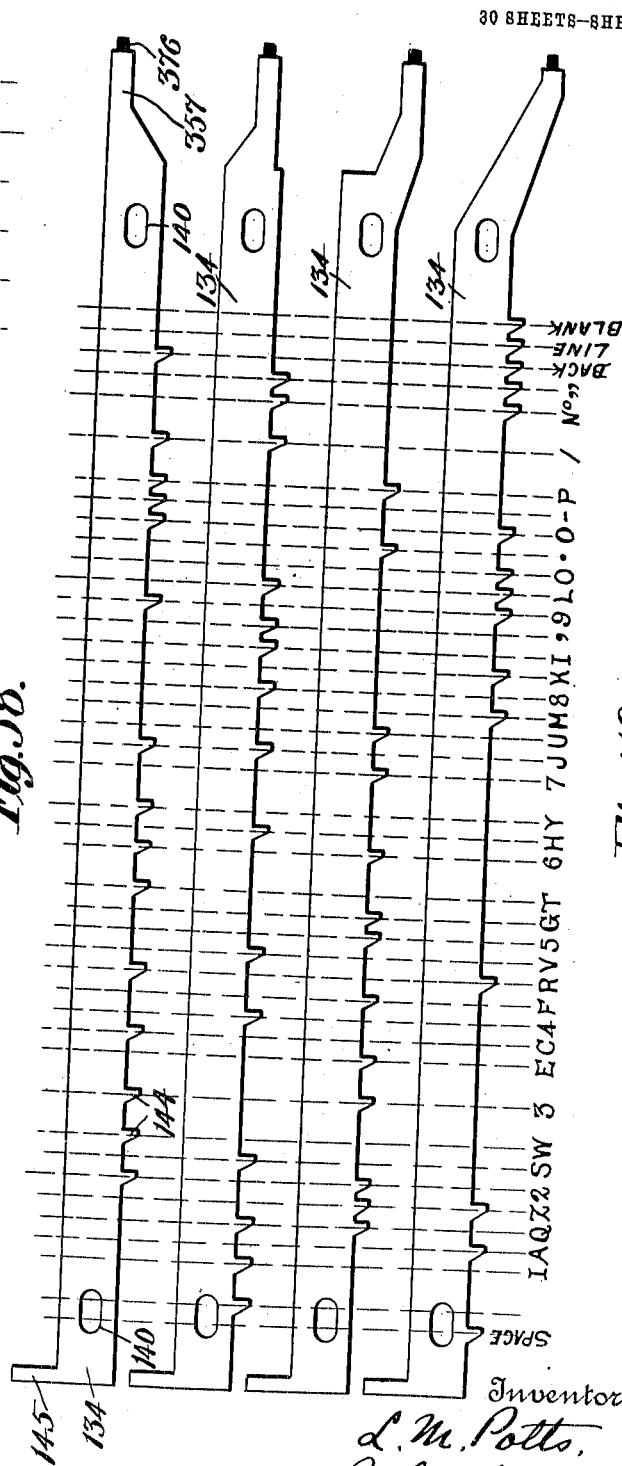

L. M. POTTS.
TELEGRAPHY.
APPLICATION FILED JUNE 17, 1909.

1,105,920.

Patented Aug. 4, 1914.

30 SHEETS—SHEET 14.

Witnesses
Percy C. Bowen
Raymond F. Barnes

Inventor
L. M. Potts,
By John K. Hall
his Attorney.

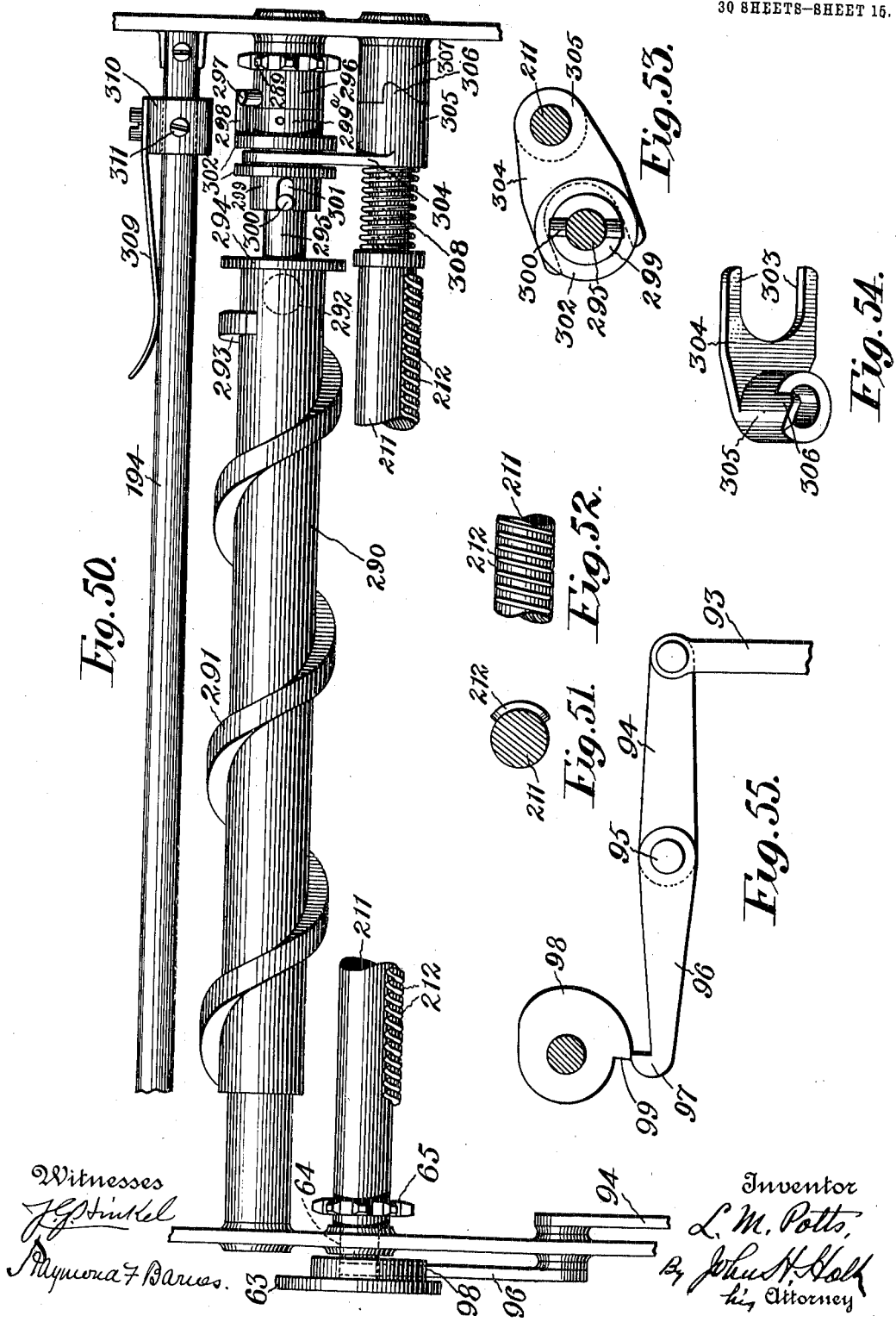

L. M. POTTS.
TELEGRAPHY.
APPLICATION FILED JUNE 17, 1909.
1,105,920.
Patented Aug. 4, 1914.
30 SHEETS—SHEET 16.
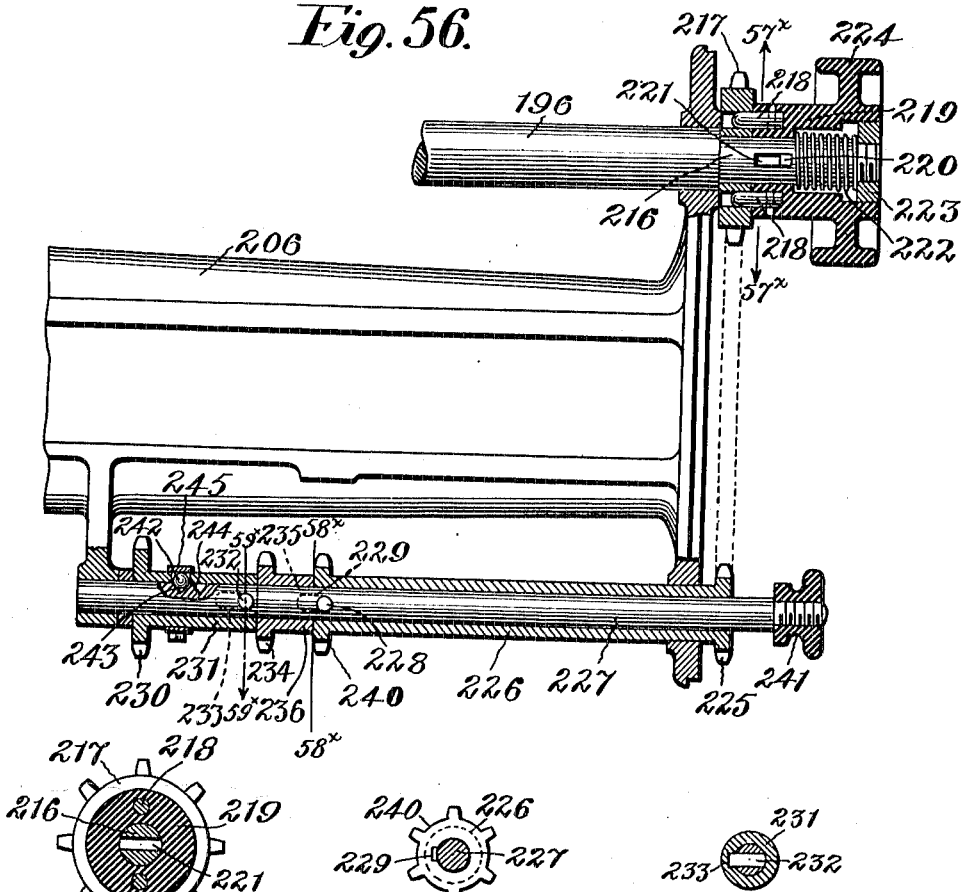
Fig. 56.
Fig. 57.   Fig. 58.   Fig. 59.
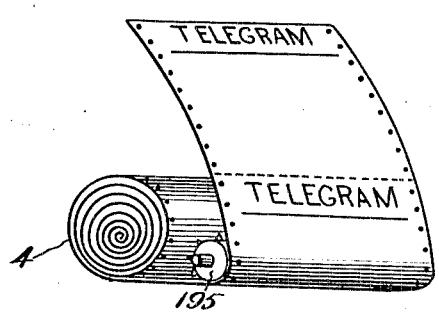
Fig. 60.
Witnesses
J. G. Hinkel
Raymond F. Barnes.
Inventor
L. M. Potts
By John H. Holt,
his Attorney.

L. M. POTTS.
TELEGRAPHY.
APPLICATION FILED JUNE 17, 1909.

1,105,920.

Patented Aug. 4, 1914.
30 SHEETS—SHEET 17.

Witnesses
Percy C. Bowen
Raymond F. Barnes.

Inventor
L. M. Potts
By John N. Holt
his Attorney

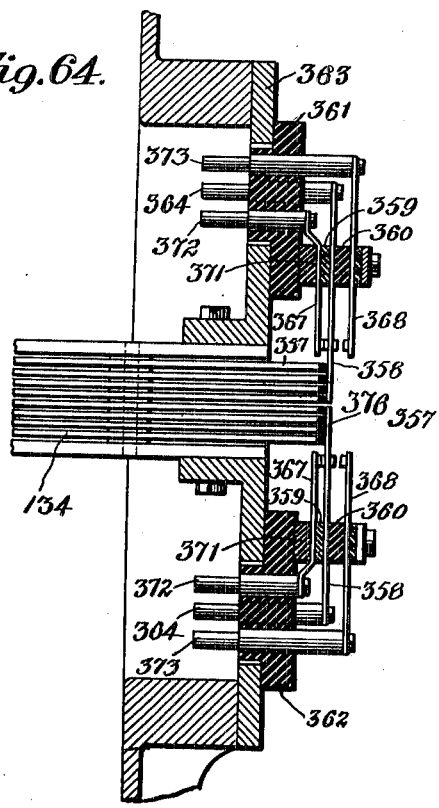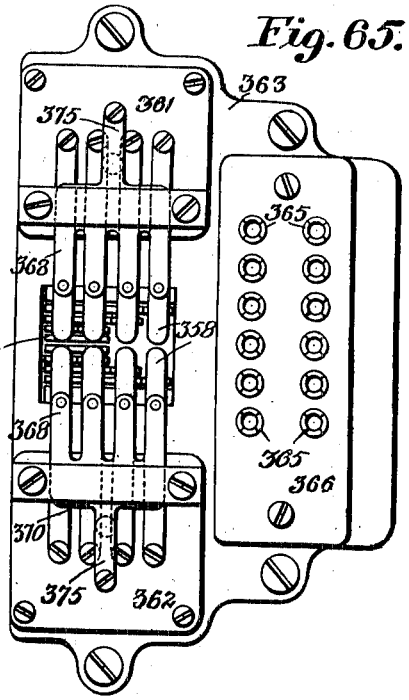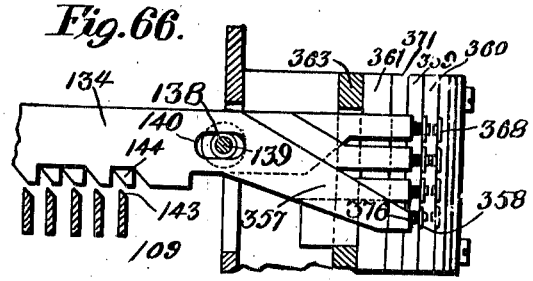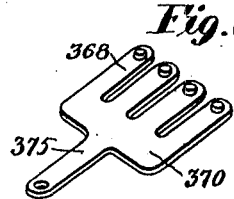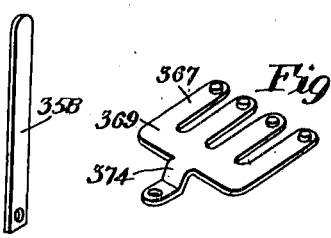

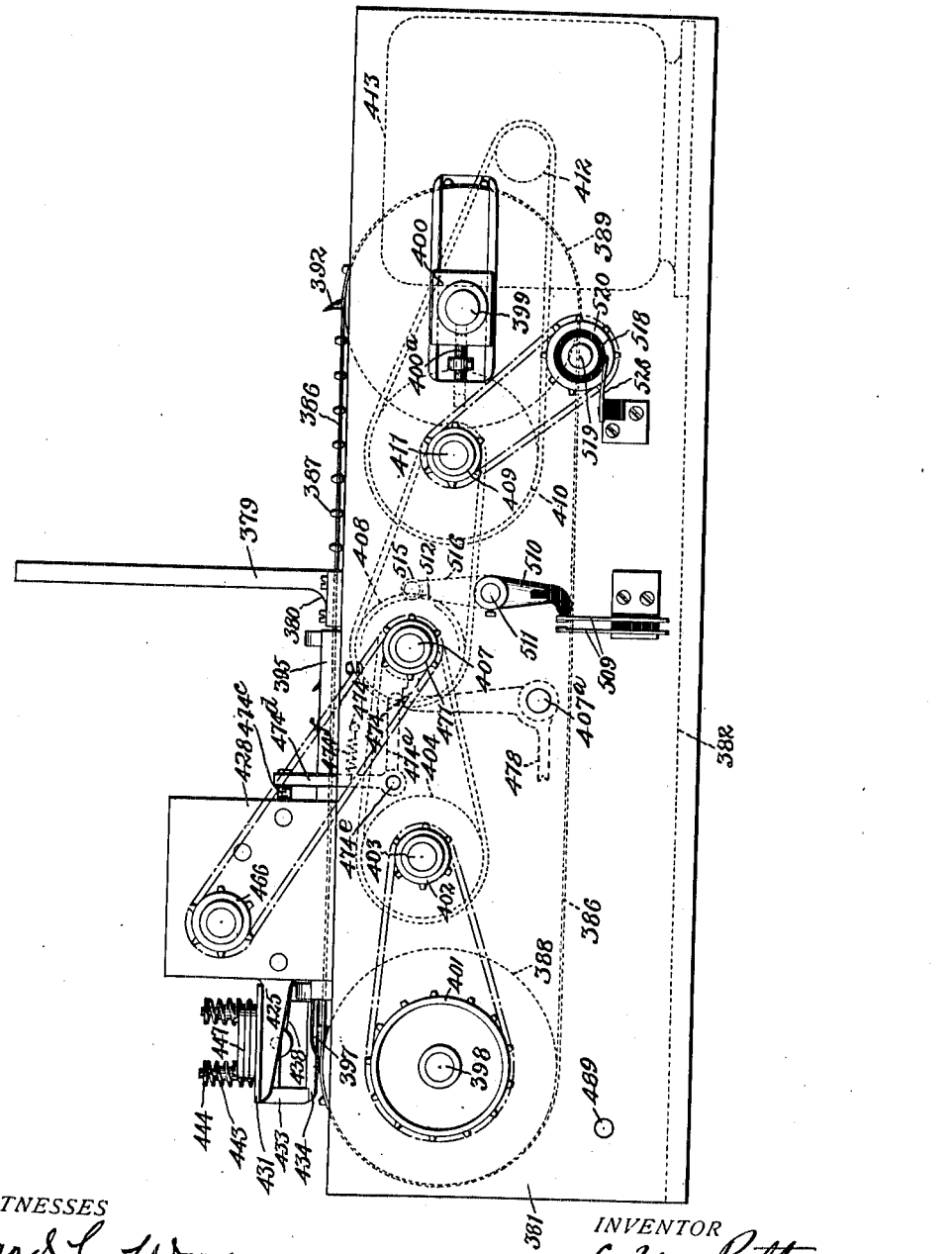

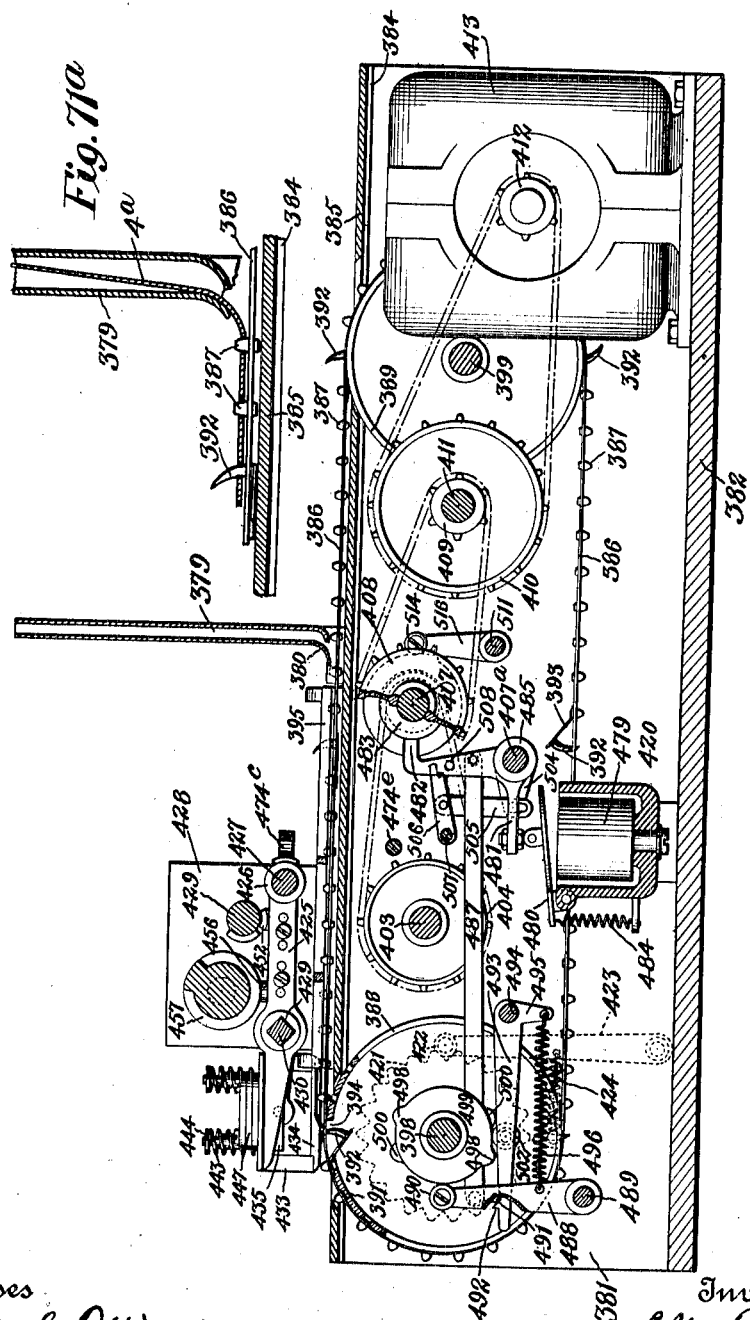

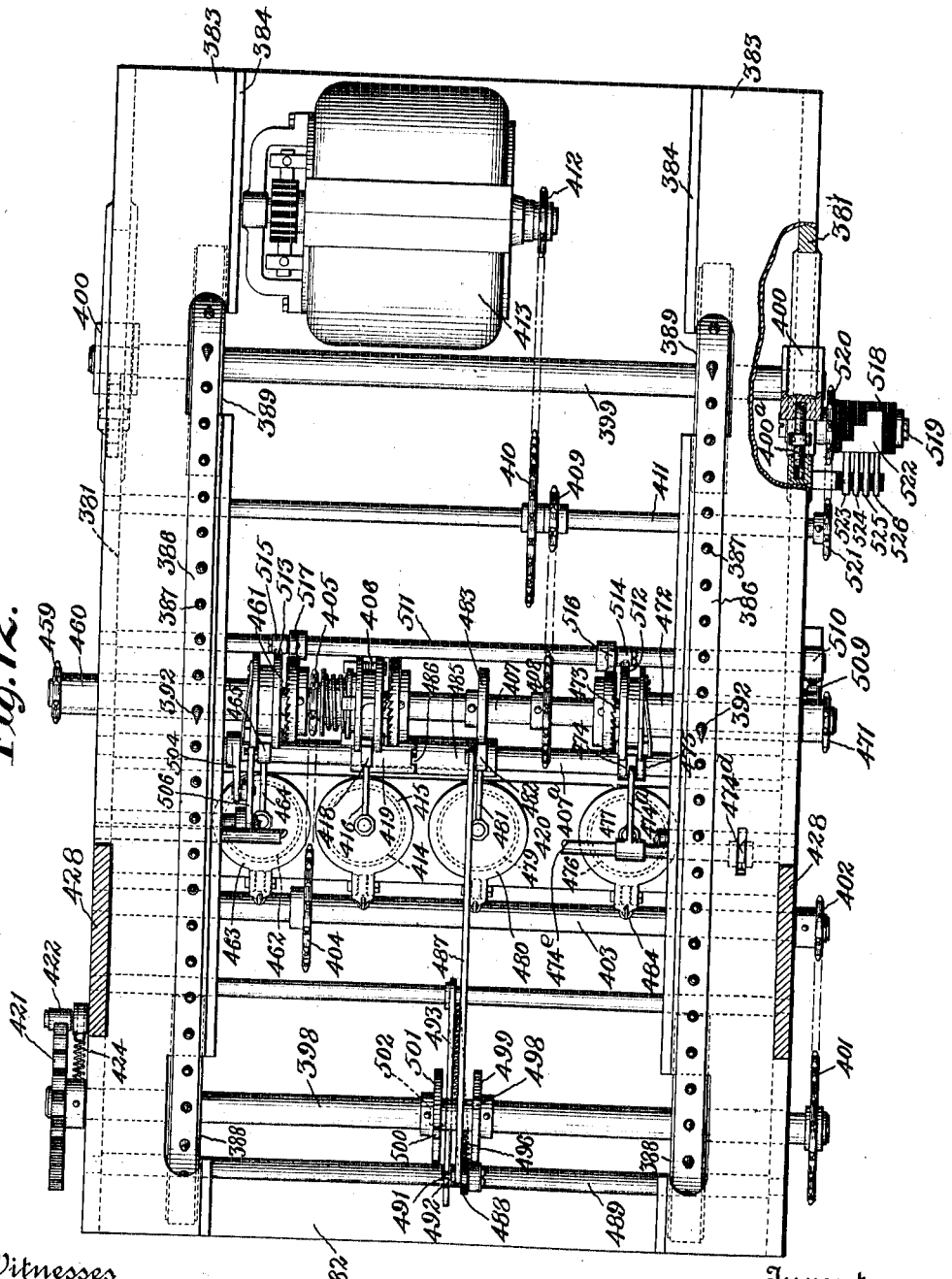

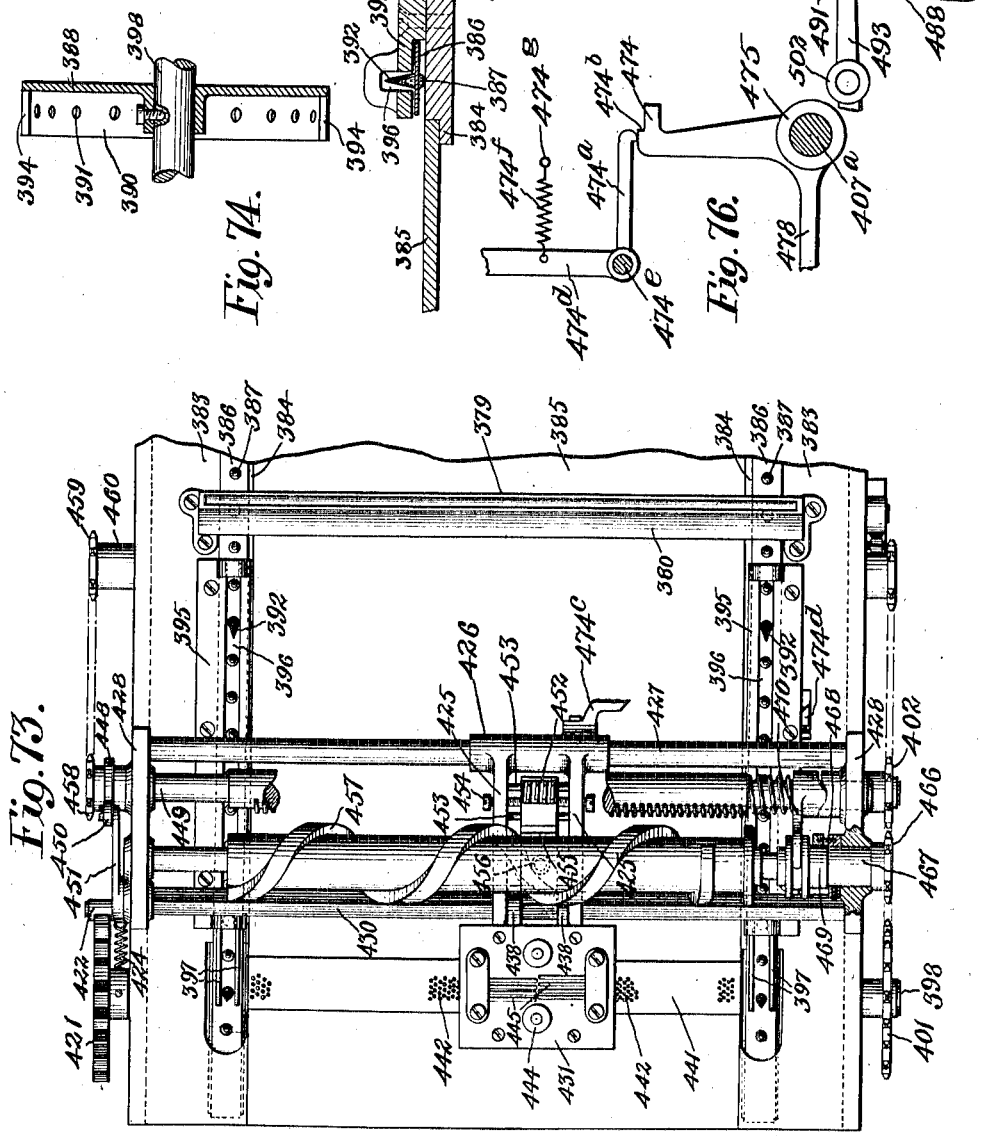
L. M. POTTS.
TELEGRAPHY.
APPLICATION FILED JUNE 17, 1909.
1,105,920.
Patented Aug. 4, 1914.
30 SHEETS—SHEET 22.
Witnesses
Edward C. Wade
John A. Murphy
Inventor
L. M. Potts,
By John H. Holt
his Attorney L. M. POTTS.
TELEGRAPHY.
APPLICATION FILED JUNE 17, 1909.
1,105,920.
Patented Aug. 4, 1914.
30 SHEETS—SHEET 23.
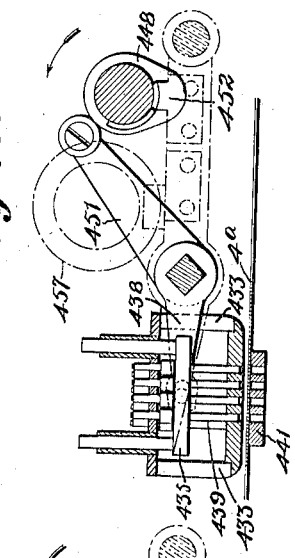
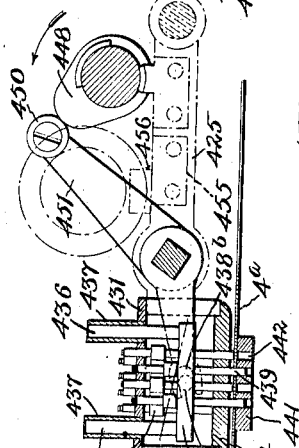
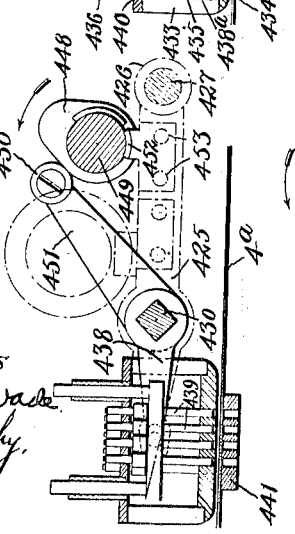
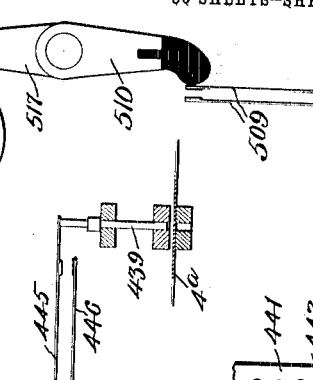
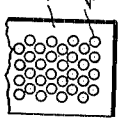
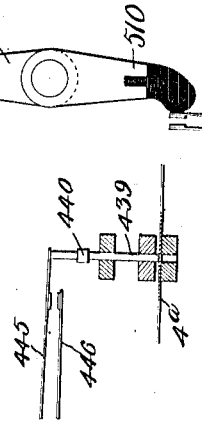
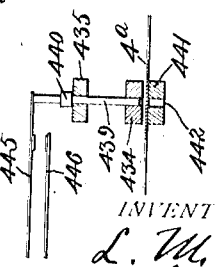

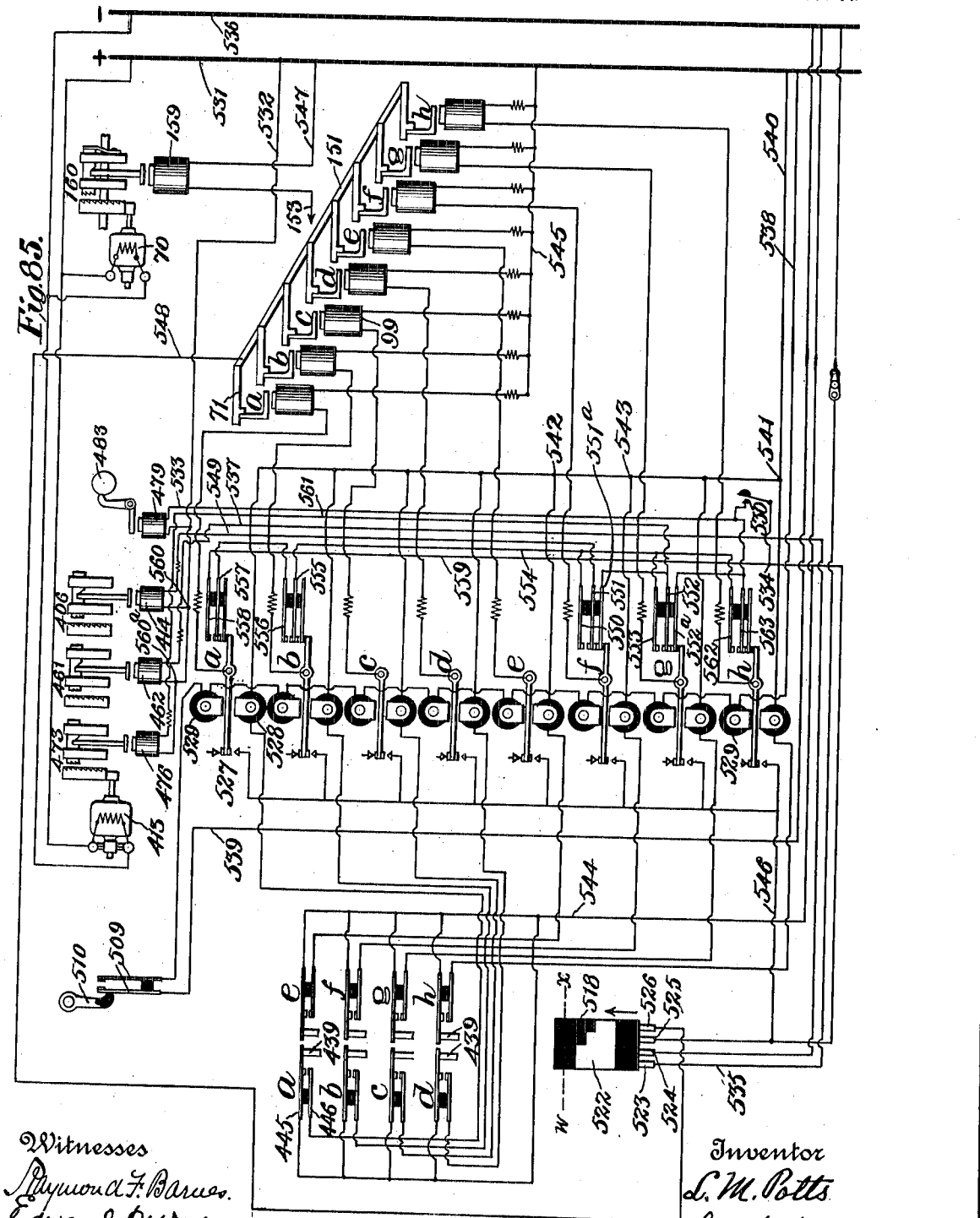

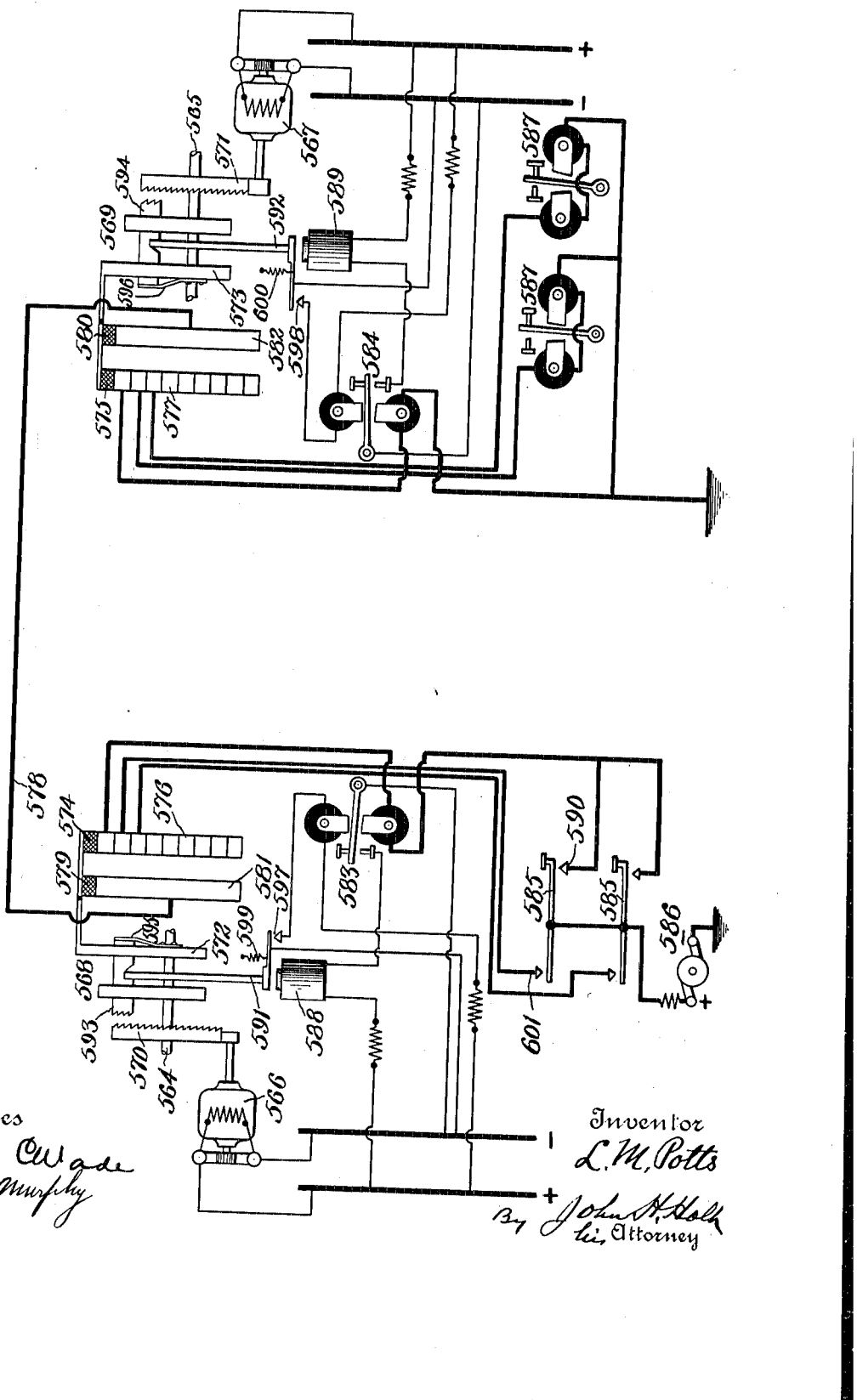

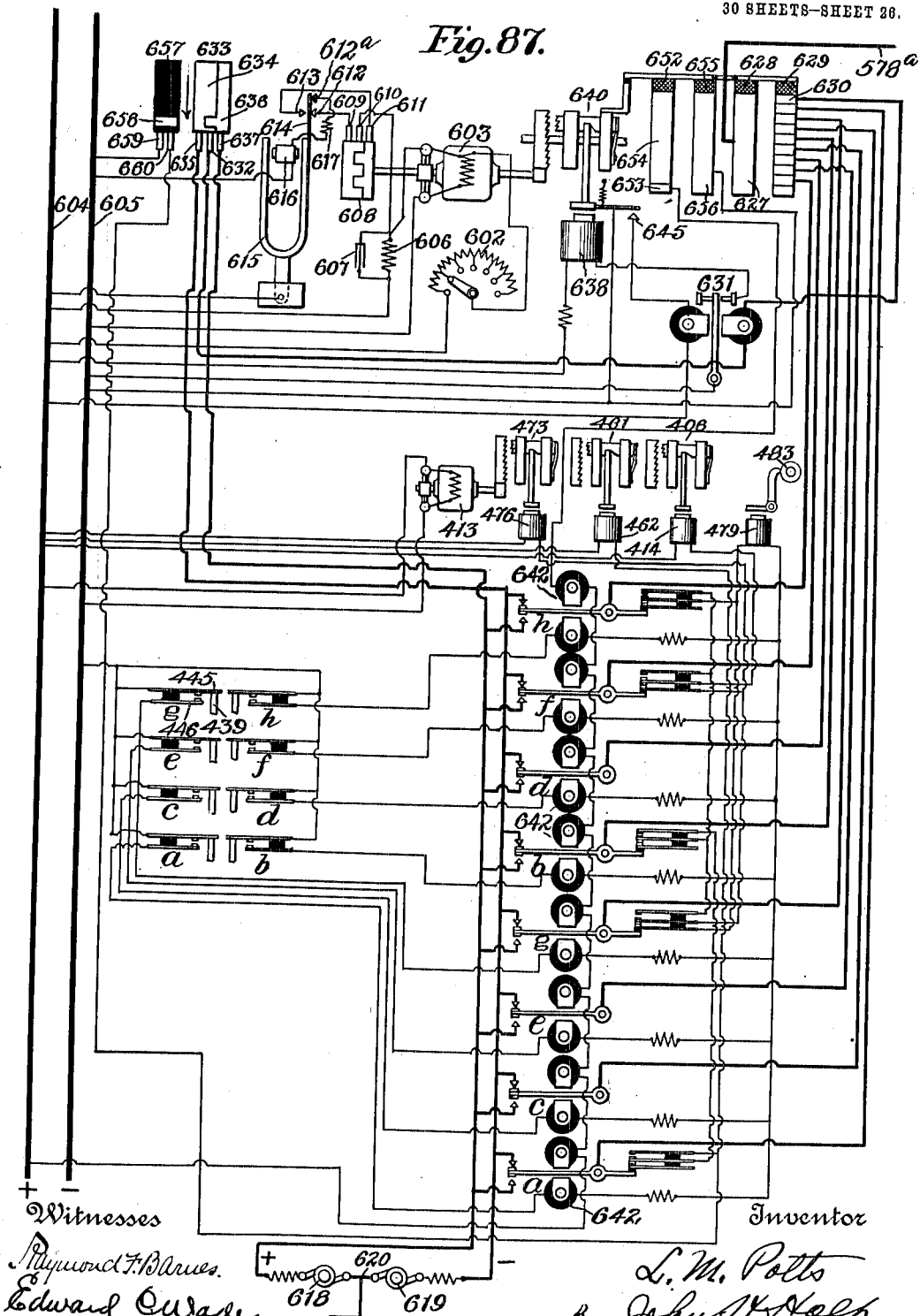

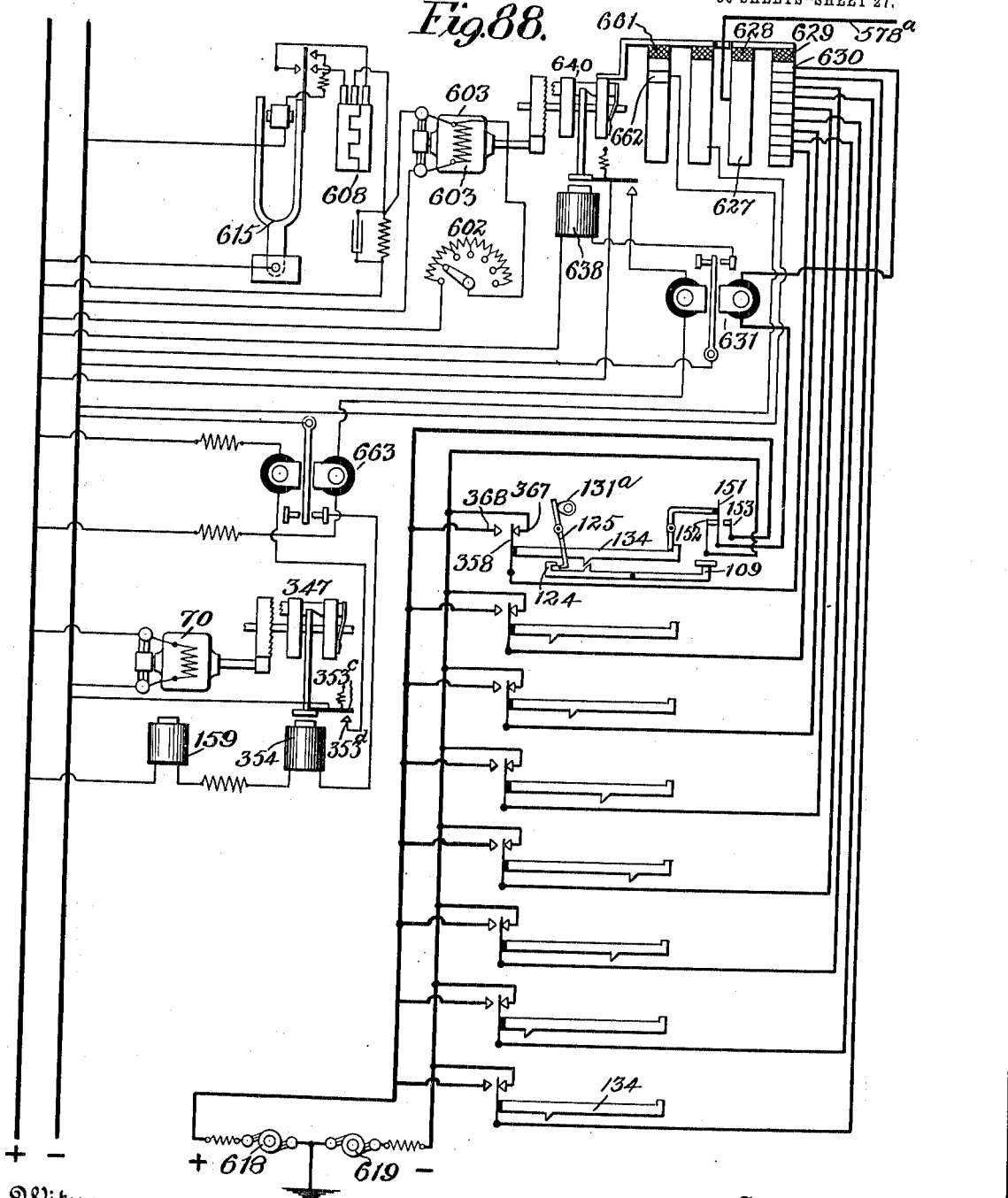

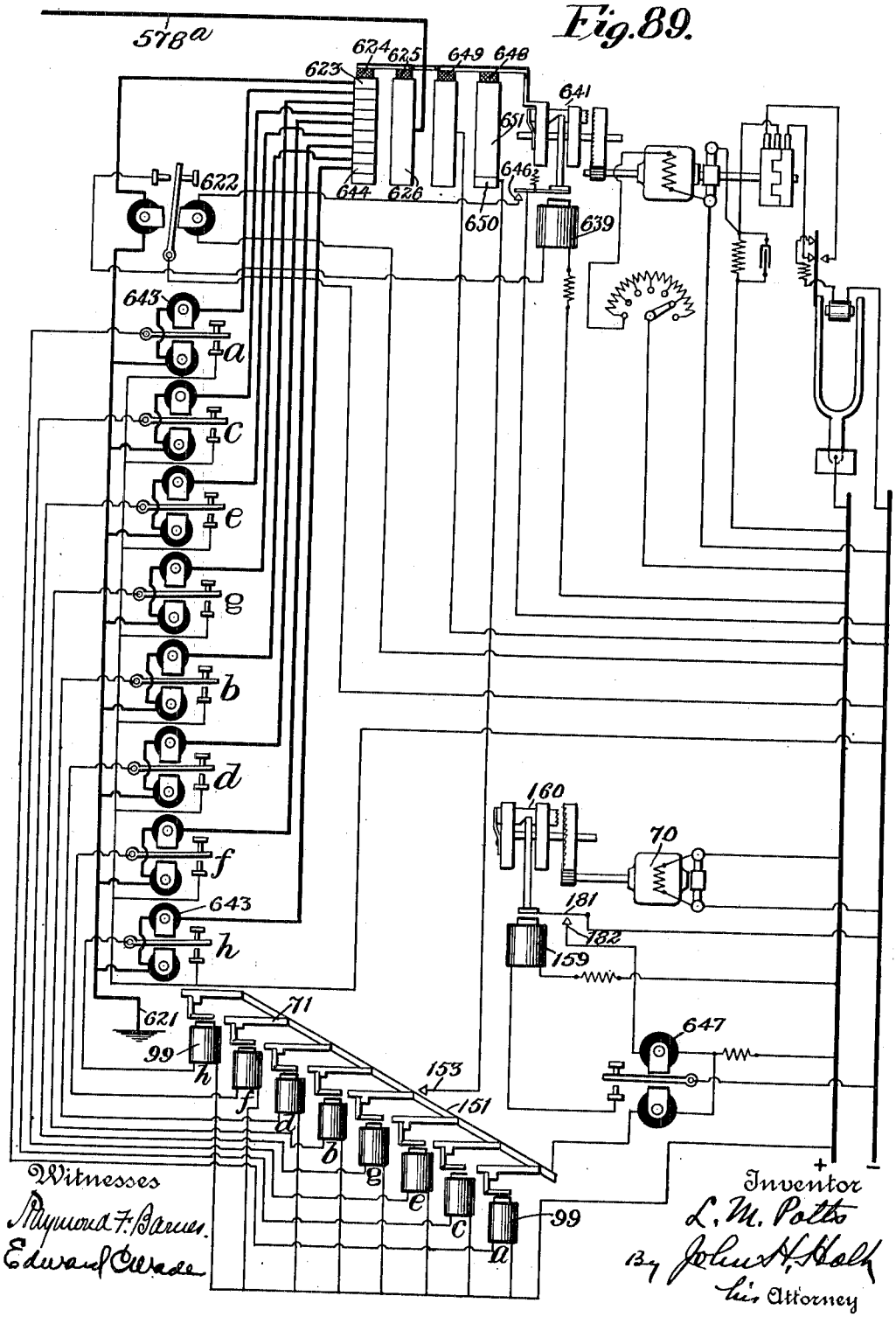

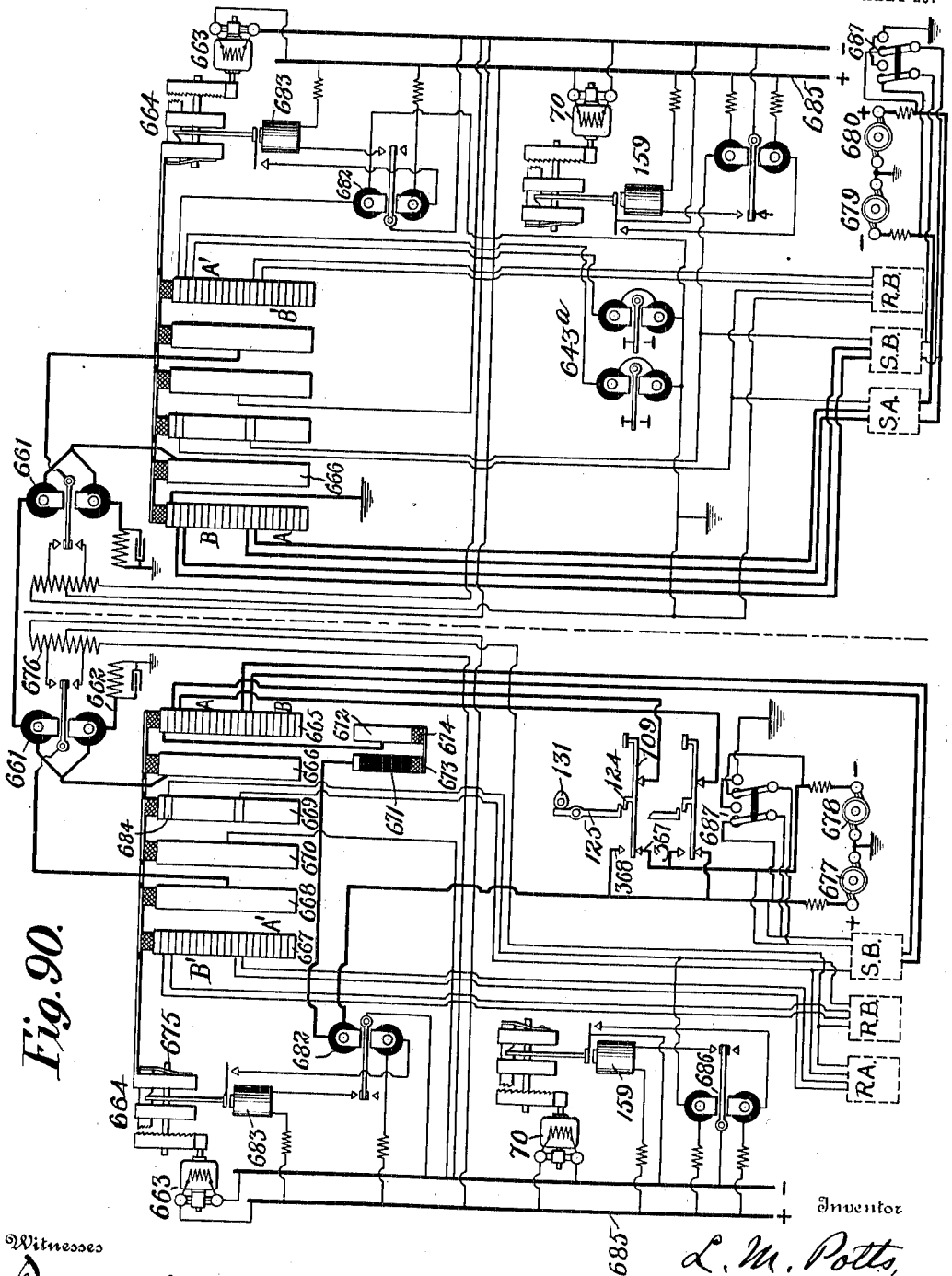

L. M. POTTS.
TELEGRAPHY.
APPLICATION FILED JUNE 17, 1909.

1,105,920.

Patented Aug. 4, 1914.
30 SHEETS—SHEET 30.

Witnesses
Edward Wade
John A. Murphy

Inventor
L. M. Potts,
By John H. Holt
his Attorney

UNITED STATES PATENT OFFICE.

LOUIS MAXWELL POTTS, OF BALTIMORE, MARYLAND, ASSIGNOR, BY MESNE ASSIGNMENTS, TO AUSTIN McLANAHAN, OF BALTIMORE, MARYLAND.

TELEGRAPHY.

1,105,920.

Specification of Letters Patent.

Patented Aug. 4, 1914.

Application filed June 17, 1909. Serial No. 502,785.

*To all whom it may concern:*

Be it known that I, LOUIS MAXWELL POTTS, a citizen of the United States, residing at Baltimore city, State of Maryland, have invented certain new and useful Improvements in Telegraphy, of which the following is a specification.

The system and apparatus now about to be described was devised primarily for the purpose of supplying a flexible system of telegraphy capable of meeting present day commercial demands.

With the above objects in view, the present invention embodies a novel form of telegraphic receiver, operable either automatically or manually, the combination of this receiver with a transmitter broadly, the combination of this receiver with an automatic transmitter, a recorder operable either from a distance electrically or locally manually, certain improvements in line transmission, and other features, all of which will be more particularly pointed out in the accompanying claims.

The automatic transmitter *per se* here shown and described, forms the subject of U. S. Patent No. 1,060,939, granted on a division of the present application; the combined receiver and manual transmitter, as such, and certain line operation features, here shown and described, in so far as they relate to manual transmission, form the subject of another division of the present application, and the perforator *per se* considered, broadly as a perforating machine alone, whether used in connection with telegraphy or not, forms the subject of another division of the present application.

Since all the claims in this case are not limited to automatic transmission, but cover both automatic as well as manual transmission, both forms will be described.

Figure 44:
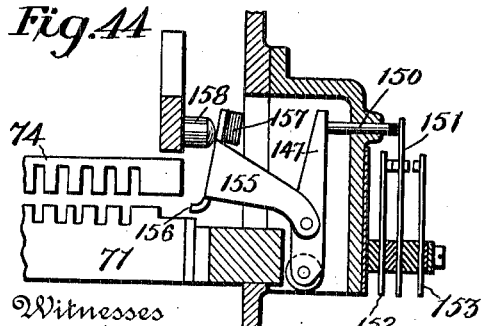
Figure 45:
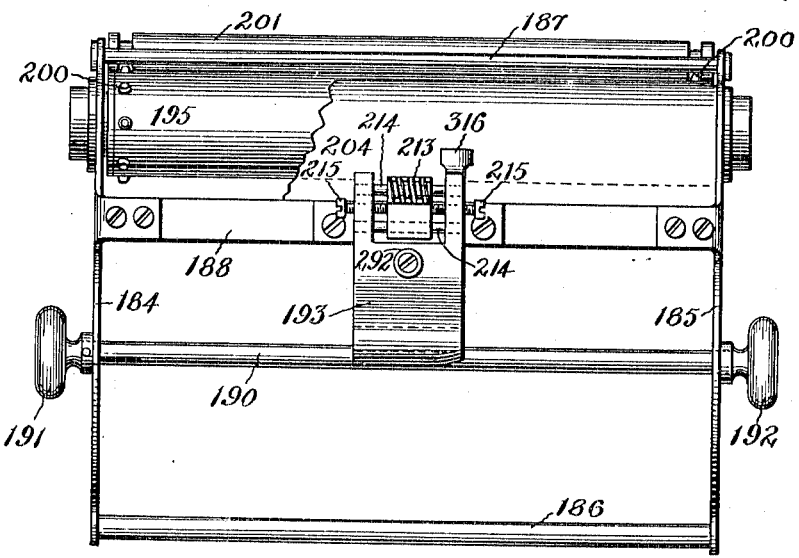
Figure 46:
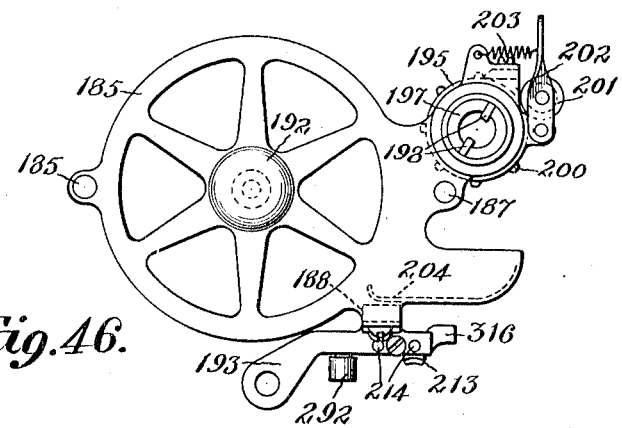
Figures 47, 48, 49:
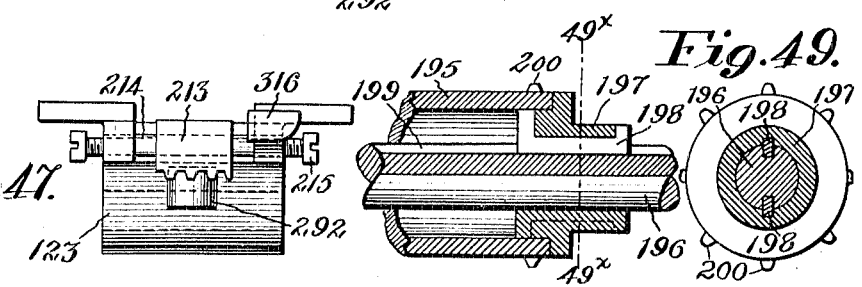
Figure 61:
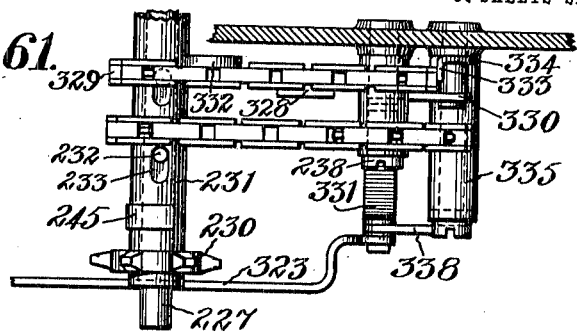
Figure 62:
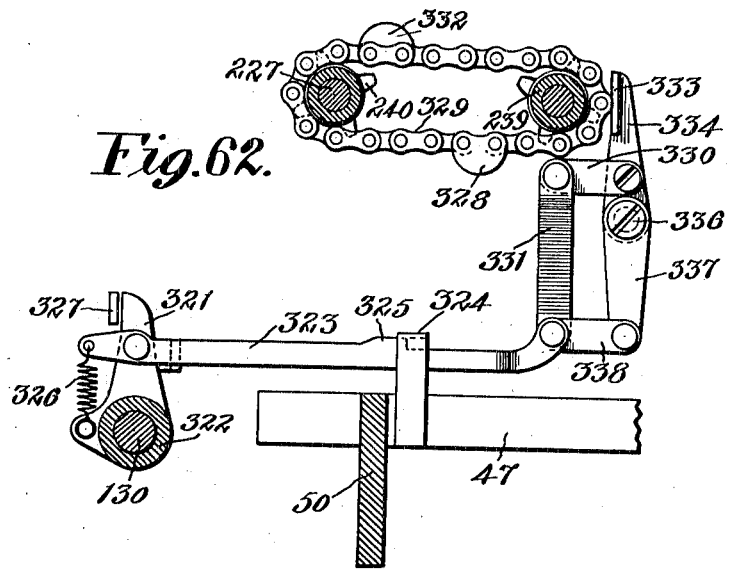
Figure 63:
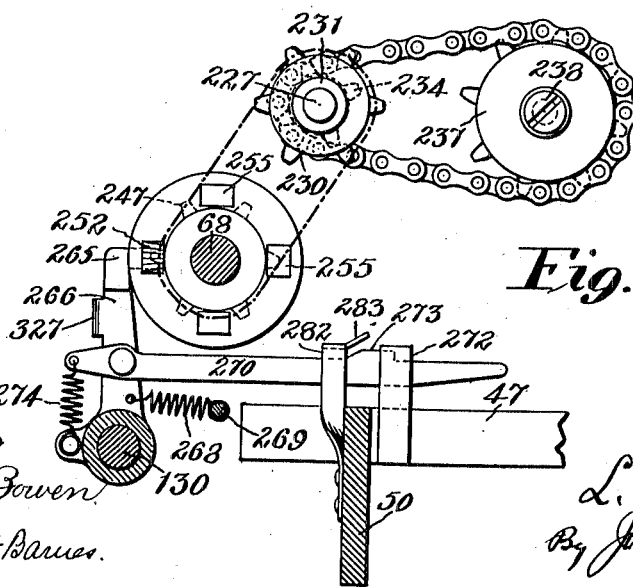

In order to more fully describe this invention, reference will be had to the accompanying drawings which form a part of this specification, and wherein, Figure 1 is a front view of one of the combined printed telegrams and blanks for automatic transmission. Fig. 2, a diagram illustrating the system of combinations. Fig. 3, a front view partly in section and partly in elevation of the combined printer, perforator and keyboard transmitter. In this view many of the parts are omitted for the sake of clearness. Fig. 4, side elevation of the machine shown in Fig. 3. Fig. 5, a side elevation partly in vertical section of said machine. Figs. 6 to 19, inclusive, details of the punching mechanism of said machine. Fig. 20, a top plan view of the lower portion of said machine showing those parts located in the bottom of the machine with the upper frame portion of the machine removed. Fig. 21, a top plan view partly in section on line $21^x$—$21^x$, Fig. 5, showing the various operating clutches of said machine, the combination bars and related parts. Fig. 22, a back view of said clutches and connected parts, showing also the backing screw, a portion of the printer carriage and other related parts. Fig. 23, a detail side elevation partly in section, of the spacing clutch. Fig. 24, a similar view of the lining clutch; Fig. 25, an end view of the normally stationary member of the lining clutch; Fig. 26, a similar view of the backing clutch; Fig. 27, a detail perspective view of the clutch pin of the spacing and other clutches; Fig. 28, a perspective view of some of the mechanism which operates with the said clutches to effect the operations of "spacing", "lining", "backing" and "blanking"; Fig. 29, a detail cross section through some of the sliding bars shown in Fig. 28, showing the relative positions of the loops carried by said bars and the arms with which they coöperate; Fig. 30, a fragmentary detail view partly in elevation and partly in section of the spacing clutch, and its operating magnet showing the connection between the two, and showing also the connection between the spacing clutch and the spacing screw shaft; Fig. 31, a fragmentary detail view partly in section and partly in elevation of the actuating bar mechanism showing the connection between this mechanism and the rocking shaft of the stripper plate of the punching mechanism; Fig. 32, a fragmentary detail view showing the connection between one of the links of the striker bars and the sliding bar which operates said striker bar; Fig. 33, a fragmentary detail view, partly in section and partly in elevation of the back of the magnet supporting frame with magnet armatures mounted thereon showing the spring arrangement for returning said armatures to their normal positions after operation; Fig. 34, an enlarged fragmentary perspective view of the combination bars together with a sliding bar and latch mechanism and related parts which coöperate with said combination bars. Fig. 35, an enlarged detail fragmentary elevation to illustrate the manner of supporting said combination bars. Fig. 36, a section on line 36×—36×, Fig. 35. Fig. 37, an enlarged detail perspective view showing the supporting frame and rods for the key levers. Fig. 38, a diagrammatic view showing the arrangement of slots in the combination bars. Fig. 39, a semi-diagrammatic view showing the arrangement of lugs on the actuating bars. Fig. 40, a diagram showing an arrangement of the circuit of the spacing magnet, and controlling contact device therefor. Figs. 41 to 44, inclusive, detail views of said contact controlling device showing various steps in its operation. Fig. 45, a bottom plan view of the paper carriage removed from the machine. Fig. 46, an end elevation of said carriage. Fig. 47, a front elevation of the bracket of said carriage which carries the spacing screw nut and the backing roller. Fig. 48, a fragmentary horizontal section of one end of the paper feed roller of said carriage, showing the lining shaft screw partly in section and partly in elevation. Fig. 49, a section taken on line 49×—49×, Fig. 48, looking to the left. Figs. 50 to 54, inclusive, details of the spacing and backing screws and some of their coöperating parts. Fig. 55, a detail side elevation showing the relation between the lifting bar lever mechanism, and the cam which operates the same. Fig. 56, a detail view showing partly in section and partly in elevation the arrangement of gears for transmitting motion to the lining shaft, and the mechanism on the end of said shaft for rotating the same independently of the power mechanism. Fig. 57, a section on line 57×—57×, Fig. 56 looking to the left. Fig. 58, a section on line 58×—58×, Fig. 56. Fig. 59, a section on line 59×—59×, Fig. 56. Fig. 60, a detail semi-diagrammatic view to show the arrangement of the successive telegraph blanks on a continuous roll of paper. Fig. 61, a fragmentary detail top plan view to illustrate principally the arrangement of the cams for operating the blanking mechanism. Fig. 62, a detail view partly in side elevation and partly in section to further illustrate the mechanism whereby the said cams operate the blanking mechanism. Fig. 63, a detail view partly in section and partly in elevation to show the connection between the lining clutch and the shafts which carry said cam mechanism. Figs. 64 to 69, inclusive, detail view of the contact mechanism operated by the selector bars. Fig. 70, a side elevation of the automatic transmitter; Fig. 71, a longitudinal vertical section partly in elevation of said transmitter; Fig. 71ª, an enlarged fragmentary detail sectional view showing the transmitting blank passing on to the conveyer belts. Fig. 72, a top plan view of said transmitter; with the lining and backing screws, together with their supports, and the top plate of the machine removed, to more clearly show the parts within the main body of the machine; Fig. 73, a top plan view of the forward half of the automatic transmitter; Fig. 74, a detail vertical section of one of the forward belt-carrying drums; Fig. 75, an enlarged detail fragmentary section of a corner of the machine frame, showing one of the retaining plates for holding the blank down on the transmitter belt, also shown in section; Fig. 76, a fragmentary detail side elevation of the locking arrangement for the lever of the backing clutch; Fig. 76ª, a fragmentary detail view of the locking device for the blanking mechanism; Figs. 77 to 83, inclusive, semi-diagrammatic views illustrating steps in the operation of the contact controlling pins; Fig. 84, an enlarged fragmentary top plan view of the plate which lies beneath the sending blank and receives the contact controlling pins; Fig. 85, a diagram of the electrical connections when the automatic transmitter and printer are used in combination as an automatic transcribing device; Fig. 86, a simplified diagram illustrating the general theory of the method of line operation embodied in this invention; Fig. 87, a diagram of the circuits and apparatus at the transmitting end of a simplex line employing this improved system of line operation in which the transmission is effected by means of the automatic transmitter above referred to; Fig. 88, a diagram of the circuits and apparatus at the transmitting end of a simplex line employing this improved system of line operation in which the manual keyboard transmitting mechanism of the combined printer and perforator is employed in the place of the automatic transmitter; Fig. 89, a diagram of the circuit connections and apparatus at the receiving end of the line of either Fig. 87 or Fig. 88; Fig. 90, a diagram of the circuits and connections for multiplex operation, and, Fig. 91, a diagram of some of the various types of current which may be employed in this system of line operation, and, Fig. 92, a diagram showing the general scheme of the operation of the system between cities.

*The printed telegram and controlling form for automatic transmission.*—The printed telegram shown in Fig. 1 consists of a type printed telegraphic message on a sheet of paper, or other suitable material, provided with the usual heading, and perforated as indicated to constitute a controlling device for the automatic transmission or retransmission or transcribing of the message printed thereon. This telegram therefore represents either a manually prepared sending form for automatic transmission or a message as received from a distance and automatically printed and perforated. Embossments or other forms of impression may be used in the place of said perforations, but perforations are preferred, and throughout the following description the code impressions shall be referred to as "perforations."

The perforations above referred to are arranged in accordance with a preselected code in such positions and combinations as will cause an automatic transmitter, as hereinafter described, to send a signal corresponding to the character or other signal which the code arrangement of the given perforation or perforations represents. In the form shown in Fig. 1, these code perforations are located substantially beneath the characters which they represent. The rows of circles along the two side edges of the telegraph blank, represent perforations employed in feeding the sheet in the machines, as will hereinafter more fully appear.

The system of combinations upon which is based the arrangement of the code perforations on the message blank shown is clearly illustrated in the diagram Fig. 2. Referring to this diagram, let the line of characters and other signals extending horizontally across the top of the diagram represent the various transmitable characters and other signals. For all of these characters and the other signals indicated, there are eight code positions, indicated on the left in the diagram (Fig. 2) by the vertical zigzag row of eight round dots. These positions passing from the top to the botton of the vertical row referred to, shall be called the $a, b, c, d, e, f, g$, and $h$ positions, respectively. Each of such code positions is determined by the vertical distance from each end of the row and by the horizontal position on either side of an imaginary line indicated by the dotted line $x-y$, passing vertically through said zigzag row. Each code character or signal is formed by one or more perforations occupying a different one or combination of such positions. For example, for the letter "A" the perforations occupy the $a$ and $d$ positions; for the letter "B," the $b$ and $f$ positions; for "C," the $b$ and $g$ positions, and so on through the alphabet. The numerals, "back," "line," "blank" and four other miscellaneous signals are, in the case shown, formed each by the combination of three positions. For example, the code numeral 1 is formed by perforations in the $b, e$ and $h$ positions; the "back" signal, which will be more readily understood later, is formed by perforations in $a, b$, and $g$ positions, and the dollar mark by the $d, e$ and $f$ positions. The punctuation marks and "space" signal occupy but one code position each.

Such a system of combinations possesses a decided advantage over a system where each signal is represented by one position only, or two positions only, or three positions only, in that the signals to be transmitted are not so long;—that is to say, the row of perforations do not extend in so long a line—and for that reason the perforations when arranged in the code positions as herein described, may be compressed into a smaller vertical space, the latter being an important consideration when the code perforations come between lines of printed characters. Such a system has an advantage also over a system which uses all combinations in a promiscuous way, as the employing of the same number of positions or combinations for the numerals as for the characters, in that it provides for readily detecting errors. This will be clear from a consideration of the following facts: Errors which may be caused by the line and the machine (not by the operator) are almost certain to result in a dropped line impulse or an added line impulse, and not an added and dropped impulse simultaneously. Therefore, if one letter were represented by a certain combination of two code positions, and another letter by one code position only, and a third letter by three code positions, the dropping of a line impulse would result in the substitution of one letter for another, and, similarly, the adding of an impulse would result in the substitution of a three-position letter for a two-position letter, or a two-position letter for a one-position letter. When one letter is substituted by mistake for another, or one numeral for another or one punctuation mark for another, serious results may be occassioned. If, however, the error in transmission results merely in the substitution of a numeral for a letter in a word, or a letter or some other signal for a numeral, which would be the case according to the system herein described, the mistake is self evident.

By using a different number of code positions for all letters from those for the numerals and using a different number of positions for the punctuation marks from those used for either letters or numerals, the following results are obtained. A. One letter is not substituted for another letter. B. One numeral is not substituted for another numeral. C. Such errors as do occur are dropped punctuation marks, dropped numerals, punctuation marks or numerals or a blank space without any corresponding perforations substituted for letters, or letters substituted for numerals. Errors of this character are either self-evident or indicated by a wrong check. (All commercial telegrams are accompanied by what is known as a check. This check indicates the number of words which should be in the body of a message. Each numeral is counted as one word.) Since there are no characters corresponding to signals consisting of more than three modified impulses an added impulse in this case results in the omission of a character.

*The combined printer, perforator, and keyboard transmitter.*—The machine which automatically or manually prints or perforates, or both prints and perforates, these message blanks, and which may also act as a manual key board transmitter, will now be described in detail. (See Figs. 3 to 69). The printing in this machine is effected by sending type 1, carried by pivoted bars 2 into engagement with a suitable inked ribbon 3, which passes in front of the paper 4, upon which the printing is done. This paper in turn passes in front of a suitable platen 5, which may consists of a piece of rawhide or other suitable material clamped rigidly to the cross frame 6 of the machine by a flanged plate 7, held rigidly against said frame by means of screws 8.

No particular form of ribbon or ribbon-feeding mechanism is claimed as a part of this invention, and as such mechanisms are well known it is unnecessary here to go into a detailed description of this feature.

The punching is effected by causing lugs 9 on the type heads 10 of the striker bars to drive punching pins through the paper. These lugs are arranged on said striker heads in such manner as to operate their corresponding punches, that is, the lug or lugs on each striker bar head are in code formation corresponding to the perforations to be produced. For example, the striker bar head for the letter "A" would have two lugs disposed so as to strike the anvils which operate the punching pins in the *a* and *d* positions, and so on with the other combinations. This punching mechanism which forms a very important part of the present invention is shown in detail in Figs. 6 to 19, inclusive.

The punching pins comprise each a preferably cylindrical shank portion 11, the shearing end of which is serrated, as at 12, to more readily cut the paper. The shanks of these pins pass through and are longitudinally slidable in holes 13 in a stripper plate 14, and in corresponding holes 15, in the upper end of a plate 16, screwed or otherwise made fast to the front plate 17 of the machine. These pins in the present machine are eight in number, staggered as shown so as to occupy a small space vertically. The positions occupied by these pins correspond to the code position of the eight round dots forming the zig-zag row at the left hand end of Fig. 2. Each of these pins is provided with an elongated head 18. The heads of these punching pins are prevented from turning by a small pin located as indicated at 18$^a$, Fig. 7. Resting respectively upon these heads, are a series of eight anvils 19, pivoted upon stud 20 screwed into a plate 21 secured to plate 16 by screws 22 passing through slots 23 in plate 21. These anvils are so arranged that their heads resting upon the heads of the punching pins, are adapted to be struck by the combination lugs 9, on the striker bar heads, and thus act to force the punching pins through the paper. Immediately after the said pins have been forced through the paper, they are drawn back therefrom by means of the stripper plate 14, which at that time moves away from the paper, and, engaging the heads of these pins which have been operated, carries them out of engagement with the paper. This stripper plate is slidably mounted on two forwardly extending pins 24, carried by the plate 16, the said stripper plate being for this purpose provided with guide sleeves 25, which slide on said pins. A shearing plate 26 is located just in the rear of the row of holes through which the punching pins pass in the plate 16, and is provided with a similar arrangement of holes 27, adapted to register with the shearing ends of the punching pins. This shearing plate is made fast to the frame 6 of the machine in any suitable way, the frame of the machine being cut away, as at 28 to allow the punchings to fall into a pan or other suitable receptacle hereinafter more particularly referred to. The necessary motion is imparted to the stripper plate through trunnions 29 at its ends, which engage in vertical slots 30 in the upper ends of lever arms 31, made fast to a rock shaft 32, journaled near one end in brackets 33 made fast to the front plate 17 and at its other end in the frame of the machine (see Fig. 3). This shaft 32 is actuated through a lever 34, connected to certain power mechanism, which will be hereinafter more particularly described, through a pin 34$^a$ working in a forked end 34$^b$ of arm 34, there being considerable lost motion between said fork and pin, thereby imparting but slight movement to arm 31 as compared with the movement of pin 34$^a$. (See Fig. 31). In th $\;$ punching mechanism no springs are required to return the punches to their normal positions, and, therefore, when these punches are driven forward into the paper there is no resistance to be overcome, other than the friction of the pins and the resistance of the paper.

In some uses of the machine it is desired to print without perforating. This change may be effected in the present mechanism by a very simple adjustment. By loosening the screws 22, and sliding the block 21 to the left, (Fig. 7), the anvils may be withdrawn from the path of the perforating lugs 9, on the striker bar heads, so that when a given striker bar is operated its type will be sent against the ribbon, but the lugs 9 will be rendered non-operative. The anvils are shown in this position in Fig. 12.

The striker bars 2 are, in the machine shown, supported in a semicircle upon a common fulcrum, consisting of a wire 35 sprung into a recess or groove 36 in the semicircular front plate 17 of the frame of the machine, the said striker bars being supported upon said wire by means of bearing lugs 37. Each striker bar moves in an individual guide slot 38 in the front plate 17. In the drawings all but one or two of the striker bars are omitted for the sake of clearness. These striker bars are all held in position on fulcrum wire 35 by means of a segmental plate 39 bolted to the plate 17 and provided with a rounded cut portion 40 to fit the radius of the supporting lugs 37 of the key levers. By removing one or more segment plates 39 at a time, the striker bars held by these sections may be removed without disturbing the others.

In the position of rest the heads of the striker bars lie on a pad 17ª supported by a semicircular plate 17ᵇ secured to the machine frame as shown most clearly in Fig. 3. These striker bars are suitably spaced and bent, as is well known in typewriter construction, so that they will be driven to a common center, the type head of each bar passing to the striking point through a guide slot 41 in guide plate 42, located just below the row of punching pins and made fast to the plate 16.

Each striker has a rear extension or short lever arm 43, each of which extensions is pivotally connected to one end of an individual link 44 and each of these links is pivotally connected at its other end to an individual pin 45. Each of these pins is longitudinally slidable in a separate lug 46 of a series of sliding bars 47, there being one such sliding bar for each such striker bar, and one such lug on each sliding bar. The movement of pin 45 in its lug 46 is limited in one direction by nuts 48. On the side of lug 46 opposite nuts 48, the pin 45 carries a coil spring buffer 49 (see Figs. 5 and 32).

A given striker bar is sent into the striking or operating position indicated in dotted line in Fig. 6, by the forward (left to right in Fig. 5) movement of its individual sliding bar 47 causing its lug 46 to engage nuts 48, thereby imparting longitudinal movement to pin 45 which, pulling through link 44, acts on short arm 43 to turn the striker bar on its fulcrum 35. A small amount of lost motion is allowed between spring 49 and lug 46 to allow the striker bar 2 to travel ahead of the motion of sliding bar 47 in order to give a sharp blow. The lugs 46 uniformly increase in length as their distance increases from the center of the machine so that their heads lie in the arc of a circle, as most clearly shown on the left in Fig. 3.

The sliding bars 47 are mounted in guide slots in bars 50 and 51, which extend transversely across the machine and are made fast to the side frames thereof. The sliding bars 47 receive their motion from an actuating bar 52, which is at times positively connected to the individual sliding bars 47, by means of latches 53, one of which is pivoted on each of said sliding bars. The operative connection between the said latches and bar is formed by the latter engaging shoulder 54 on the heads of the individual latches (see Figs. 5 and 34). The actuating bar 52 is supported at its ends on bars 55 and 56, which are slidably mounted in plates 50 and 51 for movement back and forth in the machine. Such movement is imparted to said bars from a rock shaft 57, acting through crank arms 58 and links 59 connected to lugs 60 on the respective bars 55 and 56 (see Figs. 5 and 21). Rocking motion is imparted to said shaft 57 through crank arm 61, located on the end of said shaft outside the machine (see Figs. 4, 21 and 22), and connected by rod 62 to a crank disk 63, made fast to a spindle 64 formed on one end of the spacing screw hereinafter described. The shaft 64 receives its motion through sprocket gearing 65, 66, 67 (see Fig. 22), from a clutch hereinafter described, mounted on a continuously rotating shaft 68, which is geared from sprocket 69 fast thereon through the sprocket gearing indicated, or in any other suitable way, to a small electric motor 70, mounted on the frame of the machine. Obviously, any other suitable source of power may be employed in place of the electric motor, but such a motor is preferred.

The selection of the particular latches 53 to be engaged by the actuating bar 52, is effected by means of a series of combination bars 71 coöperating with tail pieces 72 on the several latches. These tail pieces 72 pass transversely across all of the combination bars and normally rest in guide slots 73 in a plate 74, which extends across the machine and over the tops of all the tail pieces 72 (see Fig. 34). The latch tail pieces 72 are constantly pulled toward the combination bars by individual springs 75, secured to the latches and to depending brackets 76 on the slide bars 47.

The selection of the particular latches to be operated is effected by bringing into transverse alinement, beneath the tail piece of the latch it is desired to select, a row of slots 86 in the upper edges of the combination bars, thereby permitting the particular latch tail piece above said alined slots to be pulled thereinto by spring 75. This causes the selected latch to turn on its pivot and send its latch shoulder 54 into the path of the actuating bar 52 which in its forward travel, will engage said latch and thereby become positively connected to the slide bar 47 of the striker bar which it is desired to operate.

The arrangement of the slots in the combination bars is most clearly shown in the diagram Fig. 38 which indicates enough of the length of said bars to illustrate the principle involved. For each of the $a$, $b$, $c$, $d$, $e$, $f$, $g$ and $h$ code positions there is a combination bar, and these are so slotted that by shifting said bars laterally in the code combinations required for the different characters or other signals, each such bar or combination of bars thus shifted causes an alinement of slots across all of the said bars. Thus, for the space signal the $d$ bar alone would be shifted, and this would effect an alinement of slots across all the bars. For the letter (A) the $a$ and $d$ bars would be shifted, causing an alinement of a different combination of slots, and so on. Each combination bar is moved forward against the tension of an individual spring 87 each of which is secured at one end to a hook 88 on its combination bar, and all secured at their other ends to a bracket 89 secured to the bottom of side plates 77, 78 (see Fig. 3). These springs return the combination bars to their normal positions.

The alining of slots in bars for selective purposes is well known in the art, and I do not claim this feature broadly. The system of combinations, however, upon which these bars are slotted is new and forms an important part of this invention. These combination bars are mounted between two side plates 77 and 78, made fast at their ends to supporting brackets 79 secured to the side frames of the machine, the said bars being supported near their ends for longitudinal movement between said plates upon rollers 80 carried on a pin 81 supported in plates 77 and 78, the said rollers each passing through slots 82 in the combination bars. Between the combination bars are located spacing washers 83 (see Figs. 6, 35 and 36). The plates 77 and 78 are provided respectively, with slots 84 and 85 registering with each other and acting as hereinafter described as guides for the tail pieces of the said latches.

The latch tail pieces 72 do not normally engage the tops of the combination bars, since they would thereby interfere with the longitudinal motion of said bars, but are held a short distance thereabove by means of a bar 90, which extends across the machine and normally engages all of said tail pieces, holding them up out of engagement with the combination bars until it is necessary for said arms to engage the slots in said bars when said bar 90 passes downward allowing the tail pieces 72 to follow it. This releasing bar 90 is supported at its ends on arms 91 located near each side of the machine frame and made fast to rock shaft 92, extending across the machine and journaled in the side frames thereof (see Figs. 4 and 21). The required motion is imparted to this shaft through the medium of a link 93 connected at one end to one of the arms 91 and at its other end to a lever 94 made fast to a stud shaft 95 passing through the side frame of the machine and carrying at its outer end a lever 96 made fast thereon. The lever 96 has a shouldered head 97 which rests against a cam 98 made fast to the shaft 64 just outside of the frame of the machine (see Figs. 4, 50 and 55).

The manner in which the cam coöperating with the arm acts to raise the left bar will more fully appear from the description of the operation of the machine which will follow later.

The necessary shifting of the combination bars to bring their slots into proper alinement may be effected in the present machine either electrically, as when the machine is employed as a telegraphic receiver or as an automatic transscriber, or this may be effected by the manual operation of the keys of a keyboard, as when the machine is used manually in the preparation of message blanks for automatic transmission or as a manually operated telegraph transmitter and home recorder. The combination bars are operated electrically in the machine shown by a series of eight electromagnets 99, acting upon pivoted armatures 100, provided with arms 101, which extend across the combination bars beneath them and engage lugs 102 on their lower edges. There is but one lug 102 on each combination bar, so that each of said bars is operated by its individual magnet 99.

The electromagnets are supported by being mounted each in a separate cavity 103 in an iron casting 104 which extends transversely of the machine and which is shown most clearly in Figs. 3, 5 and 20.

The armatures of the magnets 99 are returned to their normal positions after operation each by an individual coil spring 105 located each in a cavity 106 in casting 104 and pressing up against an arm 107 forming an extension on each armature 100, the upward movement of arms 107 being limited by screws 108 (see Fig. 33). The manner of energizing these magnets to effect the required combinations will be described later in connection with the more purely electrical phase of my invention.

The keyboard of the machine corresponds in its arrangement substantially to that of a standard typewriter keyboard except in the present machine there are certain additional keys employed. These will be described later.

The keyboard mechanism in the present machine comprises among other parts, a plurality of key levers 109 fulcrumed on rods 110 extending across the machine and supported at their ends in uprights 111 (see Fig. 37) carried by a supporting bracket 112 secured at its ends to the sides of the machine frame. The rods 110 are supported between their ends to prevent sagging, by uprights 113 on bracket 112. These rods are suitably spaced apart so as to give to all of said levers, though differing in length, substantially the same or a uniform movement at their ends 114. On the finger tip portions 115 of the keys are inscribed the characters and other signals employed. The forward ends of the key levers work in guide slots 116 in a plate 117 extending across the front of the machine, said key levers being normally held up against the top of said slots by springs 118 secured to the ends 114 of the key levers (see Fig. 5) and to a stationary strip 119 extending across the machine. The extreme left hand key lever (Fig. 20) is the same as any of the key levers, except that instead of being provided with a finger tip portion such as 115 it connects to a space bar 121 which is supported near its ends upon levers 122 made fast to a rock shaft 123 journaled in the sides of the machine. By pressing the space bar down at any point in its length, downward motion will be imparted to the outer end of the spacing key lever.

In some uses of the machine, hereinafter to be described, it is necessary to lock the key levers against operation at certain intervals. This is accomplished in the machine shown by providing each key lever with a lip 124, which rests either above or below (according to the position of the key lever), the beveled edge of locking bar 125, which extends transversely across all the key levers. The bar 125 is supported at its ends upon side brackets 126, mounted fast on a shaft 127, journaled in the sides of the machine. Rocking motion is imparted to said locking-bar through the medium of a link 128 connected to one of the brackets 126 and to the lower end of a rocking lever 129, loosely mounted on a shaft 130, extending across the machine and mounted in the side thereof. The lever 129 receives its rocking motion from a rotating cam 131 made fast to the loose member of a clutch, hereinafter described, mounted on the constantly rotating clutch shaft 68. The periphery of cam 131 engages a small wheel 132 mounted in the upper end of said lever, the said wheel being constantly held against the periphery of the cam by the tension of a spring 133. This locking mechanism being essential in certain uses of the machine only, may obviously be omitted from the machine when desired. (See Figs. 5, 20 and 21.)

The key levers act to impart longitudinal motion to one or more at a time of a group of longitudinally slidable selecting bars 134, mounted between two side plates 135 and 136 which extend transversely across the machine and are supported at their ends by brackets 137 and 363, made fast to the sides of the machine. (See Figs. 3, 5, 20 and 64). These bars are supported for sliding movement upon small rollers 138 mounted to rotate on pins 139 and extending through slots 140, near each end of the bars, said pins 139 being supported by the side plates 135 and 136. The side plates 135 and 136 are provided respectively, with guide slots 141 and 142 in which the ends of the key levers work up and down in operating. For the purpose of operating the bars 134, each key lever is provided at its end with a beveled edge 143, while the bars 134 are each provided with cam edged lugs 144, so located as to be engaged in certain combinations by the beveled edges of the key levers and thereby caused to shift said bars. In the machine as shown, these bars are shifted to the right, viewing the machine from the front.

The cam lugs 144 on the bars 134 are so disposed that the operation of a key lever will result in the longitudinal shifting of one, two or three of such bars, according to the character or signal which said key lever represents, The manner of arranging these lugs on the selecting bars will be clear from a study of Fig. 39 which shows in side elevation four of the bars removed from the machine. These lugs are simply arranged so that there will be the required number in line with each key lever to shift that one or combination of bars which corresponds to the character or other signal which the particular key lever represents. For example the letter "A" is formed by the $a$ and $d$ combinations or code positions. Therefore, the $a$ and $d$ bars 134 would each have a lug adapted to be engaged by the beveled edge of the "A" key lever, so that when the "A" key is operated the said $a$ and $d$ bars will be shifted. The space signal has but one code position, viz., the $d$ position. Therefore the key lever connected to the space bar would engage but one lug and that would be a lug on the $d$ bar 134; and this bar only would be moved. Each of the bars 134 is provided at one end with an upward extension or lug 145 and these lugs are disposed in line, respectively, with downwardly extending lugs 146, on each of said combination bars. Therefore, when the selecting bars 134 move as described, they select and impart a similar movement to the proper combination bars and thereby bring the required slots thereof into alinement.

The combination bars, in being shifted as described, in addition to selecting the proper latch or latches for engagement with the actuating bar, also act to operate an electrical contact device which controls the circuit of a magnet which in turn controls a clutch from which power is transmitted to the actuating bar. This contact mechanism is of peculiar construction and will now be described in detail, reference being had particularly to Figs. 40 to 44, inclusive. This mechanism comprises among other parts a lever 147, pivoted between two lugs 148, formed on the inside of a bracket 149, secured to the side of the machine. This lever is adapted to engage at its upper end a pin 150, slidable in said bracket to operate an insulated contact spring 151, which is mounted between and insulated from two other contact springs 152 and 153. The pin 150 has an insulating tip which prevents spring 151 from making electrical connection with the machine frame through said pin.

Figure 41:
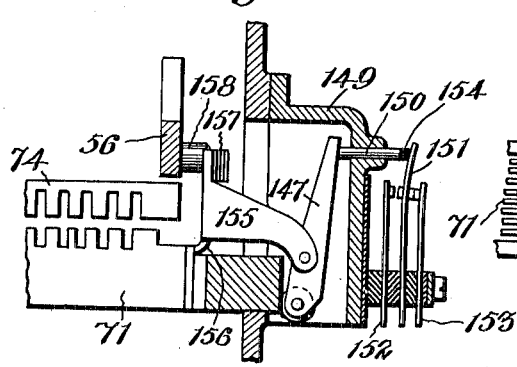
Figure 42:
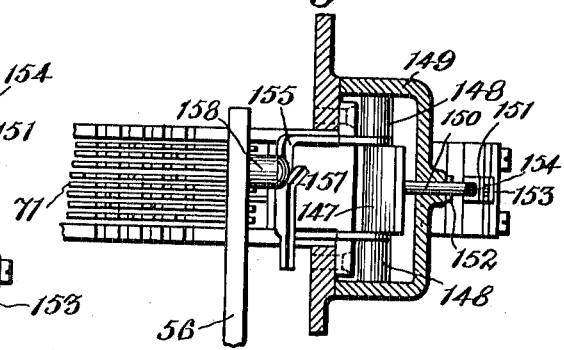
Figure 43:
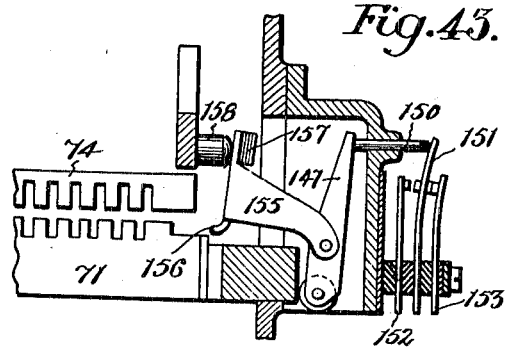

Pivotally connected to the side of lever 147 is a substantially U-shaped bracket 155. This bracket is provided with an extension or lip 156, which passes transversely across the ends of all the combination bars; and on the upper forward edge of this bracket is a cam plate 157, which is adapted to be engaged, as hereinafter described, by a lug 158 carried upon bar 56 which is one of the reciprocating supporting bars for the actuating bar of the machine. (See Fig. 21). Contact is normally maintained between springs 151 and 152. When, however, one or more of the combination bars is shifted to bring about the required action of the machine, said bar or bars engaging the lip 156 on pivoted bracket 155 will force this bracket and therefore the lever 147 and pin 150 to the right (Figs. 40 and 44), thus breaking contact between the springs 151 and 152 and establishing contact between springs 151 and 153. The effect of this is to complete the circuit of the spacing clutch magnet 159, whereby the spacing clutch 160, indicated diagrammatically in Fig. 40 and hereinafter described in detail, is operated and sliding bar 56 caused to travel forward. In thus traveling, the lug 158 first engages the cam plate 157 and thereby causes the pivoted bracket 155 to tilt up, raising its lip 156 clear of the ends of the combination bars. The bracket 155 will continue to rotate upward on its pivots as the lug 158 advances toward the observer (Figs. 41 to 44) and when this bracket has thus rotated a short distance it will allow the lever 147 under pressure of spring 151 to be forced back to the position shown in Fig. 44. Then when bar 56 travels back, lug 158 is carried backward out of engagement the bracket 155 which then drops to its normal position. In the drawings, the moving parts of this contact device are shown in their normal position of rest in Fig. 40. Fig. 41, shows the positions of the parts after a combination bar has slid forward and engaged lip 156, pushing lever 147. Fig. 42 shows in top plan the parts in the positions they occupy in Fig. 41. Fig. 44 shows the parts after the lug has passed across the upper face of bracket 155. Fig. 43 shows the parts in transit from position Figs. 41-42 to position Fig. 44. This contact device will prevent the engagement of the spacing clutch for more than one revolution, and therefore the repetition of an operation no matter how long a key is depressed or how long the combination bars which have been operated remain in the operating position. The function of contact spring 152 will more readily appear from the more detailed description of the electrical circuits to follow.

The diagram Fig. 40 indicates the electric circuit of the spacing clutch magnet in a very simple or elemental form, as for example when the machine is operated by the keyboard to prepare message blanks.

The spacing clutch magnet 159 is mounted in an extension of the general magnet supporting frame (see Figs. 20 and 30). This magnet is provided with an armature 162, pivoted as shown to the magnet frame. The top of this armature is pivotally connected to a rod 163, which at its upper end is connected as shown to an arm 164 of a bell crank lever. The arms of this lever are formed on a sleeve 165 mounted loosely on shaft 130. The other arm 166 of this lever extends upwardly from said sleeve and is provided at its upper end with a nose 167 which controls the operation of the spacing clutch (see Fig. 30).

The spacing clutch, as shown most clearly in detail in Fig. 23, comprises, among other parts, a collar 168, made fast on the shaft 68 and provided with radial teeth 169 cut in an annular extension 170 thereon. This collar forms the fast member of the clutch. The loose member of the clutch consists of a hub 171 loosely mounted on the shaft 68 and provided with an annular channel 172 formed between two annular flanges 173, and with an extension to which is made fast the sprocket wheel 67 hereinbefore referred to. This sprocket wheel is geared as described to the sprocket 65 on the shaft 64, which, acting through the connecting rod 62 and associated parts hereinbefore described, transmits the necessary motion to the actuating bar 52. The fast and loose members of this clutch are at times coupled together by means of a connecting pin 174 mounted in rectangular openings in the flanges 173 for sliding movement laterally of the hub. For this purpose pin 174 has cut in one end a series of teeth 175 which are adapted to engage the teeth on the fast clutch member 168. This connecting pin at its end opposite its teeth is under tension of a spring 176, which is in turn fast to the hub 171. The action of this spring is to normally force the pin 174 toward the fast clutch member and thus normally tend to couple the two members. The fast and loose clutch members are disengaged by shifting pin 174, under the tension of its spring 176 out of engagement with the teeth of the constantly rotating or fast member, and this is effected by causing the nose 167 on the end of the lever 166 to engage a cam surface 177 on the clutch pin and thus shift it back against the tension of spring 176. This pin is cut away as at 178 to receive nose 167 (see Fig. 27). The normal position of this nose is in engagement with pin 174, hence the loose member of the clutch is normally uncoupled from the constantly rotating member. Nose 167 is normally forced toward the clutch under tensions of a spring 179 acting on a tail piece 180 of the clutch magnet armature.

In certain uses of the machine, hereinafter pointed out, the spacing magnet operates a pair of electrical contacts 181 and 182. This may be effected by making fast to tail piece 180 of the magnet armature an insulating pin 183 which, when the magnet is energized and attracts its armature, will cause pin 183 to force contacts 181 and 182 together. (See Fig. 30).

The paper carriage of this machine comprises among other parts two end frames 184 and 185 connected by brace rods 186 and 187 and by a bar 188 extending across the bottom of the carriage. For detail views of carriage see Figs. 45 to 49.

The paper to be printed on or perforated is preferably supplied to the machine in the form of a continuous sheet from a roll wound on a core 189 (Fig. 5) which is rotatably supported upon a rod 190 passing through and supported by the end frames of the carriage. This rod is provided at one end with a knob 191 fast thereon, and at its other end is screw-threaded to receive a removable knob 192 by which the said rod is retained in the carriage. By removing knob 192, rod 190 may be withdrawn and the paper core removed and a fresh roll placed in the carriage.

Made fast on the cross bar 188 of the carriage is a bracket 193 which is slidably mounted on a rod 194 which extends across the machine.

The side frames of the carriage are provided with extensions in which are journaled the ends of a paper feed roller 195, through the longitudinal axis of which passes the lining shaft 196. The roller 195 is supported on the shaft 196 by bushing 197, fitted into and made fast to each end of the roller. These bushings are free to slide longitudinally of the shaft, but each carries two keys 198 which engage longitudinal slots 199 in the shaft 196, thereby permitting the roller 195 to travel longitudinally of the shaft, but holding it against rotation relative to said shaft.

The paper feed roller 195 carries near each end a series of equally spaced tapered pins 200, the office of which is to engage the marginal perforations in the paper and thus, by the rotation of the roller, to positively and uniformly feed the paper through the machine. The distance between the centers of the successive holes of the marginal rows in the paper must be identically the same as the distance between centers of successive pins in the two rows at the ends of the cylinder. Extending alongside the paper feed roller is a presser roller 201 journaled in uprights 202 pivoted to extensions on the side frames of the carriage. This roller presses against the paper under tension of springs 203, and holds it firmly against the paper feed roller. Extending from one of the side frames to the other across the bottom of the paper carriage is a supporting plate 204 in which is adapted to rest a small pan 205 or other suitable receptacle to catch the punchings as they fall from opening 28. 201ᵃ indicates a knife-edge plate extending longitudinally across the top of the paper feed roller and made fast to the side frames of the carriage. This may be used to assist in tearing off the message blanks as they pass from the machine.

The lining shaft 196 is journaled at its opposite ends in upright extensions of a frame 206 which extends across the machine and is made fast to the sides thereof. (See Figs. 4 and 56). On one end of this shaft is made fast a star wheel 207, which coöperating with a roller 208, held against its periphery by a lever 209 under tension of spring 210, holds the shaft against slipping from certain definite positions to which it is rotated. This is particularly important when the machine is used for perforating message blanks for automatic transmission, since it is important that there be a definite and constant relation between the marginal perforations in the paper and the code perforations made by the machine.

The mechanism for operating the lining shaft whereby the paper is fed up one or more lines will be described after the description of the carriage spacing mechanism.

The carriage is caused to travel step-by-step across the machine from right to left to effect the proper spacing of the characters, words or other signals, by means of a rotating screw 211, the threads of which engage those of a nut 213 on the carriage. This screw, which extends across the machine and is located under the paper carriage, is of peculiar construction and is shown most clearly in the detail views Figs. 50, 51 and 52. It is cut with a triple thread 212, which is removed for something more than two-thirds of its circumference. The nut 213 is also provided with a corresponding triple thread (see Figs. 45, 46 and 47). This nut is supported for sliding adjustment on two rods 214, which pass through it and are made fast in the bracket 193 of the carriage. The nut may be adjusted on said rods by screws 215. The spacing screw 211 is rotated one revolution for each space, and for this purpose is driven by sprocket 65 mounted fast thereon and geared to sprocket 67 of the spacing clutch, which has been described.

The lining shaft, at its end opposite the star wheel 207, is provided with a reduced extension 216 (see Fig. 56), upon which is mounted a sprocket 217, through which power is transmitted to drive the said shaft. This sprocket is loose on the shaft, but is connected to drive the same through pins 218, made fast to a longitudinally slidable sleeve 219, said pins being adapted to pass into holes in the said sprocket. The sleeve 219 connects with the shaft extension through a pin 220 fast to the said sleeve and adapted to move in a slot 221 in the shaft extension. The sleeve 219 is normally held in the position shown in Fig. 56, under the tension of a coil spring 222 held between a shoulder on the interior of the sleeve and a nut 223 on the end of the shaft extension. The purpose of this arrangeemnt is to allow of the rotation of the lining shaft by hand independently of its regular power mechanism. To do this the sleeve 219 is pulled to the right, in Fig. 56, thus disengaging the pins 218 from the sprocket 217, when the lining shaft may be rotated independently of said sprocket. For the purpose of operating this sleeve it may be provided with a milled head 224. The sprocket 217 of the lining shaft receives its power by being geared to a small sprocket 225, fast on an elongated sleeve 226, mounted upon a longitudinally slidable countershaft 227. This countershaft is connected to the sleeve 226 by means of a pin 228 on said shaft engaging a slot 229 on the interior of said sleeve. The shaft 227 receives its power from a sprocket 230 made fast to a sleeve 231, also mounted on said countershaft. This countershaft is slidable longitudinally through the sleeve 231, but is always connected to rotate therewith by means of a pin 232 on said shaft engaging an elongated slot 233 formed on the interior of the sleeve 231. The sprocket 230 is the main driving sprocket in the system of gears shown in Fig. 63, and, acting through the pin and slot connections, in the positions shown in Fig. 56, transmits power to the sleeve 226 and thence to the lining shaft without being transmitted through the intermediate gear 234, the office of which will hereinafter be described. With this train of gearing, the spaces between the lines of printed matter will be sufficient to allow the perforations to come between the printed matter. When, however, it is desired to print without perforating, it is not necessary that the distance between successive lines of printed matter shall be so great. The changing from the wider to the narrower line spacing is effected in this machine by shifting the countershaft 227 to the left, thus changing the speed relation of the gears which drive the lining shaft. When the countershaft is thus shifted, the pin 228 thereon passes out of engagement with the sleeve 226 and into engagement with a slot 235 on the interior of the collar 236 of sprocket 234, loosely mounted on the countershaft. This sprocket 234 is in turn geared to a sprocket 237 mounted on a stud shaft 238 secured to the side frame of the machine. The sprocket 237 is made fast to a sprocket 239, which is in turn geared to sprocket 240 fast on sleeve 226. Therefore, when power is applied to the countershaft 227 from sprocket 230, this power will not be transmitted directly to the sleeve 226, but indirectly through sprockets 234, 237, 239 and 240, which will cause a smaller rotation of the sleeve 226 and therefore a smaller rotation of the shaft 196 for each lining operation. The countershaft 227 is provided with a knob 241 by which it may be shifted, and is held in its two operative positions by means of a ball 242 which may rest in either of two cavities 243 or 244 in the shaft according to which of the two said positions the shaft occupies, said cavities being provided with slanting sides, as shown. The ball is mounted in a hole in the collar 231 and is retained therein by means of a spring 245. The sprockets 217 and 225 and their chain may be inclosed in a gear case 246 mounted on one end of the frame 206 as shown in Fig. 3. The main driving sprocket 230 of the lining countershaft is geared to a sprocket 247, made fast on an extension or collar 248 of the hub 249 of the lining clutch 250, shown in detail in Figs. 24 and 25. This clutch is the same in general principles as the other clutches, but is modified somewhat in construction to adapt it to its slightly different operation. The normally loose members of the other clutches remain coupled up for one revolution at a time, while the normally loose member of the lining clutch remains coupled for only a quarter revolution at a time, when feeding the paper up for the successive lines. For this reason, the lining clutch is provided with one clutch pin 251, having teeth 252 adapted to engage with teeth 253 on clutch member 254 fast on shaft 68, as in the case of the spacing clutch, and three additional pins 255, which are substantially the same as the clutch pin 251, except that they have no teeth and act merely as disengaging devices to separate the pin 251 from the fast member of the clutch. All of said clutch pins must therefore be operatively connected together. This is effected by means of a flange 256, engaging a recess 257 in each of said pins, the said flange being formed on one end of a collar 258 slidable longitudinally on an extension of the clutch hub 249 which is loose on the shaft 68. This collar is normally pressed toward the constantly rotating clutch member 254 by means of a coil spring 259 held between the flange 256 and a flange 260 on a collar 261, fast on the clutch hub extension 248. The sprocket wheel 247 is held fast between collar 261 and a collar 262, screwed on the end of the extension 248 of the clutch hub. The pins 251 and 255 are each provided with an opening 263, one of the edges of which has a cam face 264 just as in the case of the pin shown in Fig. 27. Normally resting in the opening 263 of one of these clutch pins, by which the teeth of pin 251 are normally disengaged from teeth 253 of the normally rotating clutch member, is a nose 265 (Figs. 21 and 28) carried on the upper end of lever 266 which is fulcrumed by means of sleeve 267 for angular movement on shaft 130. This lever is pulled toward the lining clutch by spring 268 secured at one end to lever 266 and at its other end to stationary rod 269 extending across the machine. (See Fig. 28.)

Pivoted on lever 266 are two arms 270 and 271, one of which is pivoted to each side of said lever, as shown most clearly in Figs. 28 and 63. The forward end of arm 270 extends through a loop 272, consisting of a metal strip made fast to that slide bar 47 which operates the striker bar which will perforate the paper with that combination of perforations corresponding to the lining signal. The arm 270 is provided with a shoulder 273, the top of which is normally held in engagement with the under side of the top of loop 272 by the tension of a spring 274. The other arm 271 pivoted on the lining clutch lever is provided with a shoulder 275 similar to the shoulder 273. The tail of arm 271 is normally held under tension of spring 276 up against the under side of the top of a loop 277 formed on an extension 278 of an arm 279 pivoted to a lever 280 integral with a sleeve 281 made fast on shaft 130. Arm 279 is limited in its vertical motion by a stationary loop 279ª secured to the bar 50 and surrounding arm 279 (see Fig. 28). The upper edges of both arms 270 and 271 are normally held up toward the under side of a yoke 282 made fast to slotted bar 50 and provided with a cam plate 283 adapted under conditions hereinafter described to engage the rear of shoulders 273 and 275 and depress the forward ends of arms 270 and 271. The function of lever 280 and its connection through loop 277 with arm 271 is to operate the lining clutch when either the backing or blanking or both mechanisms work. This will more readily appear later. There is also fast on sleeve 281 an upright lever 284 having at its upper end a nose 285 adapted to control the operation of the backing clutch 286 in just the same way that nose 167 controls the spacing clutch. The spacing and backing clutches being substantial duplicates, a detail description of the latter is unnecessary in view of the preceding description of the spacing clutch. The lever 284 is pulled toward the backing clutch under tension of spring 287 secured to said lever and to rod 269. (See Fig. 28). The normally stationary member of the backing clutch carries a sprocket wheel 288 fast thereon, and this sprocket is geared to a sprocket 289 which drives the backing screw (see Figs. 22 and 50). The function of this backing screw is to send the paper carriage back to the commencement of its travel after it has advanced a part or all of the way across the machine. This backing screw is shown most clearly in Fig. 50, consists essentially of cylinder 290 extending transversely of the machine below the carriage and having upon its circumference a raised spiral 291 which is adapted to engage a small roller 292 rotatably mounted on the bottom of the carriage supporting bracket 193. (See Fig. 45). This spiral has a constant pitch except for one revolution near one end, where the pitch decreases, as at 293 to zero, in less than one revolution. At this end the screw is provided with a flange 294 which acts as a stop for the roller 292. It is evident that as this screw rotates in one direction, its spiral engaging roller 292 will push the carriage along. The direction of this rotation is such as to return the carriage to its starting point. The cylinder 290 of this screw is fast on a shaft 295 which extends across the machine beneath the carriage and is journaled in the sides of the machine. This backing screw is driven, as before stated, by power applied to sprocket 289. This sprocket, however, is not itself connected directly to the backing screw, but is fast on sleeve 296, which is loosely mounted on the shaft of the backing screw (see Fig. 50). This sleeve 296 carries a radial pin 297 which is adapted at times to engage a lateral pin 298 made fast to a sleeve 299, slidable longitudinally on shaft 295, but held against rotation thereon by pin 300, engaging slot 301 in said sleeve. The sleeve 296 carrying sprocket 289 is held against lateral movement toward the backing screw by means of collar 299ª fast on shaft 295. The sleeve 299 is provided with two annular flanges 302 between which extend the fingers 303 of an arm 304 forming an extension on a sleeve 305 mounted loosely on the spacing screw shaft. This sleeve is provided with a cam projection 306, which fits normally into a correspondingly shaped recess in a sleeve 307, made fast on the shaft of the spacing screw 211. The sleeve 305 is forced in the direction of sleeve 307 under tension of coil spring 308 on the spacing screw shaft. From this construction it will be seen that when rotation clockwise is imparted to the spacing screw shaft 211 the cam projection 306 will ride upon the cam surface or sleeve 307, the sleeve 305 being caused thereby to be shifted laterally to the left. This shifting, by virtue of the connection of the arm 304 with sleeve 299 shifts said sleeve also to the left thus removing pin 298 from the path of pins 297. This disengages the backing screw shaft from its driving sprocket 289, and leaves it free to be rotated by the roller 292 on the carriage, in the forward travel thereof. If the backing screw remained all the time geared to its power clutch, the roller 292 striking the spiral 291 on the forward movement of the carriage would not only stop the carriage, but the backing screw would try to rotate the backing clutch loose member backward, hence it is essential that the backing screw be absolutely free while the carriage is passing forward. Directly after each spacing operation, however, the backing screw becomes coupled up to its power sprocket 289 by the returning of the sleeve 305, under tension of spring 308, to its normal position. In addition to the decreasing pitch of spiral 291 at the righthand end of the backing screw, I may provide any suitable shock-absorbing means for lessening the jar occasioned by the carriage reaching the end of its back travel. In the drawings (Figs. 22 and 50) I have shown for this purpose a spring 309 made fast to a collar 310, by means of a screw 311 adjustable on the shaft 194. The spring 309 engaging the bracket 193 of the carriage takes up the shock.

Since levers 284 and 280 are fast on the same sleeve 281 it will be seen (see Fig. 28) that when lever 284 is rocked to couple up the backing clutch, the lever 280 will be rocked in the same direction, pulling arm 279 with it. Loop 277 on this arm being normally in front of the shoulder 275 as shown in Fig. 28, will then cause the lever 266 of the lining clutch to withdraw its nose 265 from that clutch starting the normally stationary member of that clutch to rotating and therethrough operating the lining clutch. It will therefore be seen that each time the carriage is sent back to its starting point it automatically feeds the paper up at least one line. In some cases the paper is fed up the distance of several lines, an operation herein referred to as "blanking", and which will now be described.

Pivoted to the actuating lever 284 of the backing clutch is an arm 312, the forward end of which extends through a loop 313 made fast to one of the sliding bars 47. (See Fig. 28.) This arm 312, like the arm 270 is provided on its upper edge with a shoulder 314 normally held up against the under side of the top of loop 313 under tension of spring 315. The loop 313 striking the forward edge of shoulder 314 on the back stroke of the sliding bar, as hereinafter more particularly described, rocks arms 284 back against tension of spring 287 thereby causing the nose 285 to be withdrawn from the clutch pin of the backing clutch. This causes the loose member of the backing clutch to be coupled to the normally rotating member, which latter transmits, through sprockets 288 and 289, (see Fig. 22) rotation to the backing screw 290, which screw thus rotating will send the carriage back to the commencement of a line.

The fast and loose members of the backing clutch are disengaged from each other when the carriage has reached the end of its travel by the nose 285 on the backing clutch lever again engaging the connecting pin of that clutch. This is brought about by cam 316 (Figs. 3, 45, 46 and 47) fast on the bracket 193 of the carriage tripping a dog 317 fast on a spindle journaled in bracket 318 on the frame of the machine, and made fast at its end opposite dog 317 to one end of a lever 319 which at its other end is pivotally connected to a link 320 pivoted to arm 312. It will be seen that when the cam 316 on the carriage trips the dog 317, this will force lever 319 down, and this in turn acting through link 320 will force the arm 312 down and thereby remove its shoulder 314 from engagement with the edge of the loop 313, thus allowing the clutch lever 284 to be pulled by spring 287 into engagement with its clutch pin. This operation will be hereinafter more fully described.

When the machine is employed to prepare message blanks for automatic transmission, or when it is employed as an automatic printing telegraph receiver, it is desirable to have the paper which is fed to the machine in the form of a succession of connected telegraph blanks, as indicated in Fig. 60, each of said blanks having its individual heading. In such cases it is particularly desirable that the paper shall be fed from one of such blanks to the next, past the headings, as quickly as possible—quicker than could be done by stepping the paper up by the regular lining mechanism alone. In the present machine this is accomplished by certain mechanism auxiliary to the regular lining and backing mechanisms. This mechanism (see Fig. 28) comprises among other parts, an upright lever 321 carried by a sleeve 322 mounted loosely on the shaft 130, to which lever is pivoted a horizontal arm 323 which extends through a loop 324 fast on that sliding bar 47 which actuates that striker bar corresponding to the "blanking" signal. This arm 323 is also provided with a shoulder 325 on its upper edge which is normally held up against the under side of the top of loop 324 under tension of spring 326. In effecting this blanking operation, that one of the sliding bars 47 corresponding to the "blanking" signal takes up its motion, just as do any of the other sliding bars connected to the various striker bars. In thus moving, the sliding bar carries loop 324 in a direction toward the front of the machine (away from lever 321, Fig. 28), causing loop 324 to pass from engagement with shoulder 325. This allows the arm 323 to fly up a limited distance until its tail strikes the top of loop 324. Then when the sliding bar carrying loop 324 has nearly reached the end of its back travel, loop 324 engaging the forward edge of shoulder 325, will force arm 323 backward. This rocks lever 321 back, and this lever engaging an extension 327 on the lining clutch lever will rock that lever back, thereby withdrawing its nose from the lining clutch and thus causing the fast and loose members of that clutch to become coupled together. This puts the lining mechanism into operation. The loop 324 abutting against shoulder 325 will continue to hold the lever 266 back so that its nose will be out of engagement with the lining clutch, thus allowing the lining mechanism to continue feeding the paper up in the machine until some other mechanism acts to disengage the forward edge of the shoulder 325 from the loop 324. This is brought about by causing a cam link 328 (see Figs. 61 to 63) on a sprocket chain 329 to engage and force downward the end of a lever 330 which transmits, through a link 331 connected thereto and to the end of the arm 323, downward motion to said arm thereby releasing the forward edge of shoulder 325 from engagement with the edge of loop 324, allowing arm 323 to pass forward through said loop. This allows nose 265 to return to engagement with the connecting pin of the lining clutch and to thus uncouple the loose from the fast member of the clutch, thereby stopping the lining mechanism.

The sprocket chain 329 is mounted on the sprocket 240 on the sleeve which drives the lining shaft, and on sprocket 239 fast on a sleeve with sprocket 237, said sleeve being mounted loosely on stud shaft 238 made fast to the side of the machine frame as before described.

When a certain number of lines have been printed and perforated on a blank, the blanking mechanism will operate automatically to bring a fresh blank into position. For this purpose sprocket chain 329 is provided with a second cam link 332 arranged to travel in the path of an extension or wing 333 on an upright lever 334, which is fast at its lower end on a sleeve 335 mounted loosely on a stud shaft 336 secured to the side of the machine. The cam 332, however, is so disposed on the chain that it will travel past lever 330 without engaging it. The other end of sleeve 335 is made fast to a downwardly extending lever 337 which is flexibly connected through a link 338 to the end of arm 323. After a given number of revolutions of the lining shaft the cam 332 will be brought into engagement with wing 333 and striking this wing will force lever 334 in the direction of the travel of said cam, thus forcing lever 337 in the direction of the arrow Fig. 28. This lever in turn forces arm 323 in the direction to operate the blanking mechanism as described. The operation of this automatic blanking is then stopped when cam 328 strikes the end of lever 330 after the lining shaft has made a sufficient number of revolutions to bring the next blank into proper position.

When the machine receives a blanking signal, or whenever the blanking key is operated, the carriage will automatically be sent back to the commencement of a new line. For this purpose, the blanking lever 321 (Fig. 28) is provided with a horizontal extension or arm 339, which passes in front of the blanking lever 280. Therefore, when the lever 321 is moved by arm 323 to operate the lining shaft, arm 339 carried by lever 321, will engage lever 280 of the backing mechanism, and cause this arm to transmit through sleeve 281 of the lever 284 the necessary motion to remove nose 285 from the backing clutch and thereby allow the normally loose member of said clutch to become coupled to the rotating member, transmitting the necessary motion to the backing screw.

It is important that during these operations of lining and backing that the spacing mechanism shall not operate. This is effected by a locking device (see Figs. 28 and 30) located near one end of shaft 130 and consisting of a latch 340, pivoted at one end on a stud shaft 341 made fast to the machine frame, and connected by means of a link 342 with an arm 343 fast on a collar 344, which is in turn made fast to shaft 130. The end of latch 340 opposite its pivot is provided with a shoulder 345, which, when the arm 343 is rotated downward, is brought into the path of a pin 346 on the lever 166 of the spacing clutch. Therefore, whenever the levers 280 or 284 are moved to start the backing mechanism, they rotate shaft 130 and this shaft being fast to collar 344 sends latch 340 downward, thus pulling the shoulder 345 of said latch into the path of pin 346, thereby locking the lever 166 against movement away from its clutch. To prevent jamming, the arm 343 is connected to link 342 by pin and slot connection 342$^a$ and 342$^b$, the slot being held down against the pin by spring 342$^c$. Therefore, if the lever 166 is thrown to the left (Fig. 30) when the arm 343 rotates, this will merely extend spring 342$^c$.

The loose member of the backing clutch is provided with a cam surface as indicated by dotted lines in Fig. 26. The object of this is to keep the actuating lever of the backing clutch out during an entire revolution so that arm 343 will not return to its normal position and thereby release the locking latch 340 before the backing clutch has finished revolving.

When the key-locking mechanism is used, an additional clutch 347, which shall be designated the "clapper" clutch, is employed. This clutch is a substantial duplicate of the spacing clutch, except that where the spacing clutch carries the sprocket wheel 67 fast on the loose member of the clutch, the clapper clutch carries the cam disk 131. The actuating lever 348 of the clapper clutch is provided with a pin-engaging nose 349 (see Figs. 21 and 28) which forms one arm of a bell-crank lever provided with a collar 350 mounted loosely on shaft 130. The other arm 351 of this lever is secured through an upright arm 352 to the top of pivoted armature 353 which is operated by electro-magnet 354 mounted in a cavity 355 in the magnet frame, as in the case of the spacing magnet (Fig. 5). The armature of this magnet is normally held in the raised position by spring 356. This armature, like the armature of the spacing magnet, has a tail piece 353$^a$ which carries an insulating pin 353$^b$ adapted to operate contacts 353$^c$ and 353$^d$ as hereinafter described in connection with the telegraph circuits. The circuits of the clapper magnet will also then be described.

The frame of the machine may be of any desired construction. In the form shown, however, it comprises a base portion 377 and an upper portion 378 removably secured to the said base portion, the latter carrying the magnet frames, the key-board mechanism including the selector bars, and the small electric motor which drives the machine, while the clutches, striker bars, carriage mechanism and other parts are located in the upper frame portion. By making the frame separable in this manner the parts are rendered accessible.

The operation of the machine as thus far described is briefly as follows: It shall be assumed that a fresh paper blank has been fed into the machine to occupy the proper position for the commencement of the preparation of a message blank such, for example, as shown in Fig. 1, and that the machine is operated manually from the keyboard, and, further, in order to bring into operation as much of the mechanism as practicable it will be assumed that the keyboard is employed as a normally locked key-board, bringing into operation the "clapper" mechanism. This operation can be followed best by referring principally to Fig. 5. The clutch shaft 68 is continuously rotated by the motor 70 and the clapper magnet 354 is energized at regular intervals by the completion of an electric circuit to be described later. Each time this magnet becomes energized it draws its pivoted armature which removes the nose 349 of the clapper clutch 347 from the connecting pin of that clutch, but magnet 354 being energized only instantaneously, nose 349 will fly back to the path of the clutch pin immediately after receding therefrom. The effect of this is to cause the normally loose member of said clutch to become coupled to the fast member thereof for one revolution only, since nose 349 will engage its clutch pin and disengage the clutch members just as soon as the said pin comes around to the nose again. This causes cam 131 to rotate one revolution and in so revolving it acts upon the upper end of lever 129 to send the lower end of that lever forward and thus rock the locking bar 125 out of the path of the lips 124 of the key levers, thereby allowing the end 143 of that key which is pressed down to rise, the said locking bar immediately returning to its original position thereby locking the said keys, by passing beneath the lip of the operated key and over the lips of the keys not operated. The effect of this operation of the key is to bring its cam surface 143 into engagement with that row of cam lugs on the selector bars 134 immediately in line with the edge of the key operated, thus transmitting lateral motion to one, two or three of said bars, as the case may be, depending upon the combination of such bars representing the character which is to be impressed on the paper. These selector bars in thus being shifted, act through the lugs 145 on their ends, as described, to shift a corresponding number of combination bars 71 to the right, (see Fig. 3) viewing the front of the machine. These combination bars, in being thus shifted, strike the lip 156 on the lower edge of the pivoted bracket 155 of the electrical contact device (see Figs. 40 to 44) causing the central spring 151 of said device to engage spring contact 153, thereby completing a circuit, which energizes the spacer magnet 159, (see Fig. 30). The spacing magnet then pulls down its armature 162, the effect of which is to pull the nose 167 of the lever 166 of the spacing clutch out of engagement with the clutch pin of that clutch, thus allowing the fast and loose members of said clutch to become coupled together. The circuit of the spacing magnet, however, is broken immediately after it is completed, by the operation of contact device, Figs. 40 to 44, as hereinafter described, thus allowing the nose of the spacing clutch lever to fly back to the path of the clutch pin immediately after coupling up the clutch members. Therefore, when the clutch pin rotates one revolution it will again engage nose 167 and uncouple the clutch. The normally loose members of the spacing clutch therefore, rotates one revolution. In thus rotating the normally loose spacing clutch member 171 (Fig. 23) rotates sprocket 67 fast on said member and through this sprocket rotation is communicated to sprocket 65 on the shaft of the spacing screw, which is thereby started to rotate. The rotation of the spacing screw shaft causes the rotation of cam 98 mounted fast thereon, which cam is rotated in the direction of the dotted arrow, Fig. 4. Directly after this cam commences to rotate the latch head 97 on lever 96 will drop from the elevated portion of said cam down to a portion thereof considerably nearer its center. When this happens the releasing bar 90 under the latch tail pieces 72, acting through its connection with the lever 96 will be allowed to descend, thereby allowing that one of the tail pieces 72 which is above the row of alined slots in the combination bars corresponding to the combination for the character to be printed to be pulled by its spring 75 into the alined slots. This causes the operated latch to send its engaging shoulder 54 (see Fig. 34) into the path of the actuating bar 52.

When rotation was imparted to the spacing screw shaft, this also imparted rotation to the crank disk 63 which, acting through connecting rods 62, crank arms 61 and 58 and links 59 starts the actuating bar forward. This bar, in its forward travel, engages the head of the actuated latch 53, and continuing its forward movement pulls said latch along with it, and, since the said latch is pivoted to sliding bar 47 forward travel is imparted to this bar also. This movement of the sliding bar pulls the link 44 forward, and this link acting on the short arm of the striker bar lever to which it is connected, swings this striker bar quickly on its pivot, thereby sending the type on its head into engagement with the ribbon in front of the paper, also sending the lugs 9 on the striker bar head into engagement with those anvils of the punching mechanism corresponding to said lugs, thereby causing the operation of corresponding punching pins. When the actuating bar moves forward as described, it carries with it through the connection shown most clearly in Fig. 31, the lower end of lever 34, causing this lever to rock the shaft 32 so as to bring the stripper plate into the position shown in Fig. 11. After the perforation is effected and the actuating bar starts on its back travel, the same mechanism rocks the stripper shaft in the opposite direction, causing the stripper plate to return those pins which have been actuated to their original positions as shown in Fig. 10. In this position they are withdrawn from the paper.

As the frame of the actuating bar moved forward, lug 158 thereon engaged cam plate 157 of the contact mechanism shown more clearly in Figs. 40 to 44, thereby causing bracket 155 to tilt up and allow lever 147 to spring back to the position shown in Fig. 44, thus breaking the circuit of the spacing magnet.

As cam 98 continues its rotation the head 97 of the lever 96, (Figs. 50, 55 and 4) in engagement with the periphery of said cam, for about the first half of the revolution of said cam passes over a portion thereof substantially concentric with its center, while the actuated latch 53 is in engagement with the actuating bar and the printing and perforating is being actually done. At about the end of the first half of the revolution of this cam the head of lever 96 passes on to a slightly raised portion of said cam, and then on to a portion of said cam which increases rather rapidly in diameter. The effect of this is to send lever 96 rather rapidly downward for a short distance, thereby causing the releasing bar 90 to rise for a short distance rather suddenly. In thus rising this bar engages the lower edge of the tail piece of the actuating latch and rather quickly lifts it. The head of lever 96 then comes into engagement with a portion of cam 98 which very gradually increases in diameter terminating at shoulder 99 on said cam. The effect of this is to cause a more gradual rise of the bar 90 during the latter portion of its upper movement than at the beginning thereof. During the latter portion of such movement the bar 90 has to engage and lift all the latch tail pieces, whereas during the first portion of its travel upward it has to lift one only of said latches.

This is the end of the operations necessary to print and perforate the character on the paper. As these operations are repeated, the carriage will travel step by step from right to left across the machine.

When the desired number of characters have been formed on a line and it is desired to return the carriage to the commencement of a new line the backing key is operated. This key is just the same as any of the regular character keys, and is provided with its corresponding sliding bar 47, latch 53 and striker bar 2, the latter provided on its head with suitably arranged lugs 9 to cause the perforation of the paper with a code arrangement of perforations corresponding to the "backing" signal which, as will be seen from the diagram Fig. 2, occupy the *a*, *b* and *g* positions. On the striker bars for perforating the spacing, lining, backing and blanking signals the type are of course omitted. When this backing key is operated its sliding bar 47 passes first toward the front of the machine as do any of the other sliding bars and then travels back. In thus moving forward said sliding bar carries loop 313 forward out of engagement with shoulder 314 on arm 312 (see Fig. 28). This allows the forward end of arm 312 to rise until it strikes the under side of loop 313. Then, when the sliding bar carrying said loop has nearly reached the end of its back travel, said loop will engage shoulder 314 and push arm 312 backward. This rocks lever 284 back, thus removing nose 285 from the pin of the backing clutch, thereby coupling the normally stationary or loose member of said clutch to the rotating member and communicating through gears 288 and 289 (see Fig. 22) rotation to the backing shaft. This causes the carriage to be sent back to the commencement of its travel. When the carriage has about reached the end of its back travel, the lug 316 tripping dog 317 sends the lever 320 down, thereby releasing shoulder 314 from the upper edge of loop 313. This allows lever 284 to return its nose 285 to the backing clutch and thereby disengage the normally loose from the fast member of the clutch, stopping the rotation of the backing screw. When lever 284 was operated to start the backing screw, said lever imparted through sleeve 281, angular movement to lever 280, and this lever acting through arm 279 and loop 277 and shoulder 275 on arm 271, also caused lever 266 of the lining clutch to withdraw its nose from said clutch, thereby causing the fast and loose members of said clutch to become coupled and operate the lining shaft to feed the paper up a line. Directly after the withdrawal of the nose of the lining clutch from said clutch, shoulder 275 on arm 271, strikes cam plate 283. This causes the forward end of arm 271 to be sent downward, thereby removing shoulder 275 from engagement with the edge of loop 277. As soon as this happens the arm 271 becomes released and allows spring 268 to send the nose 265 of the lining clutch lever into position to engage the next pin of said clutch. Since this clutch is provided with four such pins the normally stationary member of said clutch will be rotated but a quarter revolution before it is disengaged in performing the regular lining operation. It will, therefore, be seen that when the carriage is sent back to the commencement of its travel the paper is automatically fed up a line.

If it is desired to pass to a new line without backing the carriage, this is effected by operating the lining key which, like the backing key, is provided with its corresponding sliding bar 47, latch 53 and striker bar 2, the latter carrying a suitable arrangement of lugs to cause the paper to be perforated with such an arrangement of perforations as will represent or transmit the lining signal. This lining signal, as will be seen from the diagram Fig. 2, is formed by perforations occupying the *a*, *b* and *f* positions. When the lining key is thus operated its sliding bar 47 travels forward to effect the perforation of the lining signal and allows the forward end of arm 270 (see Fig. 28) to rise and thereby place the forward edge of shoulder 273 in the path of loop 272. On the back travel of the sliding bar 47 connected to this loop, the said loop will strike the forward edge of shoulder 273 pushing arm 270 back and releasing the nose 265 from the pin of the lining clutch, thereby causing the normally loose member of said clutch to become coupled to the fast member which will then rotate the lining shaft. Directly after the nose 265 is thus withdrawn from the lining clutch, the shoulder 273 will engage cam plate 283, thereby disengaging said shoulder from the rear edge of loop 272, allowing the nose 265 to return to the lining clutch in time to engage the next pin so as to stop the rotation of the lining shaft.

When it is desired to space without printing, and to perforate the paper with a perforation corresponding to the spacing signal, the space bar is operated, and this causes the shifting of a certain combination bar (the *d* bar Fig. 38) necessary to cause the alinement of a certain combination of slots in said bars, as in the case of any other signal. This bar thus becoming shifted energizes, as before described, the magnet of the spacing clutch, thereby operating said clutch and causing the carriage to space as described. The alining of the slots in the combination bars to represent this spacing signal permits the engagement of the latch on a sliding bar 47 to operate a striker bar 2, having a lug suitably arranged thereon to operate the punching pin corresponding to the code arrangement for the transmission of a spacing signal.

The operation of feeding the paper up from one blank to a succeeding blank was fully described in the detail description of the machine, and, therefore, need not be repeated here.

In the foregoing operation of the machine it was assumed that the machine was manually controlled through the key-board.

If it is desired to operate the machine electrically either from a distance or locally, the bars 71 are simply shifted by the magnets 99, acting on said bars through their pivoted armatures engaging lugs on said bars as described. By energizing these magnets in certain combinations corresponding combinations of selector bars 71 may be operated. The rest of the operation of the machine is the same as when controlled manually from the keyboard.

When the machine is used as a combined manual transmitter and home recorder, that is, a recorder of the messages which it transmits, or used simply as a manual transmitter, the bars 134, actuated from the keyboard, operate a series of transmitting contacts which in turn act upon electric circuits as hereinafter described to transmit the signals. For this purpose each of the bars 134 in the machine shown is provided with an extension 357 at one end, and located respectively in line with these extensions are eight contact springs 358 supported by being clamped between two insulating blocks 359 and 360, and thus insulated from each other (see Figs. 64 to 69 inclusive). These supporting blocks are made fast to insulating supports 361 and 362 secured to a plate 363 made fast to the machine frame. The contact springs 358 are connected respectively to eight terminal rods 364 which are made fast in and extend through the blocks 361 and 362. The inner ends of these rods are electrically connected respectively to individual plug sockets 365 carried in an insulating block 366 secured to an extension on the bracket 363. These connections may be made by simply carrying leads from the various terminal rods 364 to their respective plug sockets, and are omitted from the drawings for the sake of clearness. These springs are arranged in two groups of four springs each and the springs of each group occupy a position between two sets of spring contact fingers 367 and 368. These fingers are integral respectively with metal plates 369 and 370 which are clamped between insulating blocks 359 and 371. The contact plates 369 and 370 connect respectively to terminal connecting rods 372 and 373 by means of extensions 374 and 375. These rods like the rods 364 are electrically connected as described to individual plug sockets 365. The contacts 358 are normally in electrical contact with fingers 367 and are pushed out of engagement therewith and into engagement with the fingers 368 by the ends of bars 134. Each of said bars carries on its contact actuating end a knob of insulation 376. The manner in which these contacts act to transmit the signals will more fully appear from the electrical diagrams and in connection with the description of the operations of signaling manually.

*The automatic transmitter.*—The object of the code perforations on the message blank is to control the operation of the automatic transmitter which, acting through suitable electric circuits may cause a machine such for example as the one above described, to automatically print the message represented by said perforations, or automatically reproduce, by both printing and perforating, a message blank such as the one used to control the transmitter. A form of such automatic transmitter is shown in Figs. 70 to 84 inclusive. This machine comprises essentially a series of electrical contacts controlled by the perforations in the message blank, a contact carrying carriage adapted to travel back and forth across the message blank over said perforations, conveying mechanism whereby the message blanks are fed up to the proper point to bring the rows of perforations into operative relation with said contacts, suitable carriage returning mechanism, and other parts, all of which will now be described in greater detail.

The prepared message blanks are fed to the transmitter preferably by passing them top edge down through a vertical chute 379, the lower end of which is curved as at 380 so as to direct the lower edge of the blank forward. This chute is made fast in any desired way to the top of the machine frame, which frame may consist simply of two elongated plates 381 secured in any suitable way to a base 382. The sides 381 of the machine shown are provided each with an elongated flange 383 which is in turn provided with a narrow flange 384, the latter acting to support a removable plate 385. Passing under said chute and over the flanges 383 are two conveyer belts 386, consisting each of a strip of flexible metal, or other suitable material. Made fast to each of these belts is a row of lugs or knobs 387, spaced apart equally, the distance from the center of one knob to the center of the next in a row, corresponding exactly to the distance between the centers of the successive perforations in the rows of perforations extending along the side margins of the message blank. These knobs extend through the belts and form extensions on both the outside and inside thereof. The belts 386 are carried each upon two drums 388 and 389 consisting each in the case shown, of a disk provided with an annular flange 390 (see Fig. 74). Each of these flanges is provided with a series of holes 391 which are spaced apart equally to register exactly with the knobs 387 on the belts, so that there shall be absolutely no relative displacement or slipping of said belts on the drums. Also secured to said belts, at suitable intervals, are a series of hooks 392, each of which is adapted to extend through an opening in said belts. Each of said hooks is carried by a spring 393 consisting of a small strip of metal secured at its end opposite said hook to the belt. Each of these springs is so bent that the normal tendency of the spring is to occupy a position at an angle to the belt as shown most clearly in Fig. 71, in which position the hook secured to the spring is drawn back to the inside of the belt with very little, if any, of its length extending through the opening in the belt.

The belts 386 in their travel bring the springs 393 into engagement with the upper side of the flange plates 383, and when this occurs the said springs are forced by said plates into a position substantially parallel to the belt, when the hooks 392 on said springs will extend substantially their full length through the belts. These hooks pass in this position under the chute 379 and engage the first two marginal perforations in the message blank in said chute and thereby cause the said blank to travel along with the belts. In doing so, the other marginal perforations of the blank engage the upwardly extending ends of the knobs 387 which keep the blank securely in the right position on the belts. (See Fig. 71ª where 4ª represents the message blank). In this way the message blanks are fed forward to the operating position. The chute 379 is cut away slightly at its under side above the respective belts, to allow the hooks 392 to pass.

In the flange 390 of each forward drum are two openings 394 (see Figs. 71 and 74) spaced apart diametrically opposite each other so as to register with each hook spring as it passes over the drum. As the successive hook springs reach these openings there is no longer anything to force the spring toward the belt, so that the springs jump back to their normal positions, thereby releasing the hooks from the paper or blank which then passes from the forward end of the machine.

In order to more securely hold the paper down on the belts, there may be provided retaining plates 395 which may consist each of a metal plate or bar made fast to the top of the machine and provided with a slot 396 to receive the knobs 387 and hooks 393. The lower face of these plates is near enough to the belts to keep the paper from flying up.

To keep the end of the paper or blank from passing upward as it emerges from the retaining plates which may cause it to become disengaged from its hooks too soon, there may be secured to the forward end of each of the retaining plates a pair of spring fingers 397 (see Figs. 70 and 73). These fingers are adapted to rest upon the top of the blank and press it down against the belts.

The forward and rear drums are mounted respectively on two shafts 398 and 399, the former being journaled in fixed bearings in the sides of the machine frame while the latter is preferably journaled in two adjustable bearings 400, adjustable laterally by means of screws 400ª to effect the proper adjustment of the conveyer belts.

The forward shaft 398 carries the sprocket 401 fast on one end thereof, and this sprocket is geared to a sprocket 402 fast on the end of a counter shaft 403 (see Fig. 72) extending across the machine and journaled in the side frames thereof. Also mounted on the countershaft 403 and fast thereon, is a larger sprocket 404 which is geared to a sprocket 405 fast on the normally loose member of a clutch 406, mounted on shaft 407. This clutch is the lining clutch of the transmitter and is substantially a duplicate of the lining clutch of the printer hereinbefore shown and described in detail, and, therefore, need not here be described again.

The clutch shaft 407 is constantly driven by sprocket 408 made fast thereon and geared through sprocket 409 and 410 on a countershaft 411, to a sprocket 412 on the armature shaft of a small electric motor 413 or other suitable source of power.

The operation of the paper feed or lining clutch 406 is, in this case, effected electrically by magnet 414 provided with a pivoted armature 415 which is flexibly connected to the end of an arm 416 of a bellcrank lever, provided with a nose 418 at its upper end to operate the lining clutch, as in the case of the printer. This bell-crank lever is mounted by means of a sleeve 419 loosely on the countershaft 407ª. This lever is not shown in side elevation, since it is exactly like the lever shown in Fig. 71 connected to the blanking magnet 479. The magnet 414 is mounted in a cavity in a frame 420 which extends across the machine and is supported by the sides thereof in any desired way, (see Fig. 71), which while showing another magnet, the mounting of all of the magnets is alike, and the clutch magnets themselves are alike.

It is very important that the shaft 398 be caused to stop the message blank exactly in the right place in feeding it up to the operating position and that during the transmission, this message blank be not moved in the slightest degree. To meet these requirements there is made fast to the shaft 398 a star wheel 421 against the teeth of which is pressed a small roller 422, carried on the upper end of a pivoted arm 423 pulled toward the star wheel by spring 424. The teeth of this star wheel are so spaced that when roller 422 passes from one tooth to the next the blank is fed up one line.

The traveling contact carriage comprises, among other parts, a bracket consisting of two arms 425 extending from an integral sleeve 426, which is mounted to slide on a rod 427 mounted in upright supports 428 on each side of the machine. This rod is stationary and merely acts as a support for the contact carriage. Mounted in each of said arms forward of the rod 427 is a bushing 429 rotatable in said arms, and passing through the bushings 429 is a square shaft 430 which extends across the machine and is journaled in the supports 428. Mounted fast on top of the arms 425, forward of shaft 430, is a plate 431, having secured to it, by means of depending arms 433, a plate 434, the whole forming a rigid frame carried by and adapted to travel with arms 425 transversely of the machine. Mounted between the plates 431 and 434, for vertical movement, is a plate 435 (see Figs. 77 to 79), provided with two upwardly extending guide pins 436 made fast thereto and slidable in two vertical collars 437 on plate 431.

The plate 435 is supported at its sides by trunnions 438ª resting in slots 438ᵇ (see Figs. 77 to 79) in the forward ends of two lever arms 438 mounted on the square shaft 430 and adapted to turn therewith.

Mounted in the plate 435 for vertical movement therein, is a series of eight pins 439 (see Figs. 77 to 84) corresponding in position exactly to the punching pins of the printer so far as the code arrangement is concerned. These pins pass, at their upper ends, through openings in the plate 431 which they fit loosely and at their lower ends through similar openings in plate 434, which they also fit loosely, that is, loose enough to slide in. Between the plates 431 and 435 each of these pins is provided with an enlarged portion 440 adapted to be engaged by the plate 435.

Directly beneath the line of travel of the pins 439 across the machine is a plate 441 perforated throughout the length of the travel of said pins, by openings 442 which are arranged to register exactly with the pins in each position of rest of the contact carriage. In the top plan view, Fig. 73, a comparatively few of the openings 442 are shown, it being understood that these openings extend throughout the path of the pins 439. Plate 435 is normally held up in that position shown in Fig. 77 by means of springs 443 (see Figs. 70 and 71) carried on the collars 437 and held between plate 431 and stop-nuts 444 on the tops of the guide pins 436. The upper ends of pins 439 lie respectively beneath eight contact springs 445 which in turn are located just above a corresponding number of contact springs 446. These contact springs are supported by being clamped between blocks of insulation 447 made fast to plate 431. In this way, each spring contact is insulated from the other, and the contacts 445 are normally held up out of engagement with contacts 446 by the pins 439. At proper times, as hereinafter described, reciprocating motion is imparted to plate 435 through a cam 448 fast on shaft 449 of the spacing screw, said cam engaging a roller 450 on one end of a lever 451 made fast to one end of the square shaft 430.

The spacing screw of the transmitter being a substantial duplicate of that of the printer hereinbefore described, need not here be described again. When this screw is rotated, its threads engage those of a nut 452 carried by the contact carriage and thereby cause said carriage to be advanced in its travel across the machine the distance of one letter space for each revolution of said screw, as in the printer and perforator was the case with the paper carriage. The nut 452 is mounted on two pins 453 fast in the arms 425 of the carriage frame and is adjustable on said pins by means of adjusting screws 454. Similarly mounted between arms 425 is a block 455 carrying a small roller 456 corresponding to the backing roller 292 on the printer and perforator. This roller 456 of the transmitter, is adapted to be engaged by the raised spiral 457 (see Fig. 73) of the backing screw, which is also a substantial duplicate of the backing screw described in connection with the printer and perforator.

The spacing screw is rotated by means of a sprocket 458 fast on the shaft of said screw and geared to a sprocket 459 fast on a long sleeve 460 (see Fig. 73) mounted loosely on the clutch shaft. This sleeve is made fast at its end opposite the sprocket to the normally stationary member of the spacing clutch 461 (see Fig. 72). This clutch is substantially the same in construction as the spacing clutch of the printer and perforator hereinbefore described and is operated by magnet 462, the pivoted armature 463 of which is flexibly connected to the arm 464 of the bell-crank lever which carries the clutch actuating nose 465 and which lever is loosely fulcrumed on shaft 407ª. The operation of the nose 465, in connection with this clutch, is the same as described in connection with the printer and perforator.

The backing screw (see Fig. 73) receives its motion through a sprocket 466, provided with a sleeve hub 467 mounted loosely on the shaft of the backing screw. This sleeve 467 transmits motion to the shaft of the backing screw through the pin and sleeve connection 468, 469 controlled by a cam operated arm 470, as in the printer and perforator. In the transmitter substantially the same mechanism is employed for uncoupling the backing screw from its driving sprocket each time the spacing screw operates as is employed in the printer and perforator, and fully described in connection therewith. It is, therefore, unnecessary to repeat here the detail description of that mechanism, the corresponding mechanism of the transmitter being clearly shown in Fig. 73, (parts 468 to 470).

Sprocket 466 on the shaft of the backing screw is geared to the sprocket 471 fast on an elongated sleeve 472 (see Fig. 72) mounted loosely on the clutch shaft 407 and made fast to the normally stationary member of the backing clutch 473. This clutch is also substantially the same in construction as the backing clutch of the printer and perforator. The actuating nose 474 of this clutch is carried on the upper end of a bell-crank lever carried by a collar 475 mounted fast on shaft 407$^a$. This bell-crank lever, however, unlike the corresponding part in the printer and perforator, is operated electrically by means of a magnet 476 the pivoted armature 477 of which is flexibly connected to the arm 478 of said lever. This magnet, its armature and connection to arm 478 are the same in construction and arrangement as the magnet 479, its armature and connection to its bell-crank shown in Fig. 71.

When magnet 476 operates its armature and pulls arm 478 down, thereby withdrawing the nose 474 from the backing clutch and starting the carriage backing mechanism, a latch 474$^a$ engages a shoulder 474$^b$ (see Fig. 76) on the top of the backing clutch lever and holds said nose out of engagement with said clutch until released by a cam 474$^c$ on the contact carriage, engaging the upper end of a lever 474$^d$ mounted on the same shaft 474$^e$ with latch 474$^a$ and extending up through the top of the machine. The latch 474$^a$ is raised by cam 474$^c$ against tension of spring 474$^f$, secured to said lever 474$^d$ and to a pin 474$^g$ secured to the side of the machine. By this means the backing mechanism is automatically stopped as soon as the contact carriage reaches the end of its back travel.

The message blank is fed up to the proper point so that the first line of perforations will be in position to receive the contact actuating pin, by mechanism which acts to put the lining mechanism into operation and continue it in operation until the blank has reached the proper point. This operation corresponds substantially to the operation of "blanking" in the printer and perforator, but the mechanisms for accomplishing it are not the same, at least not the same in the machines herein shown. In the transmitter, this mechanism consists among other parts, of a magnet 479 (see Fig. 71) provided with a pivoted armature 480 similar to the other magnets of the transmitter, said armature being pivotally connected to an arm 481 of a bell-crank lever, the other arm of which extends upward and is provided with a nose 482, all corresponding exactly to the bell-crank actuating levers of the clutches. The nose 482, however, does not engage a clutch, but is normally held against a disk 483 on shaft 407 under tension of armature spring 484. All of the other magnet armatures of the transmitter have similar springs for holding their armatures normally up as in the case shown in Fig. 71, thereby normally forcing all of the clutch actuating noses toward the clutches. The disk 483 simply acts as a stop to limit the movement of the bell-crank lever in one direction. This lever is fast on a sleeve 485 which is loose on shaft 407$^a$ and is provided at one end with a lug 486 (Fig. 72) adapted to extend into an elongated recess in the end of sleeve 419 which carries the actuating lever of the lining clutch. Therefore, every time sleeve 485 is rotated in one direction, it carries sleeve 419 with it, thereby causing the fast and loose members of the lining clutch to become coupled and setting the lining mechanism in operation. The opening in which lug 486 works, however, is long enough to allow a certain amount of lost motion between said lug and the sleeve 419, so that when the sleeve 419 is rotated in the regular lining operation, the sleeve 485 of the blanking device is not necessarily rotated. The necessary rotation is imparted to sleeve 485 to accomplish the above result when the magnet becomes energized and pulls down on its armature, causing its bell-crank lever to rotate said sleeve. For the purpose of holding this bell-crank lever in position long enough to bring the controlling blank to the proper place, the upright arm of said bell-crank is connected by means of arm 487, to a lever 488 fulcrumed at its lower end on a shaft 489 and carrying at its upper end a roller 490 adapted to be held against the periphery of a cam 499 fast on the shaft 398.

When arm 481 is pulled down by magnet 479, this forces arm 487 to the left (Fig. 71), and when this happens, a pin 491 fast on lever 488 engages the front of a shoulder 492 (Figs. 71 and 76$^a$) on the upper edge of the long arm 493 of a bell-crank lever fulcrumed on a shaft 494, and having its short arm 495 connected by spring 496 to the lever 488 by which the said arm is normally forced upward against said pin. The shoulder 492 then holds the lever 488 back so that its roller 490 will not be engaged by either of the lugs 498 on the cam 499. The lever 488 acting through arm 487 will thus hold the bell-crank connected to armature 480 back. The lining shaft will, therefore, continue rotating until one of the lugs 500, on a cam 501 fast on shaft 398 engages a roller 502 journaled on arm 493, thereby forcing said arm down and allowing lever 488 to be pulled back to the right by spring 496, since shoulder 492 is then below pin 491. This sends the backing bell-crank lever forward, and rotates sleeve 485 in such a direction that its lug 486 will allow sleeve 419 (see Fig. 72) to rotate and send the nose of the lining clutch lever into that clutch and thereby disconnect the loose from the fast member, stopping the lining mechanism from "blanking."

In the transmitter as in the printer and perforator, whenever the carriage is sent back to the commencement of its travel it automatically feeds the controlling blank up a line, and when the transmitter performs the "blanking" operation herein described it automatically sends the carriage back to the beginning of its travel as well as feeds the paper up. These operations are combined in the transmitter by the arrangement of the circuit connections of the lining, backing and blanking magnets as will be fully described later on.

Mounted fast on shaft 407ᵃ (see Fig. 71) is a lever 504 to which is connected the lower end of a link 505 having its other end connected to a latch 506 fulcrumed on a shaft 507, and adapted to be at times brought into locking engagement with a pin 508 on the actuating lever arm of the spacing clutch. The function of this mechanism is to lock the spacing clutch against operation when the backing mechanism is operating. The actuating lever of the backing mechanism is fast on the same shaft 407ᵃ as the arm 504. Hence, each time the backing mechanism starts, the arm 504 will be rotated downward. This, acting through link 505, pulls latch 506 down causing it to act as a stop against the movement of pin 508 and hence against the operating lever of the spacing clutch. This mechanism is substantially a duplicate of the mechanism performing a similar function in the printer and perforator.

The lugs 498 on cam disk 499 are so disposed that should the operation of lining normally cause the next succeeding blank to stop with its printed heading under the contact carriage, one of the lugs 498 will engage roller 490, thus forcing lever 488 to the left, and thereby putting into operation the blanking device and causing this controlling blank to be fed up to the proper position.

Insulated contacts 409 on the side of the machine (see Fig. 70) operated by arm 510 carried on a shaft 511 which is rotatable by means of similar lugs 512 and 513 on the periphery of the loose members of the backing and spacing clutches, respectively, acting upon rollers 514 and 515 carried by upright arms 516 and 517, respectively, made fast to shaft 511, constitute a clearing out mechanism, the function of which will appear more fully in connection with the description of the general operation of the machine.

The commutator 518 (see Fig. 72) mounted for rotation on a stud shaft 519 on the side of the transmitter and driven by sprocket 520 geared to a sprocket 521 fast on the counter shaft 411, is employed when the transmitter is connected direct to the receiver as when automatically transcribing messages, as will also be more fully understood later in this description. This commutator has a stepped segment 522 and four brushes 523 to 526, inclusive, the connections of which will be described later.

The arrangement of the electrical circuits of the automatic transmitter are shown in the diagrams Figs 85 and 87. Reference, however, will first be had more particularly to Fig. 85, which, while showing a very special case, brings out in a more elementary way the operative connection or relation between the transmitter and receiver. The case illustrated in this diagram (Fig. 85) is that in which the transmitter mechanism is directly connected to the receiver which, in practice, would be the case, for example, where the receiver acts as an automatic printer to transcribe the messages from the perforated forms, in which they may be received, into messages bearing printed matter only, for delivery to the addressee.

Referring to Fig. 85, the group of contacts on the left indicates diagrammatically the group of eight pairs of contact springs 445, 446, operated by the pins 439 of the automatic transmitter, which are in turn controlled by the perforations in the message blank. The slanting row of magnets on the right represent the group of eight magnets which operate the combination bars of the printer, while at the top of the diagram are indicated the backing, spacing and lining magnets and their respective clutches, and the blanking device of the transmitter. In this case, the eight sets of transmitter contacts 445, 446 operate to control the lining, backing and blank mechanisms of the transmitter and the eight magnets 99 of the printer, through the medium of eight relays 527. Each of these relays is provided with two independently excited magnets.

The eight pairs of contact springs 445, 446 form the terminal across a break in eight branch circuits which include respectively the exciting or forward coil 528 of one magnet of each of said relays. The other magnet coils of said relays are all connected in series with the cam operated contacts 509 of the transmitter, the function of the magnets excited by these coils being to return the relay armatures to their back stop contacts after each signal, the arm 510 acting at such times to complete the circuit through these coils by bringing the contacts 509 into engagement with each other.

The tongues of the relays 527 and their forward tongue contacts form the terminals of a normal break in eight other branch circuits which include respectively the coils of the eight printer magnets 99. The tongues of certain of these relays also operate groups of spring contacts which, acting through circuits which will be traced later, control the lining, backing and blanking magnets of the transmitter. The commutator 518 acts to complete at intervals certain circuits hereinafter traced.

Let it be assumed that the power circuits of both motors 470 (the printer motor) and 413 (the transmitter motor) are closed and these motors continuously rotating. One of the prepared controlling blanks, which we shall assume is the one illustrated in Fig. 1, is placed top edge down in the chute 379 of the automatic transmitter. Contact 530 is then closed, which may be effected by pressing a push button or operating any suitable key or switch for making instantaneous contact. The closing of this contact completes a circuit through the blanking, lining and backing magnets 479, 414, and 478, respectively, which may be traced as follows: For the magnet 479 the circuit is from the positive supply main 531 through conductor 532, magnet 479, conductor 533, contact 530, wire joint 534, brushes 525 and 523 of the commutator 518 whose segment 522 will have short circuited said brushes, thence by conductor 535 to the negative supply main 536. Current passing through this circuit energized magnet 479 which, operating its armature, rotates sleeve 485 (see Fig. 72), thus imparting through lug 486 rotation to sleeve 419 to a limited extent. This causes the nose 418 of the lining clutch to be withdrawn from said clutch, thereby starting that clutch into operation to effect the blanking, that is, to bring the prepared blank up to the operating position. When sleeve 485 was rotated by the energization of magnet 479, the said sleeve was locked in its operated position through arm 487 acting in connection with the lever 488, pin 491 and lug 492 as described, allowing the transmitter belts to travel forward under power transmitted through the lining clutch until one of the lugs 498 engaging roller 502 releases arm 487 by lowering the lug 492. When this releasing takes place the disengaging nose of the lining clutch will be allowed to fly back to engage one of the pins of that clutch and thereby uncouple the normally loose member from the fast member thereof. This stops the controlling blank in the operating position where the perforations corresponding to the first line of printed matter (W2795 14 PD.) lie in the path of the travel of the contact controlling pins of the automatic transmitter. This first line of matter simply identifies the message according to the usage of American commercial telegraphs and further than this forms no part of the invention.

When contact was closed at 530 the lining magnet 414 received current over the following circuit: conductor 532, wire joint 560, magnet 414, contact springs 551 and 551ª, contact springs 552 and 552ª, thence through contact 530 back to negative main as traced above for magnet 479. At the same time a circuit was completed through backing magnet 476 as follows: conductor 532, wire joint 560ª, magnet 476, contact springs 552 and 552ª and thence back to negative return as traced above for magnet 414. This returns the contact carriage to the commencement of its travel in case it was not already there when the blank was placed in the machine.

Commutator 518, it will be understood, is rotated constantly, at a speed somewhat slower than shaft 407, and at the moment that the first line of printed characters on the controlling blank come into the operating position, assume that brushes of said commutator will occupy about the position indicated by the dotted line $w-x$, Fig. 85. Then, as this commutator continues rotating it brings its segment into contact first with brushes 523 and 524 alone. This completes the circuit of the transmitter spacing clutch magnet 462 and thereby causes the shaft of the spacing screw of the transmitter to rotate. The circuit which thus energizes said spacing magnet may be traced as follows: from positive supply main 531 through conductor 532, magnet 462, conductor 537, brushes 524 and 523, through return conductor 535 to the negative supply main.

The first thing that happens after the transmitter spacing shaft commences to rotate is that the lug 513 on the spacing clutch (indicated diagrammatically in Fig. 80) engages roller 515 carried by lever 517, rocking arm 510 in a direction to bring together contacts 509. This sends a "clearing" impulse through the tongue-returning or back coils 529 of all the relays 527. This circuit may be traced as follows: from positive supply terminal 531 through conductor 538, thence through the back coil 529 of each of the relays 527, through contacts 509, thence by conductor 539 to the negative supply main. This sends the tongues of all the relays 527 to their back stop contacts, if any of the said tongues were at the time away from said contacts.

Immediately after the operation of cam lug 513 to close contacts 509 (see Figs. 78, 81 and 83) the cam 448 on the spacing screw shaft operating on lever 451 causes plate 435 of the contact carriage of the transmitter to be lowered. This allows the pins 439 corresponding to the $e$ and $f$ code positions, (the letter W) to drop through the perforations in the message blank with which they register. In Fig. 78, the pins shown thus operated are not the $e$ and $f$ pins but, as shown, they illustrate the idea. By these pins passing through their perforations they cause the two spring contacts 445 and 446 above them to be brought into engagement respectively, with each other (see Fig. 83). By closing contacts at these points circuits are closed through the forward coils of the e and f relays, Fig. 85. This sends the tongues of said e and f relays to their forward contacts partially completing circuits to the e and f printer magnets 99. Referring to Fig. 85, the circuits through the forward coils of said relays may be traced as follows: from the positive supply main 531, conductor 540, wire joining 541, 542 and 543, thence through forward coils of the e and f relays, the e and f transmitter pin controlled contacts, thence through return conductor 544 to the negative supply main. The circuits through the e and f printer magnets may be traced as follows: from positive supply main 531, through conductor 545, thence through the coils of the e and f printer magnets, the tongues and forward contacts of the e and f relays, conductor 546, commutator brush 525, segment 522, brush 523, back to the negative supply main. The printer magnets thus energized act to close contacts 151 and 153. These contacts correspond to similarly numbered contacts of the device shown in detail in Figs. 40 to 44, inclusive. The commutator 518 in its rotation next short circuits brushes 523 and 526. When this happens in connection with the closing of contacts 151 and 153, a circuit is completed through the printer spacing magnet 462 which may be traced as follows: from positive supply main 531, through conductor 547, spacing clutch magnet 159 of the printer, contacts 153 and 151, conductor 548, commutator brushes 526, segment 522, brush 523, conductor 535, back to the negative supply main. The printer then operates to print the character, as described. The continued rotation of cam 448 (see Fig. 79), after lowering plate 435 causes said plate to rise, carrying with it those pins which had dropped through the blank, thus freeing said pins from contact with the controlling blank. Then, as the spacing screw continues its rotation, its threaded portion will engage nut 452 on the contact carriage of the transmitter and cause the said carriage to be spaced up to the next position which will bring the contact controlling pins into the next transmitting position. After a short interval, the spacing magnet will receive another impulse, causing the spacing screw shaft to rotate, and then those pins which are in line with the c, g and h code perforations, corresponding to the numeral 2, (the next character in the line) will drop through these perforations. The printer will then print the numeral 2, the operations being substantially as described with the printing of the letter "W", except that in the case of the numeral 2, the c, g and h transmitter contacts, the c, g and h relays and the c, g and h printer magnets operate. The printer is thus caused to print the characters W2795.

It will be seen from Fig. 1 that immediately following the numeral 5 in the first row of characters which we are now assuming to be those which are being printed, there is a word space. Immediately under this space is a perforation occupying the code position to transmit the spacing signal. When this spacing signal perforation comes beneath the transmitter pin registering with it, the said pin will drop through said perforation, allow the d contacts 445 and 446 of the transmitter to engage each other and these will act in conjunction with the d relay and the d printer magnet to complete the circuit of the printer spacing magnet, which will cause the printer carriage to space up as described. The printing of the characters 14PD. is then carried on as described with regard to the other characters of the line. When all the characters in this line have been printed, the transmitter contact carriage automatically starts back to the commencement of its travel, and the controlling blank is fed up a distance of one line, bringing the perforations of the second line of characters into the path of the contact pins. The printer carriage is also caused to be sent back to the commencement of its travel, and to automatically feed the paper therein up a line. These operations are controlled by the combination of code perforations occupying, on the transmitting blank, the a, b and g positions. These perforations will be seen in Fig. 1 immediately at the right hand end of the perforations corresponding to the first line "W2795 14 PD." on the controlling blank. When the contact controlling pins of the transmitter register with these perforations they will operate the a, b and g transmitter contacts, the a, b and g printer magnets 99. The effect of this will be to close the circuits through the lining and backing magnets 414 and 475 of the transmitter and through the a, b and g printer magnets 99. The circuit through the lining and backing magnets 414 and 476, thus completed may be traced as follows: from the positive supply main 531, through conductor 532 to the magnet 414, thence by conductor 549, contacts 551 and 551ª, contacts 552 and 553 of the g (operated) relay, thence through conductor 554, contacts 555—556 of the b (operated) relay, contacts 557—558 of the a (operated) relay, conductor 559, brush 525 of commutator 518, brush 523 of said commutator, conductor 535, back to the negative supply main. The backing clutch magnet 476, the circuit may be traced as follows: from wire joint 560ª, magnet 476, conductor 561, contact spring 552, and thence back to the negative supply main over the same circuit as traced for the lining magnet 414, the connections being so arranged that each time the backing magnet is energized the lining magnet is energized, thus causing the transmitter to automatically line each time that it backs.

The completion of the circuits to the $a$, $b$ and $g$ printer magnets 99 energizes these magnets and causes the printer to automatically "line" and "back" as fully described in connection with said printer. The circuits of the magnets 99, thus completed, pass through the tongue and forward contacts of the $a$, $b$ and $g$, relays back to the negative supply main, just as in the case of the printing of a letter, hence these circuits need not be traced over again.

At the end of some lines, as for example the third line of the transmitting blank Fig. 1, it is not necessary to go back to the commencement of the carriage travel to commence a new line. In such a case the combination of perforations occurring right after "John Doe," and representing the "line" combination operate the $a$, $b$ and $f$ transmitter contacts and these in turn operate the $a$, $b$ and $f$ relays which in turn operate their forward contacts to send current to the $a$, $b$ and $f$ printer magnets. These relays also operate to close contact through springs 557—558, 555—556, and 550—551 sending current to the coils of the transmitter lining magnet 414 which operates its clutch and through this sets in operation the lining mechanism of the transmitter. The energization of the $a$, $b$ and $f$ magnets of the printer cause the operation of the lining clutch of that machine as fully described, and this causes the paper of the printer to be fed up to a new line position.

At the end of the last line of the telegram Fig. 1, will be seen a combination of perforations occupying the $a$, $b$ and $h$ positions. This is the code arrangement for the signal which will cause the used blank to be fed out of the machine (both transmitter and receiver) and a fresh blank brought up into position. This operation is effected as follows: When the transmitter pins reach the blanking perforations referred to, the $a$, $b$ and $h$ transmitter contacts are operated, and these in turn operate the $a$, $b$ and $h$ relays which, sending their tongues against their forward contacts, operate to send current to the $a$, $b$ and $h$ printer magnets, thereby causing these magnets to operate the blanking clutch of the printer as fully described. The tongues of the $a$, $b$, and $h$ relays also operate to close contact through contact springs 557—558, 555—556 and 562—563, energizing and blanking magnet 479 of the transmitter, and causing it to set in operation the blanking mechanism of the transmitter by which the new controlling blank is brought into the operating position, an operation which was fully described in the detail description of the transmitter.

When these two machines are operated at a distance from each other the improved method of line operation hereinbefore referred to, and which will now be more fully described, is preferably employed. The general theory of this method will be more readily understood from the simplified diagram Fig. 86 in which the apparatus on the left represents in an elementary way the transmitting and that on the right the receiving apparatus at the two terminals of a short simplex line. In such a case there are located respectively at the two terminals of the line two shafts 564 and 565 which are continuously driven, preferably by small electric motors 566 and 567 at a constant predetermined speed within a small percentage variation. Mounted on these shafts are two clutches 568 and 569, respectively, which, in construction, may be the same as the printer spacing clutch herein described, or of any other suitable construction, their showing in Fig. 86 being purely diagrammatic.

The clutch members 570 and 571 are mounted fast on the shafts 564 and 565 and continuously rotate therewith. The clutch members 572 and 573 are normally stationary on said shafts. These normally stationary clutch members are connected to drive brushes 574 and 575, respectively, of two segmented commutators 576 and 577 which connect to line 578 through brushes 579 and 580, and contact rings 581 and 582, the brushes 579 and 580 being also driven by the normally stationary clutch members. The commutators 576 and 577 may be identical. One segment in each of said commutators, the ones upon which brushes normally rest, are connected to one magnet coil each of two relays 583 and 584, thence at the sending end of the line to a suitable keyboard or other transmitting device, indicated by the two keys 585 and thence to a source of current 586, which, in the case shown, consists of a dynamo or any other suitable source of direct current connected to the keyboard and to earth. The other segments of the transmitting commutator connect, respectively, to an equal number of key contacts, two only of which are shown; while corresponding segments on the receiving commutator connect respectively, to receiving devices, two of which are indicated in the diagram by relays 587. The clutches 568 and 569 are operated respectively, by magnets 588 and 589, as hereinafter described.

The operation is as follows: Upon depressing one of the keys 585, the top one for example, the following circuit is established: positive brush of dynamo 586, contact 590, lower coil of relay 583, top segment of commutator 576, brushes 574 and 579, ring 581, line 578, ring 582 at receiving end, brushes 580 and 575, top segment of commutator 577, lower coil of relay 584, to ground. This results in the relays 583 and 584 becoming simultaneously energized and sending their tongues against their forward contacts, and this causes the simultaneous energization of the two magnets 588 and 589, which operate the respective clutches. These magnets then simultaneously attract their armatures and thereby simultaneously connect the normally loose members 570 and 571 of the clutches to the normally rotating ones by withdrawing the latches 591 and 592 from the sliding clutch pins 593 and 594, thereby allowing the clutch pins to be sent by springs 595 and 596 into engagement with the teeth of the normally rotating clutch members. The brushes 574 and 575 of the sending and receiving commutators thus start up and make one revolution, when they again come to rest in the positions shown.

Whenever the clutch magnets operate as described, they act to automatically break their own operating circuits by means of contacts 597 and 598, which are caused to complete circuits including respectively the two coils of the relays 583, 584 which bring the relay tongues to the back stops. In this way the clutch latches are caused by springs 599 and 600 to immediately jump back to engage the clutch pin at the end of single revolution of the clutch and thereby stop the rotation of the commutator brushes. When brush 574 of the sending commutator reaches the segment connected to contact 601 of top key 585 an impulse is sent over line through a corresponding connected segment at the receiving end to relay 587 on the left. In this purely elementary diagram Fig. 86, no means are shown for restoring tongues of relays 587 to their back stops after being sent to their forward stops by the reception of a signal. This may be done either mechanically or electrically in a variety of ways. In the diagrams showing more completely the practical operation of the apparatus, these relay tongues are returned to normal electrically, as will fully appear later.

In the foregoing case it is assumed that the line is a very short one in which the lag of the current is practically a negligible quantity, and that the electrical and mechanical lag of the local apparatus is a practically negligible quantity; in actual practice there would be a lag in the local apparatus, even on a short line, and a lag on the current on a longer line. Since this lag either mechanical or electrical is constant for any given set of conditions it may be compensated for by permanent adjustment.

Since the two shafts 564 and 565 are rotated approximately in synchronism and are simultaneously started in motion at the two ends of the line, the sending and receiving commutator brushes will rotate in practical synchronism for a single revolution, and if a slight interval is allowed between succeeding signals the two machines will operate in unison.

The apparatus at each station consisting essentially of the segmented commutator together with its brushes and collector rings, the clutch and its shaft, and the clutch driving motor, constitute what will herein be designated a "line unit." In some cases, however, this line unit comprises additional commutators and some other parts, as hereinafter described. In practice, these line units are standardized and constitute each an individual unit of the general system.

In the simple case shown in Fig. 86 it is assumed that the two motors 566 and 567 have been so regulated that they run in approximate synchronism, no automatic means for synchronizing these motors being shown in diagram. Automatic means for synchronizing these motors, however, is hereinafter shown and will be described in connection with a more complete showing of the line operation in connection with Figs. 87, 88 and 89. In all of these cases the line units are identical, and are substantially the same as described with relation to Fig. 86, except there is an additional commutator and collector ring employed for restoring the banks of combination relays to normal, and each line unit motor is equipped with speed regulating means. Before taking up the other features of the apparatus and connections shown in these diagrams the regulation of the line unit motors will be described. Inasmuch as this is the same for each motor, reference to Fig. 87 alone will suffice. These line unit motors are shunt wound and each has connected in its field a regulating rheostat 602 by which the motor is regulated at first by hand approximately to the predetermined speed. The line unit motor 603 receives its driving current from two direct current supply mains 604 and 605. Connected in series with one of the armature terminals of the motor is a resistance 606 having a condenser 607 shunted across its terminals. Each of these motors drives a crown commutator 608 upon which rests three brushes 609, 610, and 611. The intermediate brush 610 is connected to one side of resistance 606 and the brushes 609 and 611 are connected respectively, to two stationary contacts 612 and 613 between which moves a contact spring 614 fastened to a vibrating reed 615 preferably a hardened steel fork. Seated between the prongs of this fork is a magnet 616 having one terminal connected to the negative supply main 605 and the other through a resistance 617 to a contact 612ª of the vibrating reed. When at rest the reed spring 614 normally rests against contacts 612 and 612ª. When the electric power is turned on, the magnet 616 becomes energized and attracts the prong carrying contact 614, opens contact with contacts 612 and 612ª and deënergizes magnet 616, thus causing the spring 614 to return to said contacts. In this way the reed is kept vibrating at a rate substantially that of its free vibration except as slightly affected by magnet 616 and contacts 612, 612ª and 613. The rate of virbation of the reed and the segments in the crown commutator 608 are so chosen that when the line unit motor is running at the speed desired the same number of segments pass under the central brush 610 as the reed makes half vibrations in the same length of time. Any change of voltage of the driving current, or load or other cause which would normally change the speed of the motor would, in this case, change only the phase relation between the commutator 608 and the vibrations of the reed, and thus allow the motor to take more or less current until its speed corresponds to that of the vibrating reed, and therefore, this change of voltage or other cause will have no effect whatever upon the speed of the motor except during the minute interval during which the change is taking place. It is evident, then, that when the two motors are each controlled by such a device their speeds will be the same, assuming the sole condition that the natural rate of vibration of the reeds is the same. In applying this method of regulation, it is preferred not to time the reed of each machine with the reed of the machine with which it works, but it is proposed that each reed shall be standardized in the laboratory where the machines are manufactured. By this means, any machine equipped with such reed is operative with any other machine so equipped without adjustment of the reeds. This method is in contrast with other regulating -systems using vibrating reeds, where the reeds are separately tuned in pairs, or the rate of one reed is locally modified by the controlling effect of the signaling current received from the other machine.

In those synchronous telegraph systems wherein the sending and the receiving commutator brushes constantly rotate, it is necessary to adjust these brushes so that they will approximately simultaneously engage corresponding segments. To effect this adjustment there is usually provided a special device embodying an additional segment on each commutator, and the adjustment consists in causing the brushes to arrive approximately simultaneously on this segment at the two ends of the line. Such adjustment is known as "finding the letter" and has to be made every time synchronism has been interrupted. According to the present invention, the necessity of providing additional means for performing the so-called operation of "finding the letter " is rendered unnecessary, since the transmitting and receiving commutator brushes at the two ends of the line start up afresh as it were for each signal.

Assuming that the receiving apparatus as shown in Fig. 89 is used in connection with the automatic transmitting apparatus shown in Fig. 87, the apparatus and circuits shown in these two diagrams will be clear from the following description. The line current is supplied from two direct current dynamos 618 and 619, Fig. 87, which are so connected that the dynamo 618 delivers to the line a positive potential, and the dynamo 619 a negative potential, the two inner brushes of the dynamos being connected to earth. As shown, current is delivered to line from dynamo 619 normally as follows: From intermediate dynamo connection 620 to earth, thence to earth connection 621 of Fig. 89, forward coil of relay 622, segment 623 of receiving commutator, brushes 624 and 625, to line 578ª, thence to ring 627 at the transmitting end, through brushes 628 and 629, segment 630 of the transmitting commutator, forward coil of clutch relay 631, brush 632 of commutator 633, which is constantly rotated by the line unit motor, and at a speed somewhat slower than the main clutch shaft, thence through segment 634 of commutator 633, to brush 635, and thence to the negative terminal of dynamo 619. Current in this circuit, however, has no effect on relays 631 and 622 other than to keep their tongues against their back stop contacts. Then when segment 636 of commutator 633 short circuits brushes 632 and 637, current in a reverse direction passes over circuit above traced from dynamo 618. The effect of this is to cause relays 631 and 632 to send their tongues against their forward contacts. This completes the local circuit of the clutch magnets 638 and 639. These magnets then operate their respective clutches 640 and 641, starting into rotation brushes 628–629, 624–625. As these brushes pass over corresponding segments of the sending and receiving commutators, connected respectively with the tongues of transmitting combination relays and with the coils of relays 643, current will pass from dynamo 619 as follows: earth connection 620 in Fig. 87 to earth connection 621 (Fig. 89) through coils of relays 643, corresponding segments of receiving commutator 644, brushes 624, 625, ring 626, line ring 627, Fig. 87, brushes 628, 629, segments of sending commutator connected to corresponding tongues of relays 642, thence to negative pole of dynamo 619. Current in this direction sends tongues of all relays 643 against their back stops. As soon as magnets 638 and 639 operated their clutches, these magnets closed local contacts 645 and 646, thus completing a local circuit through the back coils of relays 631 and 622 deënergizing magnets 638 and 639, by sending tongues of relays 631 and 622 to their back stops. Therefore, if one or more of the transmitting relays is operated by the automatic transmitter contacts, as described with respect to Fig. 85, the tongue of the relay, or relays, thus actuated will establish connection from the positive terminal of dynamo 618 instead of dynamo 619 to line through that one or more of the sending commutator segments connected to the tongues of the operated relays. Let it be assumed that the signal to be trasmitted is the letter W. The code perforations for this letter in the sending form are the $f$ and $g$ positions, as hereinbefore described. In this case, then, the $f$ and $g$ transmitter contacts 445, 466 operate the $f$ and $g$ transmitting relays, causing these relays, as hereinbefore fully described, to send their tongues against their forward contacts. Current then passes to line from the positive pole of dynamo 618 through forward tongue contact of the transmitter relay (Fig. 87), then through its tongue to a segment of the sending commutator connected to said tongue thence through brushes 629 and 628, when the former brush reaches said segment, and through ring 627 to line, thence to the receiving end through ring 626, brushes 625 and 624, and through a segment on the receiving commutator corresponding to the one on the sending commutator connected to the $f$ relay, thence from said segment to the $f$ relay of the group of receiving relays 643, and thence through earth back to the negative pole of dynamo 618. A second impulse will pass to line when the sending commutator brush 629 reaches the segment connected to the $g$ transmitting relay, entering the receiving commutator and passing through segment connected to the $g$ relay of the bank of receiving relays 643, and thence through earth back to the dynamo. Those of the relays 643 thus energized send their tongues against their forward contacts, thus completing local circuits through the coils of the $f$ and $g$ printer magnets. These magnets becoming thus energized operate their combination bars as described, and bring together terminals 151 and 153 of a circuit which partially completes the circuit of one magnet of relay 647. This circuit is periodically completed by brush 648 driven by the line unit motor, engaging segment 650 on commutator 651, the circuit from brush 648 passing through brush 649 also driven by the line unit motor, and thence through ring of brush 649 to negative supply main. This circuit is thus completed at a time when the brush 624 has passed over all of the receiving segments. When this circuit is thus completed, relay 647 is caused to close local circuit of the printer spacing clutch magnet 159, thus starting the printer to operating, as hereinbefore fully described. The relay 647 is caused to break the circuit which energizes clutch magnet 159 by the coming together of contacts 181 and 182, immediately upon the operation of the clutch by the clutch magnet. In this way, any of the signals herein referred to may be transmitted from the automatic transmitter to the receiver.

When brush 648 was passing over segment 650 at the receiving end, (Fig. 89) brush 652 at the transmitting end (Fig. 87) was passing over segment 653 of a commutator 654 forming a part of the line unit. The effect of this at the transmitter is to complete a circuit which causes all the actuated combination relays to restore their tongues to the normal position, the circuit through said relays being as follows: from positive supply main 604 through the upper coil of each of the combination relays 642, commutator segment 653, brushes 652, 655, ring 656 to the negative supply main 605.

The receiving combination relays 643 may be simply polar relays in which current in one direction through the coils sends their tongues in one direction, and current in the other sends their tongues in the opposite direction. Hence the tongues of these relays are simply restored to normal each time said relays receive current from dynamo 619.

At the transmitting end of the line (Fig. 87) there is a commutator 657, preferably mounted on the same shaft with commutator 633, and which is provided with a segment 658, which one in each revolution of commutator 657, short circuits brushes 659 and 660, sending a current impulse from local supply main 604 through the spacing clutch magnet 462 of the automatic transmitter. This corresponds to the action of short circuitng brushes 523 and 524 (Fig. 85).

When the printer described with reference to Figs. 3 to 69 is used merely as a receiver as in the case illustrated in Fig. 89 for example, lug 158 (Figs. 41 to 44 inclusive) is removed, since the circuit breaking function of this lug is performed by segment 650 of commutator 651 (Fig. 89).

Passing next to Fig. 88, this diagram shows the substitution of a manual keyboard transmitter for the automatic transmitter of Fig. 87, the line unit and its connections being the same in the two cases, except that the commutators 633 and 657 and their connections are omitted. In Fig. 88, it is assumed that the printing and perforating machine herein described is employed as a manual transmitter, in which case contacts 358, 367 and 368 correspond to similarly numbered contacts in Figs. 64 to 69, being the contacts actuated by the insulated ends of the selector bars 134, operated by the key levers 109; while the contacts 151, 152 and 153 correspond to similarly numbered parts shown in Figs. 40 to 44, inclusive. These contacts in the arrangement shown in Fig. 88, however, perform the function performed by the commutator 633 in Fig. 87.

Normally negative current passes to line (Fig. 88) from dynamo 619 through normally closed contacts 152—151, forward coil of relay 631, segment 630, brushes 629, 628, and ring 627, thence to the receiving apparatus Fig. 89. This current causes clutch relays 631, and 622 to send their tongues to their back stop contacts, during which time the loose members of the line unit clutches at the two ends of the line will be disconnected.

When a given key lever is operated, which we shall assume is the one indicated in Fig. 88, this causes selector bar 134 to send spring 358 into engagement with contact 368, and also causes spring 151 to break contact with 152 and make contact with spring 153. Current then passes to line in a positive direction from dynamo 618, through contacts 153 and 151, thence through forward coil of clutch relay 631, to line as above traced. Current in this direction sends the tongues of relays 631 and 622 to their forward contacts thereby completing the local circuits of the line unit clutch magnets 638 and 639, starting the transmitting and receiving commutators' brushes to rotating as described. As these brushes reach the segments corresponding to the key operated, positive current passes to line from dynamo 618, through contacts 368 and 358 to line, operating the corresponding relay in the bank of relays 643 (Fig. 89). In this instance the said relay operated is the $h$ relay. In the meantime, lug 158 (Figs. 40 to 44) causes spring 151 to break contact with spring 153 and make contact with spring 152. As soon as brush 661 reaches segment 662, a circuit is completed through the forward coil of a relay 663. This causes the tongue of relay 663 to be sent to its forward contact. This energizes the clapper clutch magnet 354 which couples up clapper clutch 347 and starts in motion the cam 131ª corresponding to the cam 131 (Fig. 5) except that it (cam 131ª) is so placed on the hub of the clapper clutch that in this case it normally withdraws the locking bar 125 from engagement with the key lugs 124, thus normally unlocking the keys. Immediately after this cam starts to rotate, the keys are locked by the bar 125 and remain locked until the clapper clutch has almost completed a revolution. As soon as the clapper clutch magnet 354 operates, it completes a circuit through contacts 353ᶜ and 353ᵈ, thereby sending current through the back coil of relay 663, causing it to break the circuit of the clapper clutch magnet 354. This uncouples the clapper clutch.

When the machine shown in Figs. 3 to 69, and described in connection with Fig. 88 as a transmitter, is used also as a home recorder, that is, to automatically print or print and perforate on a message-blank the message being transmitted, the spacing clutch magnet 159 operates each time that the clapper clutch does. This may be effected either by connecting the spacing clutch magnet in series with the clapper clutch magnet 354 as shown in Fig. 88, or it may be effected by mechanically connecting these clutches or their actuating arms so that each time the clapper clutch operates, the spacing clutch will operate, or this may be effected in any other desired way.

With the key locking arrangement described with reference to Fig. 88, the keys of the keyboard are normally unlocked and therefore free to be operated at will so long as the successive operations do not follow each other too closely. This interval is determined by the time that the clapper clutch takes to make one rotation after its normally fast and loose members have been connected by the operation of a key.

Regarding the speed of the motors 70 and 413 which are geared locally to drive the printers and automatic transmitter, it is in general required that these motors rotate the main clutch shaft of these machines somewhat faster than the main clutch shaft of the line units rotate. In Fig. 85, however, where there is no line unit it is only necessary that the commutator 518 rotate somewhat more slowly than the main clutch shaft of the printer or automatic transmitter.

In Figs. 87, 88 and 89 it will be observed that the sending and receiving segmented commutators are each provided with nine segments in addition to the line clutch operating segment, eight of these segments being shown connected to their respective circuits, while the ninth or bottom segments are left disconnected. These disconnected segments are placed in the commutators to be used for any required auxiliary signals.

So far as the line operation is concerned we have thus far considered those cases only in which the line is operated simplex, that is, with one receiver and one transmitter at each end of the line. This system, however, is susceptible of operation either as a duplex, quadruplex, octoplex, or other capacity. As an example of multiplex operation of the system, the case of quadruplex operation is selected. Such a case is illustrated in the diagram Fig. 90, to which reference will now be had. In this diagram the apparatus on the left of the broken line passing vertically through the center of the figure, represents the apparatus at one end of the line, and that on the right of said broken line, the apparatus at the other end of the line. In such a case there is located in the main line at each station a main line polar duplex relay 661, which is so balanced by artificial lines 662 that each relay will be responsive to signals from the distant station but non-responsive to signals emanating at its home station. In other words, the line is simply duplexed. The line units at each of these stations comprise the usual line unit motor 663 and clutch 664, a sending commutator 665 and collector ring 666, a receiving commutator 667 and collector ring 668, an additional commutator 669 and collector ring 670 for completing said local circuit, and brushes for all these commutators and collector rings, all of said brushes at each station being driven by the same line unit clutch indicated. These line units are substantial duplicates except that at one end of the line (the left hand station Fig. 90) there is provided an extra commutator 671 and collector ring 672, the brushes 673 and 674 of which are driven by the line unit motor at that station in any desired way continuously, though at a speed somewhat slower than that of the main line unit clutch shaft 675. The sending and receiving commutators 665 and 667 in this case are just the same as in the simplex operation, except that they are provided with twice the number of segments, thereby doubling the capacity of the commutator.

Suppose we call the segments in one-half of the sending commutators the A segments, and the segments in the other half of these commutators the B segments; and, similarly, suppose we call the segments in one-half of the receiving commutator the A′ segments, and those in the other half the B′ segments. Then signals sent out over the A sending segments will be received over the A′ receiving segments at opposite ends of the line, and signals sent out over the B sending segments will be received over the B′ receiving segments at opposite ends of the line. Each of these groups of segments is connected to its respective transmitting or receiving apparatus. In the diagram Fig. 90 the sending apparatus of the A operator at the left hand station indicated, is represented as the manually operated keyboard of the combined printer and manual transmitter herein described with reference to Figs. 3 to 69. In the other places in this diagram the transmitting keyboards, or automatic transmitters, as the case may be, are indicated by the dotted line rectangles S A and S B. So also with the recorders or printers; one of these is indicated on the right in the diagram by the two relays 643ª, while in the other places these receivers are merely indicated by the dotted line rectangles R A and R. B. Any one, or all of the sending units may be automatic.

The tongues of the main line relays 661 are electrically connected permanently to collector rings 668; while the real line connection through said relay coils is connected as shown permanently to collector rings 666. The tongues contacts of these main line relays are connected through resistances 676 to the local supply mains in such manner that when the relay tongue is against one of said contacts local current passes through the receiving commutator in one direction, and when it is against the other contact, local current passes through said commutators in the opposite direction.

Current is supplied to the lines at the two ends from dynamos 677, 678, and 679, 680 connected to line and to earth as shown. The keyboards when employed in this instance are normally locked, that is, the clapper bar 125 normally rests above the locking lugs 124 of the key levers 109, the cams 131 in this case being set as shown in Fig. 5, as well as in diagram Fig. 90. This cam being connected at intervals to a constantly rotating shaft as described with respect to the printer, operates locking bar 125 to withdraw it at regularly recurring intervals from the lugs of said keys thus allowing the said keys at such intervals to be operated. These intervals are arranged with respect to the sending and receiving commutators so that a given keyboard is unlocked when the sending commutator brush of its commutator is passing over that half of said commutator connected to that particular keyboard. During this interval any one of the keys of that keyboard may be operated. At regularly recurring intervals also a clutch impulse passes to the line from the positive pole of dynamo 677 each time brush 673 passes over segment of commutator 671. This sends a positive current impulse through clutch relays 682 at the two ends of the line, the current passing from dynamo 677 through forward coil of relay 682 on the left, commutator 671, and ring 672, the top segment of the sending commutator at the station on the left, collector ring 666 at said station, main line relays 661 and thence to earth through collector ring 666 on the right and clutch segment of the sending commutator at the station on the right. Each time that this circuit is thus completed the clutch relays 682 at the two ends of the line close the local circuits of the line unit clutch magnets 683 at the two ends of the line, thereby causing the line unit clutches to couple their normally stationary members to the constantly rotating shaft 675, setting in motion all the line unit brushes driven by these clutches. Then, as the sending commutator brushes at the respective ends of the line pass over the segments of those commutators, alternate positive and negative impulses are sent to line as the said brushes pass over successive segments. These impulses alternating in polarity, keep the tongues of the main line relays in a state of vibration in unison with the change in said current throughout the time the said sending commutator brushes are thus rotated. The vibration of these relay tongues then causes corresponding impulses to be sent through successive combination receiving relays such as the relays 643ª connected each to the individual segments of the receiving commutator. Two of these relays are shown connected to said segments. These local combination receiving relays are so wound, however, that when alternate relays receive impulses of like polarity, as would be the case in the present instance, all of the tongues of said relays will be sent against their back-stop contacts. This is the condition of no signal over the line. It will be observed that all of the sending and receiving commutator brushes at each end of the line make one revolution periodically with short intervals of rest between each revolution.

The keyboards are unlocked at a time when the sending commutator brushes are passing over the commutator segments which do not correspond to the given keyboard. Each keyboard is locked during all the time the brushes are passing over the corresponding segments of the sending commutator. This is effected by the completion of a local circuit to the clapper clutch magnet of that keyboard. The extra commutator 669 and the collector ring 668 at each end of the line are provided for this purpose. As soon as brushes of commutator 669 reach segment 684 a local circuit is completed from the local current supply means 685 at each station through the forward coil of the clapper clutch relay 686, which causes said relay to close the circuit through the clapper clutch magnet 159. This couples up the clapper clutch of that particular keyboard, and starts cam 131 to rotating, thus unlocking the keys of that keyboard. Each keyboard is of course provided with its individual clapper clutch, as shown in the machine illustrated in Figs. 3 to 69.

Now let it be assumed that one of the key levers 109 is operated to send a signal, Fig. 90. Let this be the top key shown in this diagram. When this key is operated it breaks connection with contact 367 and engages contact 368. This results in sending to line a current impulse of opposite polarity from the dynamo 677 from that which would have passed to line through said key from dynamo 678 had not the key been operated. This is effected by connecting the contacts 367 and 368 respectively, to the dynamos 677 and 678, as shown. This results in the main line relay at the station on the right holding its tongue over against the contact to which it was drawn by the preceding impulse. This will cause the combination receiving relay connected to the segment of the receiving commutator corresponding to the segment of the sending commutator connected to the operated key, to receive a local current of opposite polarity to the normal, thereby sending the tongue of that relay to a forward stop. This relay then operates its corresponding printer magnet just as described with reference to Fig. 89. When the combination bars operate, the circuit of the spacing clutch on the printer is completed as described with reference to the printer, thus giving a local record of the sent message.

The line may be operated at half capacity without the use of the artificial lines, during which time these lines may be adjusted for duplexing. This renders it unnecessary to entirely stop transmission over the line to effect such balancing. For this purpose there may be located at each end of the line a double pole double throw switch 687 which may be connected as shown. In the position in which these switches are indicated the line works at full capacity. When said switches are thrown to the right, the B sending commutator segments are connected direct to earth without including the dynamos, hence these segments are rendered inoperative until said switches are again returned to their former positions.

Figure 91:
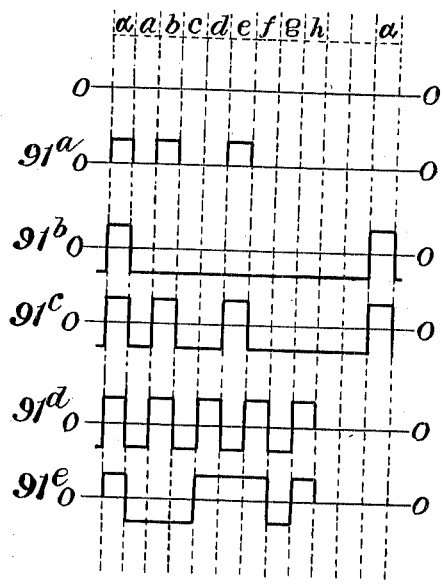

Fig. 91 shows diagrammatically the current on the line under various conditions of operation, where $x$ represents the line unit clutch operating impulses, and the other impulses the line impulses for the $a, b, d, d, e, f, g$ and $h$ combinations described. The lines $o$—$o$ indicate no current on the line. The impulses above this line indicate positive impulses, and those below negative impulses. 91ª shows the current on the line when the signal corresponding to combination $b, e$, is transmitted according to simple line operation, Fig. 86. 91ᵇ shows the current on line when no signals other than the clutch impulses are being transmitted when operating as in Fig. 87. 91ᶜ shows current on line with automatic transmission apparatus of Fig. 87, when the signal combination $b, e$, is being transmitted. 91ᵈ shows the current on the line for the A portion of sending commutators on the left Fig. 90 when no signal other than clutch impulse is sent to line. 91ᵉ shows the current in the case described with reference to case 91$^d$, except that the signal combination $b, e$ is being transmitted.

Figure 92:
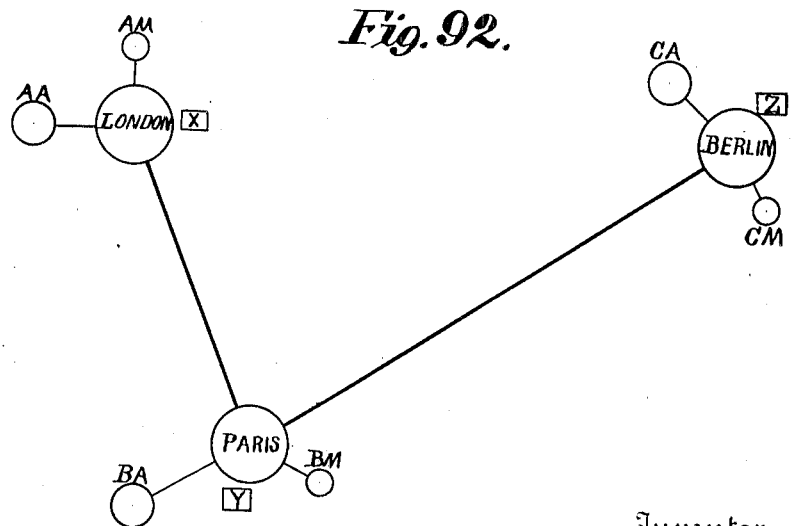

The general scheme of the operation of this system of telegraphy is illustrated in the diagram Fig. 92. Let the three large circles represent main distributing offices in the cities of London, Paris, and Berlin connected with each other by trunk lines which would preferably be operated in multiplex capacity. Each of these offices would be supplied with a sufficient number of combined printers, perforators and keyboard transmitters, such, for example, as the machine shown in Fig. 3, and with a sufficient number of automatic transmitters, such, for example, as herein described. Let the smaller circles A A, B A and C A represent substations connected respectively to the main offices in these cities, and provided each with a combined printer, perforator and keyboard transmitter as described with reference to Figs. 3 to 69. Let the still smaller circles A M, B M and C M represent substations in these respective cities connected to the main offices in these cities by ordinary Morse lines. Let X, Y, Z indicate large commercial houses in London, Paris and Berlin, respectively, which have no wire connection with the main offices in these cities, but each of which is provided with a machine such as herein described and illustrated in Figs. 3 to 69 of the drawings, by which controlling blanks such, for example, as shown in Fig. 1, may be prepared by the manual operation of the keyboards of these machines. Assume a case in which a message originating at the substantion C A in Berlin is destined for delivery at the substation A A in London. In this case the operator at substation C A sends the message to the main offices in Berlin by operating the keyboard of the machine, Fig. 3, as a manual transmitter. This message is received at the main offices in Berlin on a similar machine, where it is automatically printed and perforated in the form, for example, as shown in Fig. 1. This prepared form is then placed in the automatic transmitter at the main office in Berlin, and automatically sent to Paris over the trunk line, where it will be received on the combined printer and perforator, and a duplicate sending blank thereby automatically prepared. This is practical for the first time, because the message being printed as well as perforated on a page, it can be handled, read and routed the same as the usual message and without any added operation. This sending blank is then placed in the automatic transmitter at the main office in Paris, transmitted over the trunk line automatically to the main office in London, where it is received on a combined printer and perforator, and the controlling blank again re-prepared. In the main office at London this blank is then placed in the automatic transmitter and sent to substation A A, where it is received on one of the machines, as hereinbefore shown in Fig. 3. This machine, however, does not in this instance perforate the message blank but automatically prints the message. The appearance of this message would be, for example, as shown in Fig. 1 without the perforations. The printed telegram is then ready for delivery.

In case it is desired to send a message from the substation C M in Berlin to the substation A M, for example, in London, the Morse operator at substation C M sends the message in the usual manner to the main offices in Berlin where it is received on a Morse receiver. Here, the operator at the Morse receiver instead of writing the message out in long hand or on a typewriter, as is usually the case, transcribes the message by operating the keyboard of the combined printer and perforator herein described, thereby preparing a sending blank for automatic transmission. This blank is then fed into the automatic transmitter in the main office in Berlin, and transmitted as described to the main office in London, where it is received in the form, for example, as shown in Fig. 1. This printed telegram is then given to the Morse operator at the main office in London, who then transmits the same over the Morse line to substation A M. This is possible for the first time because the message is received with the text printed in Roman characters as well as perforated, and on the usual telegraph form, so that it can be handled and read by the Morse operator. Obviously any other manual system may be used instead of the Morse, the Morse system being chosen merely as an example. By similar procedure messages may be sent to and from the substations at the city of Paris, and any other of the main or substations.

In case it is desired merely to send a message from one main office to another, the message would first be prepared in the form shown in Fig. 1, and placed in the automatic transmitter at the main office and transmitted to the receiving main office where it would be received in the same form as transmitted, that is, the message blank would contain both perforations and printed matter. This message blank would then be passed into an automatic transcribing arrangement such for example as herein described with reference to Fig. 85, when the message will be printed in the form shown in Fig. 1 though without the perforations. In this form, the message is ready for delivery to the addressee.

In the case of large commercial concerns, it often happens that it is important for these to send telegraphic messages in large numbers. It is not always important, however, that these messages be transmitted immediately. If such establishments are provided with machines such as herein described for preparing message blanks for automatic transmission, a large quantity of these may be prepared during the day and sent to the main office at night when they may be fed into the automatic transmitter and sent to their respective destinations. The preparation of these messages requires no knowledge on the part of the operator, further than a mere knowledge of operating a typewriter keyboard. Hence they may be prepared by the regular office force of such establishments.

The advantages of such a system of handling telegrams will be obvious to anyone skilled in the art. Aside from the convenience of having the controlling blanks printed and perforated in page form, the sending of the message from an originating office by keyboard transmission to a main office where it is received not only in perforated form for automatic retransmission but bears the message plainly printed thereon, is a decided and important improvement over present methods. It requires no knowledge of code telegraphy, nor does such a message have to be transcribed for an employee to tell just where the message should be repeated to, as it bears its destination plainly printed on its face.

While I have herein shown and described certain specific forms or mechanism for carrying out my invention, it should be understood that various modifications may be made in these, without exceeding the scope of my claims. It should also be understood that this apparatus is not necessarily limited to printing telegraphs, since there are various other uses to which it may be put, without departing from the spirit of my invention.

Without limiting myself to the specific embodiment of my invention as herein shown and described, what I claim is:

1. The combination with a telegraph line, of transmitting means adapted to impress signals on said line, a receiver having recording mechanism normally at rest and power mechanism constantly operating, means to directly mechanically connect the said mechanisms, and mechanical combination apparatus controlled by said signals and acting to control the connection between the said recording mechanism and the said power mechanism.

2. The combination with a telegraph line, of an automatic transmitter adapted to impress telegraphic signals on said line, and a receiving device operated by said signals and comprising recording mechanism normally at rest and power mechanism continuously operating, means to directly connect said mechanisms, and a mechanical combination mechanism controlled by said signals and acting to control the connection between the said recording mechanism and the said power mechanism.

3. The combination with an automatic transmitter comprising transmitting mechanism normally at rest and power mechanism constantly operating, means to effect mechanical connection between said transmitting mechanism and the power mechanism, a controlling form adapted to be fed through said transmitter and acting to control said connection, a recording device controlled by said transmitter and comprising recording mechanism normally at rest and power mechanism continuously operating, means to mechanically connect the recording mechanism to its power mechanism, a combination mechanism controlled by the said transmitter and acting to control the connection between the recording mechanism and its power mechanism, and operative connection between said transmitter and recorder.

4. The combination with a perforated controlling form, of automatic telegraph transmitter mechanism provided with a plurality of contacts and contact controlling mechanism adapted to be controlled by said form, and provided with means to feed said form through said transmitter and to effect relative transverse movement between said contact controlling mechanism and said form, means whereby the movements of said form through said transmitter and the relative movement between said form and contact controlling mechanism are controlled by perforations in the form itself, an automatic recorder controlled by said transmitter and provided with means to receive the signals sent out by said transmitter in printed characters and code perforations in line to line page form, and operative connections between said transmitter and recorder.

5. The combination with a telegraph line, of transmitting means adapted to impress telegraphic signals on said line, and means to record said signals, said recording means comprising a printing machine, provided with a traveling paper carrying carriage, mechanism to feed paper in said carriage, carriage travel imparting mechanism, a power shaft continuously rotating, means to connect said paper feed and carriage travel mechanism to said shaft, a mechanical combination device which acts to control said connection, and selecting means, adapted to actuate the combination device.

6. The combination with a duplex telegraph line, of a constantly rotating shaft located at each of two stations on said line, said shafts rotating at substantially the same speed, multiplex sending and receiving apparatus at the respective stations, and means at each of said stations to couple the signaling apparatus to said shafts to transmit and receive each signal and to uncouple the said apparatus at the end of cycles of preselected length accompanying the sending of each signal.

7. The combination with a plurality of slotted combination bars, selecting means adapted to shift said bars in combinations to bring into alinement prearranged combinations of slots in said bars, a reciprocating actuating device, character impressing means comprising a plurality of striker bars, a plurality of latches adapted to form a positive connection between the said striker bars and the said actuating device, the operation of said latches being controlled by slots in said combination bars, a constantly rotating power shaft, a clutch driven by said shaft and connected to drive said actuating device, an electro-magnet controlling said clutch, an electric circuit controlled by said combination bars and operating said magnet, a traveling paper-carrying carriage, paper lining, spacing and carriage return mechanisms, and a clutch individual to each of these mechanisms and controlled by the said combination bars to effect connection between said power shaft and the said mechanisms.

8. In a system of telegraphy, the combination with an automatic telegraph transmitter comprising a perforated controlling sheet, a series of fingers adapted to engage corresponding perforations in said sheet, means to move the fingers across the sheet, and means to move the sheet lengthwise from one series of perforations to a succeeding series, of a recorder operatively connected with said transmitter and having a paper carrying carriage movable across the machine in unison with said fingers across said sheet.

9. The combination with an automatic telegraph transmitter comprising means to select the signal to be sent and means acting subsequently to said selection to start the transmission of said signal, of a recorder operatively connected thereto and comprising selecting means operated by said signals, and recording means controlled by said selecting means to record said signals.

10. The combination with an automatic telegraph transmitter, comprising a prepared controlling form, a traveling contact carrying carriage, conveying means for feeding the controlling form into operative relation with the contacts on said carriage, and means to impart travel to said carriage, the operation of said conveying means being controlled by the said form, of a recorder operatively connected to said transmitter and having a paper carrying carriage movable in unison with said contact carrying carriage of said transmitter and controlled in such movement by the controlling form of said transmitter.

11. A telegraph receiver, comprising a traveling paper carrying carriage, spacing, lining and carriage return mechanism, a constantly rotating power shaft, a plurality of clutches adapted to form a part of the mechanical connection between said power shaft and said spacing, lining and carriage return mechanisms, there being one such clutch for each of said mechanisms, and means including a plurality of magnets to control the operation of said clutches.

12. Telegraphic receiving apparatus, comprising a segmented current distributer, a series of punches, each of said punches corresponding to a sector of said distributer, and means including a plurality of type bars to cause impulses received on said distributer to control the operation of the corresponding punches.

13. In a telegraph receiver, a series of punches, a series of magnets operable over a telegraph line and corresponding in number to the number of said punches, means including a plurality of printing type bars controlled by the said magnets to cause said punches to operate in combination corresponding to the magnets energized.

14. A telegraph receiver, comprising a plurality of type bars, means operable over a telegraph line to operate said bars to print the characters, a plurality of punches of lesser number than said bars, and means carried by each of said type of bars to operate a different combination of said punches.

15. The combination with telegraphic transmitting mechanism and a prepared form for controlling the same, of mechanism controlled by the said form itself to effect relative movement between said form and said mechanism, signal recording mechanism adapted to record signals from said transmitting mechanism on impression receiving material movable with respect to said recording mechanism, and means controlled by said prepared form to impart said movement to said material.

16. The combination with telegraphic transmitting mechanism and a prepared form for automatically controlling the same, of mechanism controlled by said form itself to effect relative movement between said form and said mechanism, signal recording mechanism operated from said transmitting mechanism, a traveling carriage carrying impression receiving material on which said signals are recorded, and mechanism adapted to feed said material in the receiving mechanism, mechanism controlled by said prepared form to impart transverse movement to said carriage and line-to-line movement to said impression material with respect to said recording mechanism.

17. The combination with character recording mechanism, of selecting mechanism adapted to control the operation of said recording mechanism, said selecting mechanism having a plurality of elements the combining of which determines the character to be recorded, electrical means operatively connected to said elements for control from a distance, and a keyboard mechanically connected to said elements to operate the same manually locally.

18. A machine comprising recording mechanism, permutation selecting mechanism adapted to control the operation of said recording mechanism, a keyboard having mechanical means to operate said selecting mechanism locally, and electrical means operative independently of said keyboard mechanism to operate said selecting mechanism by distant control.

19. A telegraph receiver comprising a series of selecting combination bars provided with portions of differing elevations, means by which the position of said bars determines the character to be recorded, impression mechanism controlled by said means, two independent sets of devices for selectively moving said combination bars, a plurality of magnets for operating one set, and a plurality of keys for operating the other set.

20. A telegraph receiver comprising a series of selecting combination bars provided with portions of differing elevations means by which the position of said bars determines the character to be recorded, impression mechanism controlled by said means, two independent sets of devices for selectively moving said combination bars, a plurality of magnets, one for each of said bars, for operating one set, and a plurality of keys greater in number than said bars for operating the other set.

21. A telegraph receiver comprising a series of selecting combination bars provided with portions of differing elevations, means by which the position of said bars determines the character to be recorded, impression mechanism controlled by said means, a plurality of magnets provided with means for operating said bars in combinations corresponding to the combinations of said magnets energized, a plurality of keylevers, and selective mechanism forming operative connection between said levers and said combination bars.

22. The combination with a series of members from which one at a time is to be selected, combination mechanism comprising a series of elements the positions of which de termine the element to be selected, a series of magnets, one for each of said combination elements, adapted to operate said elements in combinations corresponding to combinations of current impulses received, transmitting apparatus comprising a plurality of impulse selecting elements corresponding in number to said combination elements, automatic means to operate said transmitter selecting mechanism, and operative electrical connection between said transmitter and said magnets.

23. The combination with constantly running power mechanism, normally idle actuating mechanism, a plurality of recording members from which one at a time is to be selected, a plurality of devices, one individual to each of said recording devices to connect the same to said actuating device, a plurality of combination selecting members adapted to select the desired connecting device for a given recording member, means to operate the connecting device thus selected, means including a clutch to connect said actuating mechanism to said power mechanism, means controlled by said combination mechanism to operate said clutch, and electrical means comprising a plurality of magnets one individual to each of said selecting members adapted to operate the same.

24. A telegraph receiver comprising selecting mechanism having a plurality of permutation elements the operation of which in predetermined combinations determines the signal to be recorded, a magnet individual to each of said elements, operative connection between said magnets and said elements whereby the energizing of said magnets in combinations operates the said elements in corresponding combinations, power mechanism constantly acting, an actuating member normally at rest but capable of movement by said power mechanism, a mechanical coupling adapted to connect said power mechanism to said actuating member, an electro-magnet adapted to control said coupling, an operating circuit for said magnet, means operated by the said permutation elements to control said circuit, and a plurality of connecting devices controlled by said permutation elements and adapted to positively connect the recording mechanism to the said actuating bar.

25. The combination with a source of electricity adapted to supply current from which signals may be derived, of transmitting apparatus comprising a plurality of impulse selecting elements and automatic means to operate the same, comprising a prepared sending blank having the signals impressed thereon in code perforations, receiving apparatus operatively connected to said transmitting apparatus and comprising a plurality of recording members from which one is to be selected for each signal, mechanical selecting mechanism comprising a plurality of selecting elements corresponding in number to those of the transmitter and determining the said member to be selected, and a series of magnets, one for each of said selector elements, adapted to operate said elements in combinations determined by the combination of impulses received.

26. The combination with a source of electricity adapted to supply current from which signals may be derived, of transmitting apparatus comprising a plurality of contact controlling fingers, automatic means to control the operation of said fingers comprising a prepared form on which the signals appear in code perforations, receiving apparatus operatively connected to said transmitting apparatus and comprising a plurality of recording members from which one is to be selected for each signal, mechanical selecting mechanism comprising a plurality of selecting elements corresponding in number to the said fingers of the transmitter and determining the said member to be selected, and a series of magnets, one for each of said selector elements, adapted to operate said elements in combinations determined by the combination of impulses received.

27. The combination with a telegraph line, of transmitting means adapted to impress signals on said line, a receiver having recording mechanism normally at rest and power mechanism constantly operating, means to effect direct driving connection between the said mechanisms, and mechanical combination apparatus controlled by said signals and acting to control the connection between the said recording mechanism and the said constantly operating power mechanism.

28. The combination with a telegraph line, of transmitting means adapted to impress signals on said line, a receiver having recording mechanism normally at rest and power mechanism constantly operating, means to directly couple the recording mechanism to the said constantly operating power mechanism to record the signals, a mechanical combination device controlling said connecting means, and a plurality of magnets operated in various combinations according to the signals received and acting to operate said combination device.

29. A telegraph receiver, comprising recording mechanism, paper shifting mechanism, constantly operating power mechanism, a clutch for actuating the paper shift mechanism, and a clutch for actuating the recording mechanism, both from said constantly operating power mechanism, a mechanical combination device controlling both said clutches and means operated by the received signals to operate said combination device.

30. The combination with a telegraph line, of a constantly rotating shaft at each of two stations on said line, transmitting apparatus located at one of said stations and receiving apparatus located at the other of said stations and adapted to be connected by said line, means at each of said stations acting automatically periodically and independently of the transmission of signals to couple said transmitting and receiving apparatuses respectively to said constantly operating shafts previously to each signal and to uncouple said apparatuses from said shafts subsequent to each signal.

31. The combination with a telegraph line, of a constantly rotating shaft at each of two stations on said line, a rotary transmiting current distributer located at one of said stations and a receiving rotary current distributer located at the other of said stations and connected by said line, means at each of said stations acting automatically periodically and independently of the transmission of signals to couple said current distributers respectively to said constantly operating shafts previously to each signal and to uncouple said distributers from said shafts subsequent to each signal.

32. A telegraph receiver, comprising a constantly rotating shaft, a normally stationary shaft, a clutch to couple the two, a normally inactive actuating mechanism connected to said normally inactive shaft, recording mechanism normally at rest, means to connect said recording mechanism to said actuating mechanism, a mechanical combination device acting to control the operation of said clutch and the connection between said recording mechanism and said actuating mechanism, and means electrically operated by incoming signals to selectively control said combination device.

33. A telegraph receiver comprising a constantly operating power drive, recording mechanism normally at rest, an actuating mechanism for said recording mechanism, a clutch for effecting the initial driving connection between said power drive and actuating mechanism, a combination device controlling said connection, and electrical means operated by incoming signals to control said combination mechanism selectively.

34. A telegraph receiver, comprising a constantly operating power shaft, normally idle recording mechanism, normally idle actuating mechanism for operating said recording mechanism and normally uncoupled therefrom, a clutch for connecting said power shaft to said actuating mechanism, and combination mechanism operated by the incoming signals and controlling the operation of said clutch.

35. A telegraph receiver, comprising a constantly operating power shaft, normally idle recording mechanism, normally idle actuating mechanism for operating said recording mechanism and normally uncoupled therefrom, a clutch for connecting said power shaft to said actuating mechanism, and mechanical combination mechanism operated by the incoming signals and controlling both the operation of said clutch and the connection between said actuating mechanism and said recording mechanism.

36. In a telegraph receiver, the combination with permutation mechanism electrically controlled by incoming signals, of a series of longitudinally slidable reciprocating bars of which one at a time is selected by said permutation mechanism, a series of recording members comprising pivoted striker bars connected individually to said slidable bars, a reciprocating actuating bar, means selectively operated by said permutation mechanism to operatively connect said slidable bars and actuating bar, a constantly operating power drive, mechanism including a clutch to effect driving connection between said actuating bar and said power drive, and a magnet controlled by the incoming signals to operate said clutch.

37. In a telegraph receiver, the combination with mechanical permutation mechanism electrically controlled by incoming signals, and comprising a plurality of slotted longitudinally movable combination bars, of a series of longitudinally slidable reciprocating bars of which one at a time is selected by said permutation device, a series of recording members comprising pivoted striker bars connected individually to said slidable bars, a latch pivotally mounted on each of said slidable bars and adapted to engage respectively predetermined combinations of slots in said combination bars, a reciprocating actuating bar adapted to positively engage said latches when selected by said combination bars, a constantly operating power drive, mechanism for driving said actuating bar, a clutch to couple said last named driving mechanism to said power drive, and a magnet operating on the reception of each signal to be recorded and acting to control the coupling of said clutch.

38. In a telegraph receiver for recording intelligence in a succession of lines reading from the end of one line to the beginning of the next line as in ordinary page printing, the combination with permutation mechanism electrically controlled by the incoming signals, of an actuating member the operation of which is selectively controlled by said permutation mechanism, mechanism to feed the record receiving material from line to line past the recording point, a constantly acting power drive, a clutch for connecting the said drive to said feed mechanism, and means operated by the said actuating member for controlling the operation of said clutch to effect the connection between said feed mechanism and the power drive, mechanism to drive said reciprocating member from said power drive, a clutch included in said driving connection, and means controlled by said permutation mechanism and operating on the reception of each signal to operate said last named clutch.

39. In a telegraph receiver for recording intelligence in a succession of lines reading from the end of one line to the beginning of the next as in ordinary page printing, the combination with mechanical permutation mechanism electrically controlled by the incoming signals, of lining mechanism to feed the record receiving material from line to line past the recording point, a constantly operating power drive, a clutch controlled by said permutation mechanism for connecting the said power drive to said feed mechanism, blanking mechanism to operate said lining clutch and its associated parts to feed the said material from line to line at a higher rate of speed than that at which the lining mechanism normally operates, and means to automatically stop the operation of said blanking mechanism when said material has been fed a predetermined distance.

40. In a telegraph receiver for recording intelligence in a succession of lines reading from the end of one line to the beginning of the next as in ordinary page printing and comprising a traveling carriage to carry the record receiving material, the combination with a rotatable shaft having teeth which by the rotation of said shaft are adapted to impart step-by-step motion to said carriage, of power mechanism to drive said shaft and normally disconnected therefrom, mechanism controlling the connection between said power mechanism and said shaft, and electrically controlled means operated by incoming signals to operate said controlling mechanism to effect said connection.

41. In a telegraph receiver for recording intelligence in a succession of lines reading from the end of one line to the beginning of the next as in ordinary page printing and comprising a traveling carriage to carry the record receiving material, the combination with a rotatable shaft having a thread adapted to return the said carriage to the commencement of its travel, of power mechanism to drive said shaft and normally disconnected therefrom, mechanism controlling the connection between said power mechanism and said shaft, and electrically controlled means operated by incoming signals to operate said controlling mechanism to effect said connection.

42. In a telegraph receiver for recording intelligence in a succession of lines reading from the end of one line to the beginning of the next as in ordinary page printing and comprising a traveling carriage to carry the record receiving material, the combination with a rotatable shaft having a thread adapted to return the said carriage to the commencement of its travel, the said thread decreasing in pitch at one end to reduce the speed of the carriage as it nears the end of its travel in one direction, of power mechanism to drive said shaft and normally disconnected therefrom, mechanism controlling the connection between said power mechanism and said shaft, and electrically controlled means operated by incoming signals to operate said controlling mechanism to effect said connection.

43. In a telegraph receiver for recording intelligence in a succession of lines reading from the end of one line to the beginning of the next as in ordinary page printing, the combination with mechanical permutation mechanism electrically controlled by the incoming signals, of a traveling carriage to carry the record receiving material, lining mechanism to feed the said material from line to line past the recording point, spacing mechanism to drive said carriage transversely of said recording point step-by-step, mechanism to return said carriage to the commencement of its travel, a constantly operating power drive, a clutch individual respectively to said spacing, lining and carriage return mechanisms, to connect the same to said power drive, means to operate said spacing clutch on the reception of each signal, and means selectively controlled by said permutation device to operate said other clutches on the reception of signals corresponding to the operations to be performed by said clutches only, a plurality of recording members of which one at a time is selected by said permutation mechanism, actuating means for said recording members, and means including said spacing clutch for connecting said actuating means to said power drive.

44. A telegraph receiver, comprising a constantly operating power shaft, normally idle recording mechanism, normally idle actuating mechanism for operating said recording mechanism, a clutch for connecting said power shaft to said actuating mechanism, and combination mechanism operated by the incoming signals and controlling the operation of said clutch.

45. A telegraph receiver, comprising recording mechanism, power mechanism, means to couple the two, a magnet for controlling said means, a combination device to select the characters to be recorded, and means operated by said combination device and acting to operate said magnet.

46. The combination with a series of type bars, of a series of bars mounted for reciprocating motion one for each of said type bars and individually connected thereto, a latch pivotally mounted on each of said reciprocating bars and each of said latches being provided with a tail piece, a plurality of transversely slotted combination bars mounted for longitudinal movement and across which said tail pieces extend transversely so as to drop into alined slots in said bars, means comprising a plurality of magnets one for each of said combination bars and operative connection between individual magnets and said combination bars whereby the energization of said magnets in combinations effects the operation of corresponding combination bars, and power operated means adapted to engage those latches whose tail pieces have dropped into an alinement of slots in said combination bars corresponding to a given character to be recorded.

47. In an electric telegraph, the combination with a rotary current distributer, of an electric motor to drive said distributer, automatic means to effect driving connection between said motor and said distributer and to disconnect the same at regularly recurring intervals whether signals are being transmitted or not, the intervals of connection of said motor and distributer corresponding each to the time interval of a signal.

48. The combination with recording mechanism, of mechanical selecting mechanism to control the operation of said recording mechanism, a plurality of magnets arranged to operate the selecting mechanism, said magnets being of lesser number than the characters the machine is adapted to record, a plurality of circuits in which said magnets are individually connected, a selecting relay for and controlling each of said circuits, a main line, a source of signaling current, a circuit distributer connected to said main line and to said selecting relays and distributing current from said main line to said relays, and signal transmitting means connected to said main line.

49. The combination with two sources of direct electric current, a pair of electrical conductors connected respectively to the positive pole of one source and to the negative of the other source, an electrical conductor connected to the other two poles of said sources and to earth, a plurality of pairs of fixed contacts bridged across said pair of conductors, one contact of each pair being connected to one of said conductors and the other contact of each pair to the other of said conductors, a separate electrical conductor movable between each pair of said contacts for engagement with either one or the other of said contacts and in engagement normally all with those of said pairs of contacts connected to one pole of said current source, permutation mechanism for bringing said separate conductors in prearranged combinations into engagement with those contacts of said pairs which are connected to the other pole of said current source, a line wire, current distributing mechanism for connecting the said movable conductors to the line wire, and receiving apparatus operatively connected to said line.

In testimony whereof I affix my signature in presence of two witnesses.

LOUIS MAXWELL POTTS.

Witnesses:
EDWARD C. WADE,
FRANCIS S. MAGUIRE.